(12) United States Patent
Sprague et al.

(10) Patent No.: US 11,181,105 B2
(45) Date of Patent: Nov. 23, 2021

(54) LOW ELASTICITY FILMS FOR MICROFLUIDIC USE

(71) Applicant: PerkinElmer Health Sciences, Inc., Waltham, MA (US)

(72) Inventors: Isaac Sprague, Kirkland, WA (US); Justin L. Kay, Renton, WA (US); Matthew Scott Bragd, Mercer Island, WA (US); C. Frederick Battrell, Wenatchee, WA (US)

(73) Assignee: PERKINELMER HEALTH SCIENCES, INC., Waltham, MA (US)

( * ) Notice: Subject to any disclaimer, the term of this patent is extended or adjusted under 35 U.S.C. 154(b) by 77 days.

(21) Appl. No.: 16/679,076

(22) Filed: Nov. 8, 2019

(65) Prior Publication Data

US 2020/0070154 A1    Mar. 5, 2020

Related U.S. Application Data

(63) Continuation of application No. 14/653,737, filed as application No. PCT/US2013/077269 on Dec. 20, 2013, now Pat. No. 10,518,262.
(Continued)

(51) Int. Cl.
*F04B 43/04* (2006.01)
*B01L 3/00* (2006.01)
(Continued)

(52) U.S. Cl.
CPC ........ *F04B 43/043* (2013.01); *B01L 3/50273* (2013.01); *B01L 3/502707* (2013.01);
(Continued)

(58) Field of Classification Search
CPC ........ F04B 43/043; F04B 43/04; F04B 43/00; B01L 3/502707; B01L 3/50273;
(Continued)

(56) References Cited

U.S. PATENT DOCUMENTS 3,013,467 A    12/1961   Minsky
3,799,742 A     3/1974   Coleman
(Continued)

FOREIGN PATENT DOCUMENTS

CN    1146017 A    3/1997
CN    1253625 A    5/2000
(Continued)

OTHER PUBLICATIONS

Al Zahrani et al., "Accuracy and Utility of Commercially Available Amplification and Serologic Tests for the Diagnosis of Minimal Pulmonary Tuberculosis," *Am J Respir Crit Care Med* 162:1323-1329, 2000.
(Continued)

*Primary Examiner* — Christine T Mui
(74) *Attorney, Agent, or Firm* — Seed Intellectual Property Law Group LLP

(57) ABSTRACT

Microfluidic circuit elements, such as a microvalve, micropump or microvent, formed of a microcavity divided by a diaphragm web into a first subcavity bounded by a first internal wall and a second subcavity bounded by a second internal wall, where the diaphragm web is characterized as a thin film having a first state contacting the first internal wall and a second state contacting the second internal wall and exhibiting essentially no elasticity in moving between the first state and the second state, the thin film web having been stretched beyond its yield point before or during use are provided. The disclosed elements enable faster and more efficient cycling of the diaphragm in the microcavity and increases the diaphragm surface area. In a preferred embodiment, the microfluidic circuit element is pneumatically driven and controls the motion of fluids in a microassay device.

17 Claims, 30 Drawing Sheets

Related U.S. Application Data

(60) Provisional application No. 61/745,340, filed on Dec. 21, 2012.

(51) Int. Cl.
  *F16K 99/00* (2006.01)
  *F04B 19/00* (2006.01)
  *F04B 43/00* (2006.01)

(52) U.S. Cl.
  CPC ...... *B01L 3/502738* (2013.01); *F04B 19/006* (2013.01); *F16K 99/0015* (2013.01); *F16K 99/0055* (2013.01); *B01L 2400/06* (2013.01); *F16K 2099/0084* (2013.01)

(58) Field of Classification Search
  CPC .. B01L 3/502738; B01L 3/5027; B01L 3/502; B01L 3/50; F16K 99/0015; F16K 99/0003; F16K 99/0001; F16K 99/00
  USPC .................................................. 422/505, 500
  See application file for complete search history.

(56) References Cited

U.S. PATENT DOCUMENTS

| | | |
|---|---|---|
| 3,996,345 A | 12/1976 | Ullman et al. |
| 4,104,029 A | 8/1978 | Maier, Jr. |
| 4,235,960 A | 11/1980 | Sasse et al. |
| 4,304,257 A | 12/1981 | Webster |
| 4,366,241 A | 12/1982 | Tom et al. |
| 4,373,932 A | 2/1983 | Gribnau et al. |
| 4,610,678 A | 9/1986 | Weisman et al. |
| 4,683,195 A | 7/1987 | Mullis et al. |
| 4,683,202 A | 7/1987 | Mullis |
| 4,788,729 A | 12/1988 | Walker |
| 4,798,703 A | 1/1989 | Minekane |
| 4,800,159 A | 1/1989 | Mullis et al. |
| 4,810,630 A | 3/1989 | Craig et al. |
| 4,833,332 A | 5/1989 | Robertson, Jr. et al. |
| 4,837,168 A | 6/1989 | de Jaeger et al. |
| 4,848,722 A | 7/1989 | Webster |
| 4,855,240 A | 8/1989 | Rosenstein et al. |
| 4,869,282 A | 9/1989 | Sittler et al. |
| 4,883,750 A | 11/1989 | Whiteley et al. |
| 4,943,522 A | 7/1990 | Eisinger et al. |
| 4,946,527 A | 8/1990 | Battrell |
| 4,956,302 A | 9/1990 | Gordon et al. |
| 4,965,188 A | 10/1990 | Mullis et al. |
| 5,038,852 A | 8/1991 | Johnson et al. |
| 5,075,078 A | 12/1991 | Osikowicz et al. |
| 5,100,626 A | 3/1992 | Levin |
| 5,120,643 A | 6/1992 | Ching et al. |
| 5,130,238 A | 7/1992 | Malek et al. |
| 5,141,850 A | 8/1992 | Cole et al. |
| 5,160,701 A | 11/1992 | Brown, III et al. |
| 5,192,980 A | 3/1993 | Dixon et al. |
| 5,225,163 A | 7/1993 | Andrews |
| 5,234,809 A | 8/1993 | Boom et al. |
| 5,252,459 A | 10/1993 | Tarcha et al. |
| 5,270,183 A | 12/1993 | Corbett et al. |
| 5,275,785 A | 1/1994 | May et al. |
| 5,296,703 A | 3/1994 | Tsien |
| 5,304,487 A | 4/1994 | Wilding et al. |
| 5,354,668 A | 10/1994 | Auerbach |
| 5,415,994 A | 5/1995 | Imrich et al. |
| 5,420,016 A | 5/1995 | Boguslaski et al. |
| 5,427,930 A | 6/1995 | Birkenmeyer et al. |
| 5,443,890 A | 8/1995 | Öhman |
| 5,447,440 A | 9/1995 | Davis et al. |
| 5,455,166 A | 10/1995 | Walker |
| 5,486,335 A | 1/1996 | Wilding et al. |
| 5,498,392 A | 3/1996 | Wilding et al. |
| 5,504,013 A | 4/1996 | Senior |
| 5,543,026 A | 8/1996 | Hoff et al. |
| 5,578,818 A | 11/1996 | Kain et al. |
| 5,582,989 A | 12/1996 | Caskey et al. |
| 5,587,128 A | 12/1996 | Wilding et al. |
| 5,591,645 A | 1/1997 | Rosenstein |
| 5,593,824 A | 1/1997 | Treml et al. |
| 5,602,040 A | 2/1997 | May et al. |
| 5,622,871 A | 4/1997 | May et al. |
| 5,631,734 A | 5/1997 | Stem et al. |
| 5,635,358 A | 6/1997 | Wilding et al. |
| 5,635,602 A | 6/1997 | Cantor et al. |
| 5,639,428 A | 6/1997 | Cottingham |
| 5,656,503 A | 8/1997 | May et al. |
| 5,658,723 A | 8/1997 | Oberhardt |
| 5,660,370 A | 8/1997 | Webster |
| 5,660,990 A | 8/1997 | Rao et al. |
| 5,670,381 A | 9/1997 | Jou et al. |
| 5,707,807 A | 1/1998 | Kato |
| 5,716,842 A | 2/1998 | Baier et al. |
| 5,716,852 A | 2/1998 | Yager et al. |
| 5,718,567 A | 2/1998 | Rapp et al. |
| 5,724,404 A | 3/1998 | Garcia et al. |
| 5,726,026 A | 3/1998 | Wilding et al. |
| 5,726,404 A | 3/1998 | Brody |
| 5,726,751 A | 3/1998 | Altendorf et al. |
| 5,730,850 A | 3/1998 | Kambara et al. |
| 5,747,349 A | 5/1998 | van den Engh et al. |
| 5,748,827 A | 5/1998 | Holl et al. |
| 5,759,014 A | 6/1998 | Van Lintel |
| 5,770,460 A | 6/1998 | Pawlak et al. |
| 5,798,273 A | 8/1998 | Shuler et al. |
| 5,856,174 A | 1/1999 | Lipshutz et al. |
| 5,863,502 A | 1/1999 | Southgate et al. |
| 5,863,801 A | 1/1999 | Southgate et al. |
| 5,872,710 A | 2/1999 | Kameyama |
| 5,906,602 A | 5/1999 | Weber et al. |
| 5,922,210 A | 7/1999 | Brody et al. |
| 5,922,591 A | 7/1999 | Anderson et al. |
| 5,932,100 A | 8/1999 | Yager et al. |
| 5,932,799 A | 8/1999 | Moles |
| 5,948,684 A | 9/1999 | Weigl et al. |
| 5,955,029 A | 9/1999 | Wilding et al. |
| 5,965,410 A | 10/1999 | Chow et al. |
| 5,971,158 A | 10/1999 | Yager et al. |
| 5,971,355 A | 10/1999 | Biegelsen et al. |
| 5,972,710 A | 10/1999 | Weigl et al. |
| 5,972,721 A | 10/1999 | Bruno et al. |
| 5,974,867 A | 11/1999 | Forster et al. |
| 5,989,813 A | 11/1999 | Gerdes |
| 6,001,307 A | 12/1999 | Naka et al. |
| 6,007,309 A | 12/1999 | Hartley |
| 6,007,775 A | 12/1999 | Yager |
| 6,018,616 A | 1/2000 | Schaper |
| 6,020,187 A | 2/2000 | Tam |
| 6,037,168 A | 3/2000 | Brown |
| 6,057,167 A | 5/2000 | Shieh et al. |
| 6,068,752 A | 5/2000 | Dubrow et al. |
| 6,086,740 A | 7/2000 | Kennedy |
| 6,158,712 A | 12/2000 | Craig |
| 6,168,948 B1 | 1/2001 | Anderson et al. |
| 6,171,865 B1 | 1/2001 | Weigl et al. |
| 6,184,029 B1 | 2/2001 | Wilding et al. |
| 6,210,514 B1 | 4/2001 | Cheung et al. |
| 6,210,882 B1 | 4/2001 | Landers et al. |
| 6,272,939 B1 | 8/2001 | Frye et al. |
| 6,287,850 B1 | 9/2001 | Besemer et al. |
| 6,303,389 B1 | 10/2001 | Levin et al. |
| 6,309,875 B1 | 10/2001 | Gordon |
| 6,325,975 B1 | 12/2001 | Naka et al. |
| 6,326,211 B1 | 12/2001 | Anderson et al. |
| 6,368,876 B1 | 4/2002 | Huang et al. |
| 6,387,290 B1 | 5/2002 | Brody et al. |
| 6,390,791 B1 | 5/2002 | Maillefer et al. |
| 6,399,398 B1 | 6/2002 | Cunningham et al. |
| 6,418,968 B1 | 7/2002 | Pezzuto et al. |
| 6,431,212 B1 | 8/2002 | Hayenga et al. |
| 6,439,036 B1 | 8/2002 | Mansky |
| 6,468,807 B1 | 10/2002 | Svensson et al. |
| 6,472,161 B1 | 10/2002 | Baugh |
| 6,488,896 B2 | 12/2002 | Weigl et al. |
| 6,506,346 B1 | 1/2003 | Monro |

(56) References Cited

U.S. PATENT DOCUMENTS

| | | |
|---|---|---|
| 6,541,213 B1 | 4/2003 | Weigl et al. |
| 6,541,274 B2 | 4/2003 | Nagle et al. |
| 6,562,209 B1 | 5/2003 | Sullivan et al. |
| 6,569,674 B1 | 5/2003 | McGarry et al. |
| 6,576,459 B2 | 6/2003 | Miles et al. |
| 6,581,899 B2 | 6/2003 | Williams |
| 6,614,030 B2 | 9/2003 | Maher et al. |
| 6,620,273 B2 | 9/2003 | Dai et al. |
| 6,632,655 B1 | 10/2003 | Mehta et al. |
| 6,635,487 B1 | 10/2003 | Lee et al. |
| 6,637,463 B1 | 10/2003 | Lei et al. |
| 6,664,104 B2 | 12/2003 | Pourahmadi et al. |
| 6,720,411 B2 | 4/2004 | Mirkin et al. |
| 6,729,352 B2 | 5/2004 | O'Connor et al. |
| 6,731,178 B2 | 5/2004 | Gailhard et al. |
| 6,731,781 B1 | 5/2004 | Shams et al. |
| 6,743,399 B1 | 6/2004 | Weigl et al. |
| 6,748,975 B2 | 6/2004 | Hartshorne et al. |
| 6,758,107 B2 | 7/2004 | Cabuz |
| 6,767,194 B2 | 7/2004 | Jeon et al. |
| 6,787,338 B2 | 9/2004 | Wittwer et al. |
| 6,793,753 B2 | 9/2004 | Unger et al. |
| 6,815,160 B1 | 11/2004 | Chien et al. |
| 6,843,263 B2 | 1/2005 | Kuo et al. |
| 6,872,566 B2 | 3/2005 | Vischer et al. |
| 6,901,949 B2 | 6/2005 | Cox et al. |
| 6,916,113 B2 | 7/2005 | Goor et al. |
| 6,951,632 B2 | 10/2005 | Unger et al. |
| 6,953,675 B2 | 10/2005 | Leung et al. |
| 6,953,676 B1 | 10/2005 | Wilding et al. |
| 6,955,738 B2 | 10/2005 | Derand et al. |
| 6,974,119 B2 | 12/2005 | Brendle et al. |
| 6,974,669 B2 | 12/2005 | Mirkin et al. |
| 7,010,391 B2 | 3/2006 | Handique et al. |
| 7,052,594 B2 | 5/2006 | Pelrine et al. |
| 7,087,414 B2 | 8/2006 | Gerdes et al. |
| 7,141,416 B2 | 11/2006 | Krutzik |
| 7,153,673 B2 | 12/2006 | Stern |
| 7,223,363 B2 | 5/2007 | McNeely et al. |
| 7,223,371 B2 | 5/2007 | Hayenga et al. |
| 7,226,562 B2 | 6/2007 | Holl et al. |
| 7,235,400 B2 | 6/2007 | Adey |
| 7,318,913 B2 | 1/2008 | Loeffler et al. |
| 7,416,892 B2 | 8/2008 | Battrell et al. |
| 7,445,926 B2 | 11/2008 | Mathies et al. |
| 7,514,212 B2 | 4/2009 | Prudent et al. |
| 7,517,651 B2 | 4/2009 | Marshall et al. |
| 7,541,147 B2 | 6/2009 | Marshall et al. |
| 7,544,506 B2 | 6/2009 | Breidford et al. |
| 7,607,641 B1 | 10/2009 | Yuan |
| 7,615,370 B2 | 11/2009 | Streit et al. |
| 7,648,835 B2 | 1/2010 | Breidford et al. |
| 7,695,683 B2 | 4/2010 | Quan et al. |
| 7,749,444 B2 | 7/2010 | Yamada et al. |
| 7,763,453 B2 | 7/2010 | Clemmens et al. |
| 7,785,776 B2 | 8/2010 | Wittwer et al. |
| 7,832,429 B2 | 11/2010 | Young et al. |
| 7,906,317 B2 | 3/2011 | Lee et al. |
| 7,955,836 B2 | 6/2011 | Clemmens et al. |
| 8,104,497 B2 | 1/2012 | Unger et al. |
| 8,104,514 B2 | 1/2012 | Fernandes et al. |
| 8,110,392 B2 | 2/2012 | Battrell et al. |
| 8,222,023 B2 | 7/2012 | Battrell et al. |
| 8,329,453 B2 | 12/2012 | Battrell et al. |
| 8,431,389 B2 | 4/2013 | Battrell et al. |
| 8,716,007 B2 | 5/2014 | Battrell et al. |
| 8,747,779 B2 | 6/2014 | Sprague et al. |
| 8,772,017 B2 | 7/2014 | Battrell et al. |
| 9,056,291 B2 | 6/2015 | Battrell et al. |
| 9,132,423 B2 | 9/2015 | Battrell et al. |
| 9,272,280 B2 | 3/2016 | Viola et al. |
| 10,065,186 B2 | 9/2018 | Kolb et al. |
| 10,087,440 B2 | 10/2018 | Lofquist et al. |
| 10,190,153 B2 | 1/2019 | Bouzek |
| 2001/0046701 A1 | 11/2001 | Schulte et al. |
| 2002/0081934 A1 | 6/2002 | Murao et al. |
| 2002/0086443 A1 | 7/2002 | Bamdad |
| 2002/0097730 A1 | 7/2002 | Langille et al. |
| 2002/0137196 A1 | 9/2002 | Miles et al. |
| 2002/0160518 A1 | 10/2002 | Hayenga et al. |
| 2002/0192676 A1 | 12/2002 | Madonna et al. |
| 2002/0195152 A1 | 12/2002 | Fernandes et al. |
| 2003/0008308 A1 | 1/2003 | Enzelberger et al. |
| 2003/0013184 A1 | 1/2003 | Streit et al. |
| 2003/0032028 A1 | 2/2003 | Dace et al. |
| 2003/0073229 A1 | 4/2003 | Greenstein et al. |
| 2003/0124619 A1 | 7/2003 | Weigl et al. |
| 2003/0129756 A1 | 7/2003 | Thorne et al. |
| 2003/0136178 A1 | 7/2003 | Cabuz |
| 2003/0137978 A1 | 7/2003 | Kanetake |
| 2003/0152927 A1 | 8/2003 | Jakobsen et al. |
| 2003/0152994 A1 | 8/2003 | Woudenberg et al. |
| 2003/0175990 A1 | 9/2003 | Hayenga et al. |
| 2003/0215825 A1 | 11/2003 | Tong |
| 2003/0224434 A1 | 12/2003 | Wittwer et al. |
| 2004/0005718 A1 | 1/2004 | Fukushima et al. |
| 2004/0018611 A1 | 1/2004 | Ward et al. |
| 2004/0024051 A1 | 2/2004 | Holton |
| 2004/0037739 A1 | 2/2004 | McNeely et al. |
| 2004/0081997 A1 | 4/2004 | Stern |
| 2004/0115094 A1 | 6/2004 | Gumbrecht et al. |
| 2004/0121364 A1 | 6/2004 | Chee et al. |
| 2004/0001243 A1 | 7/2004 | Biegelsen et al. |
| 2004/0189311 A1 | 9/2004 | Glezer et al. |
| 2004/0209354 A1 | 10/2004 | Mathies et al. |
| 2004/0224339 A1 | 11/2004 | Numajiri et al. |
| 2004/0226348 A1 | 11/2004 | Bruce, III et al. |
| 2004/0248167 A1 | 12/2004 | Quake et al. |
| 2005/0013732 A1 | 1/2005 | Battrell et al. |
| 2005/0019792 A1 | 1/2005 | McBride et al. |
| 2005/0019898 A1 | 1/2005 | Adey et al. |
| 2005/0037397 A1 | 2/2005 | Mirkin et al. |
| 2005/0106066 A1 | 5/2005 | Saltsman et al. |
| 2005/0106742 A1 | 5/2005 | Wahl et al. |
| 2005/0118570 A1 | 6/2005 | Hollis et al. |
| 2005/0129582 A1 | 6/2005 | Breidford et al. |
| 2005/0136552 A1 | 6/2005 | Buechler |
| 2005/0142582 A1 | 6/2005 | Doyle et al. |
| 2005/0157301 A1 | 7/2005 | Chediak et al. |
| 2005/0161669 A1 | 7/2005 | Jovanovich et al. |
| 2005/0164373 A1 | 7/2005 | Oldham et al. |
| 2005/0186585 A1 | 8/2005 | Juncosa et al. |
| 2005/0205816 A1 | 9/2005 | Hayenga et al. |
| 2005/0217741 A1 | 10/2005 | Bohm |
| 2005/0221281 A1 | 10/2005 | Ho |
| 2005/0284817 A1 | 12/2005 | Fernandez et al. |
| 2006/0003440 A1 | 1/2006 | Streit et al. |
| 2006/0073484 A1 | 4/2006 | Mathies et al. |
| 2006/0076068 A1* | 4/2006 | Young .............. B01L 3/50273 137/829 |
| 2006/0127886 A1 | 6/2006 | Kaylor et al. |
| 2006/0166375 A1 | 7/2006 | Hawkins et al. |
| 2006/0178568 A1 | 8/2006 | Danna et al. |
| 2006/0246575 A1 | 11/2006 | Lancaster et al. |
| 2006/0254916 A1 | 11/2006 | Hernandez et al. |
| 2006/0263816 A1 | 11/2006 | Laikhter et al. |
| 2006/0264782 A1 | 11/2006 | Holmes et al. |
| 2006/0275852 A1 | 12/2006 | Montagu et al. |
| 2006/0275893 A1 | 12/2006 | Ishii et al. |
| 2006/0292588 A1 | 12/2006 | Chou et al. |
| 2006/0292630 A1 | 12/2006 | Fukumoto |
| 2007/0008536 A1 | 1/2007 | Mitani et al. |
| 2007/0009383 A1 | 1/2007 | Bedingham et al. |
| 2007/0014695 A1 | 1/2007 | Yue et al. |
| 2007/0042427 A1 | 2/2007 | Gerdes et al. |
| 2007/0125947 A1 | 6/2007 | Sprinzak et al. |
| 2007/0154895 A1 | 7/2007 | Spaid et al. |
| 2007/0183935 A1 | 8/2007 | Clemmens et al. |
| 2007/0190525 A1 | 8/2007 | Gu et al. |
| 2007/0219366 A1 | 9/2007 | Gumbrecht et al. |
| 2007/0234785 A1 | 10/2007 | Beerling et al. |
| 2007/0243603 A1 | 10/2007 | Einsle et al. |
| 2007/0280856 A1 | 12/2007 | Ulmanella et al. |
| 2007/0292858 A1 | 12/2007 | Chen et al. |

(56) References Cited

U.S. PATENT DOCUMENTS

| | | |
|---|---|---|
| 2008/0050283 A1 | 2/2008 | Chou et al. |
| 2008/0081341 A1 | 4/2008 | Maher et al. |
| 2008/0124749 A1 | 5/2008 | Farnam et al. |
| 2008/0226500 A1 | 9/2008 | Shikida et al. |
| 2008/0260586 A1 | 10/2008 | Boamfa |
| 2008/0274511 A1 | 11/2008 | Tan et al. |
| 2008/0297792 A1 | 12/2008 | Kim et al. |
| 2009/0000678 A1 | 1/2009 | Therriault et al. |
| 2009/0017483 A1 | 1/2009 | Yamaoka et al. |
| 2009/0047713 A1 | 2/2009 | Handique |
| 2009/0061450 A1 | 3/2009 | Hunter |
| 2009/0148847 A1 | 6/2009 | Kokoris et al. |
| 2009/0148933 A1* | 6/2009 | Battrell .............. B01F 13/0059 435/287.2 |
| 2009/0181411 A1 | 7/2009 | Battrell et al. |
| 2009/0298059 A1 | 12/2009 | Gumbrecht et al. |
| 2009/0325203 A1 | 12/2009 | Jenny et al. |
| 2009/0325276 A1 | 12/2009 | Battrell et al. |
| 2010/0041049 A1 | 2/2010 | Smith et al. |
| 2010/0112723 A1 | 5/2010 | Battrell et al. |
| 2010/0120129 A1 | 5/2010 | Amshey et al. |
| 2010/0291588 A1 | 11/2010 | McDevitt et al. |
| 2010/0303687 A1 | 12/2010 | Blaga et al. |
| 2011/0151479 A1 | 6/2011 | Stevens et al. |
| 2011/0207621 A1 | 8/2011 | Montagu et al. |
| 2012/0028342 A1 | 2/2012 | Ismagilov et al. |
| 2012/0064597 A1 | 3/2012 | Clemmens et al. |
| 2012/0071342 A1 | 3/2012 | Lochhead et al. |
| 2012/0115214 A1 | 5/2012 | Battrell et al. |
| 2012/0135511 A1 | 5/2012 | Battrell et al. |
| 2012/0156750 A1 | 6/2012 | Battrell et al. |
| 2012/0164383 A1 | 6/2012 | Sollmann |
| 2012/0164627 A1 | 6/2012 | Battrell et al. |
| 2012/0177543 A1 | 7/2012 | Battrell et al. |
| 2012/0329142 A1 | 12/2012 | Battrell et al. |
| 2013/0011912 A1 | 1/2013 | Battrell et al. |
| 2013/0032235 A1 | 2/2013 | Johnstone et al. |
| 2013/0115607 A1 | 5/2013 | Nielsen et al. |
| 2013/0130262 A1 | 5/2013 | Battrell et al. |
| 2014/0003493 A1 | 11/2014 | Battrell et al. |
| 2015/0158026 A1 | 6/2015 | Battrell et al. |
| 2015/0346097 A1 | 12/2015 | Battrell et al. |
| 2015/0352549 A1 | 12/2015 | Kolb et al. |
| 2016/0090588 A1 | 3/2016 | Lofquist et al. |
| 2016/0102340 A1 | 4/2016 | Bouzek |
| 2017/0113221 A1 | 4/2017 | Hoffman et al. |
| 2018/0292319 A1 | 10/2018 | Battrell et al. |

FOREIGN PATENT DOCUMENTS

| | | |
|---|---|---|
| CN | 1546863 A | 11/2004 |
| CN | 101588838 A | 11/2009 |
| CN | 102602087 A | 7/2012 |
| DE | 20 2004 012 163 U1 | 11/2004 |
| EP | 0 320 308 A2 | 6/1989 |
| EP | 0 329 822 A2 | 8/1989 |
| EP | 0 399 859 A1 | 11/1990 |
| EP | 0 517 631 A1 | 12/1992 |
| EP | 1 180 135 B1 | 8/2005 |
| EP | 1 659 405 A1 | 5/2006 |
| EP | 1 707 965 A1 | 10/2006 |
| EP | 1 726 940 A1 | 11/2006 |
| EP | 1 792 654 A2 | 6/2007 |
| EP | 2 202 328 A1 | 6/2010 |
| GB | 2 202 328 A | 9/1988 |
| JP | 52-55679 A | 5/1977 |
| JP | 61-137066 A | 6/1986 |
| JP | 7-151101 A | 6/1995 |
| JP | 2520468 Y2 | 9/1996 |
| JP | 10-82773 A | 3/1998 |
| JP | 10-504916 A | 5/1998 |
| JP | 11-508347 A | 7/1999 |
| JP | 2000-314719 A | 11/2000 |
| JP | 2003-166910 A | 6/2003 |
| JP | 2003-207454 A | 7/2003 |
| JP | 2004-028589 A | 1/2004 |
| JP | 2004-333452 A | 11/2004 |
| JP | 2005-512071 A | 4/2005 |
| JP | 2005-527303 A | 9/2005 |
| JP | 2005-531006 A | 10/2005 |
| JP | 2005-345378 A | 12/2005 |
| JP | 2006-73371 A | 3/2006 |
| JP | 2006-84459 A | 3/2006 |
| JP | 2006-90774 A | 4/2006 |
| JP | 2006-512092 A | 4/2006 |
| JP | 2006-122743 A | 5/2006 |
| JP | 2006-517029 A | 7/2006 |
| JP | 2006-227301 A | 8/2006 |
| JP | 2006-246777 A | 9/2006 |
| JP | 2006-520190 A | 9/2006 |
| JP | 2007-514142 A | 5/2007 |
| JP | 2007-532918 A | 11/2007 |
| JP | 2008-503722 A | 2/2008 |
| JP | 2008-89597 A | 4/2008 |
| JP | 2008-96375 A | 4/2008 |
| JP | 2008-537063 A | 9/2008 |
| JP | 2009-14529 A | 1/2009 |
| JP | 2009-019962 A | 1/2009 |
| JP | 2009-510337 A | 3/2009 |
| JP | 2009-513966 A | 4/2009 |
| JP | 2009-529883 A | 8/2009 |
| JP | 2009-255083 A | 11/2009 |
| JP | 2010-78508 A | 4/2010 |
| JP | 2010-519463 A | 6/2010 |
| JP | 2010-535346 A | 11/2010 |
| JP | 2012-516455 A | 7/2012 |
| JP | 2013-518289 A | 5/2013 |
| JP | 2015-510111 A | 4/2015 |
| JP | 2016-508197 A | 3/2016 |
| WO | 86/06488 A1 | 11/1986 |
| WO | 88/08534 A1 | 11/1988 |
| WO | 88/10315 A1 | 12/1988 |
| WO | 89/06700 A1 | 7/1989 |
| WO | 89/09284 A1 | 10/1989 |
| WO | 91/12336 A1 | 8/1991 |
| WO | 96/33399 A1 | 10/1996 |
| WO | 97/01055 A1 | 1/1997 |
| WO | 98/49543 A1 | 11/1998 |
| WO | 00/63670 A1 | 10/2000 |
| WO | 01/070381 A2 | 9/2001 |
| WO | 02/001184 A1 | 1/2002 |
| WO | 02/012896 A1 | 2/2002 |
| WO | 02/041994 A2 | 5/2002 |
| WO | 02/072262 A1 | 9/2002 |
| WO | 02/081934 A2 | 10/2002 |
| WO | 03/015923 A1 | 2/2003 |
| WO | 03/031977 A2 | 4/2003 |
| WO | 03/049860 A1 | 6/2003 |
| WO | 03/054523 A2 | 7/2003 |
| WO | 03/097831 A1 | 11/2003 |
| WO | 03/099355 A2 | 12/2003 |
| WO | 03/101887 A2 | 12/2003 |
| WO | 03/102546 A2 | 12/2003 |
| WO | 2004/055198 A2 | 7/2004 |
| WO | 2004/061085 A2 | 7/2004 |
| WO | 2004/065010 A2 | 8/2004 |
| WO | 2004/065930 A2 | 8/2004 |
| WO | 2005/016529 A1 | 2/2005 |
| WO | 2005/022154 A1 | 3/2005 |
| WO | 2005/066638 A1 | 7/2005 |
| WO | 2005/069015 A1 | 7/2005 |
| WO | 2005/088280 A1 | 9/2005 |
| WO | 2005/102682 A2 | 11/2005 |
| WO | 2005/106024 A2 | 11/2005 |
| WO | 2005/118849 A1 | 12/2005 |
| WO | 2006/018811 A1 | 2/2006 |
| WO | 2006/035830 A1 | 4/2006 |
| WO | 2006/052652 A2 | 5/2006 |
| WO | 2006/076567 A2 | 7/2006 |
| WO | 2006/083833 A2 | 8/2006 |
| WO | 2006/125767 A1 | 11/2006 |
| WO | 2007/049009 A1 | 5/2007 |
| WO | 2007/064635 A1 | 6/2007 |

(56) References Cited

FOREIGN PATENT DOCUMENTS

| WO | 2007/106579 A2 | 9/2007 |
|---|---|---|
| WO | 2007/106580 A2 | 9/2007 |
| WO | 2007/109584 A1 | 9/2007 |
| WO | 2007/137291 A1 | 11/2007 |
| WO | 2008/002462 A2 | 1/2008 |
| WO | 2008/036544 A1 | 3/2008 |
| WO | 2008/070198 A2 | 6/2008 |
| WO | 2008/101732 A1 | 8/2008 |
| WO | 2008/147382 A1 | 12/2008 |
| WO | 2009/018473 A1 | 2/2009 |
| WO | 2009/037361 A1 | 3/2009 |
| WO | 2009/105711 A1 | 8/2009 |
| WO | 2010/025302 A2 | 3/2010 |
| WO | 2010/036072 A2 | 4/2010 |
| WO | 2010/088514 A1 | 8/2010 |
| WO | 2011/094577 A2 | 8/2011 |
| WO | 2012/055446 A1 | 5/2012 |
| WO | 2012/071069 A1 | 5/2012 |
| WO | 2013/010674 A1 | 1/2013 |
| WO | 2013/052318 A1 | 4/2013 |
| WO | 2014/100732 A1 | 6/2014 |
| WO | 2014/182847 A1 | 11/2014 |

OTHER PUBLICATIONS

Aoki et al., "Serine Repeat Antigen (SERA5) Is Predominantly Expressed among the SERA Multigene Family of Plasmodium falciparum, and the Acquired Antibody Titers Correlate with Serum Inhibition of the Parasite Growth," *The Journal of Biological Chemistry* 277(49):47533-47540, Dec. 2002.
Arar et al., "Synthesis and Antiviral Activity of Peptide-Oligonucleotide Conjugates Prepared by Using $N_\alpha$-(Bromoacetyl)peptides," *Bioconjugate Chem.* 6(5):573-577, 1995.
Arikan et al., "Anti-Kp 90 IgA Antibodies in the Diagnosis of Active Tuberculosis," *CHEST* 114(5): 1253-1257, Nov. 1998.
Birkelund, "The molecular biology and diagnostics of Chlamydia trachomatis," *Danish Medical Bulletin* 39(4):304-320, Aug. 1992.
Bongartz et al., "Improved biological activity of antisense oligonucleotides conjugated to a fusogenic peptide," *Nucleic Acids Research* 22(22):4681-4688, 1994.
Bowden et al., "Using Self-Administered Tampons to Diagnose STDs," *Aids Patient Care and STDs* 12(1):29-32, 1998.
C. Fredrick Battrell et al., "Portable Fluorescence Detection System and Microassay Cartridge," U.S. Appl. No. 14/653,726, filed Jun. 18, 2015, 78 pages.
Cady, "Quantum dot Molecular Beacons for DNA Detection," in *Micro and Nano Technologies in Bioanalysis*, Lee et al., (eds.), Humana Press, 2009, pp. 367-379.
Cai et al., "Interactions of DNA with Clay Minerals and Soil Colloidal Particles and Protection against Degradation by DNase," *Environ. Sci. Technol.* 40:2971-2976, 2006.
Chan et al., "Polymer surface modification by plasmas and photons," *Surface Science Reports* 24:1-54, 1996.
Chernesky et al., "Clinical Evaluation of the Sensitivity and Specificity of a Commercially Available Enzyme Immunoassay for Detection of Rubella Virus-Specific Immunoglobulin M," *J. Clin. Microbiol.* 20(3):400-404, Sep. 1984.
Chernesky et al., "Detection of Chlamydia trachomatis Antigens by Enzyme Immunoassay and Immunofluorescence in Genital Specimens from Symptomatic and Asymptomatic Men and Women," *The Journal of Infectious Diseases* 154(1): 141-148, Jul. 1986.
Chou et al., "Prevention of pre-PCR mis-priming and primer dimerization improves low-copy-number amplifications," *Nucleic Acids Research* 20(1):1717-1723, 1992.
Cissell et al., "Resonance energy transfer methods of RNA detection," *Analytical and Bioanalytical Chemistry* 393(1):125-135, 2009.
Crotchfelt et al., "Detection of Neisseria gonorrhoeae and Chlamydia trachomatis in Genitourinary Specimens from Men and Women by a Coamplification PCR Assay," *J. Clin. Microbiol.* 35(6):1536-1540, Jun. 1997.

Cuzzubbo et al., "Use of Recombinant Envelope Proteins for Serological Diagnosis of Dengue Virus Infection in an Immunochromatographic Assay," *Clin. Diagn. Lab. Immunol.* 8(6):1150-1155, 2001.
D'Aquila et al., "Maximizing sensitivity and specificity of PCR by pre-amplification heating," *Nucleic Acids Research* 19(13):3749, 1991.
Dean et al., "Comprehensive human genome amplification using multiple displacement amplification," *PNAS* 99(8):5261-5266, Apr. 2002.
Detter et al., "Isothermal Strand-Displacement Amplification Applications for High-Throughput Genomics," *Genomics* 80(6):691-698, Dec. 2002.
Edelstein et al., "The BARC biosensor applied to the detection of biological warfare agents," *Biosensors & Bioelectronics* 14:805-813, 2000.
Eritja et al., "Synthesis of Defined Peptide-Oligonucleotide Hybrids Containing a Nuclear Transport Signal Sequence," *Tetrahedron* 47(24):4113-4120, 1991.
Fontana et al., "Performance of Strand Displacement Amplification Assay in the Detection of Chlamydia trachomatis and Neisseria gonorrhoeae," *Jpn. J. Infect. Dis.* 58:283-288, 2005.
Frame et al., "Identification and Typing of Herpes Simplex Virus by Enzyme Immunoassay with Monoclonal Antibodies," *J. Clin. Microbiol.* 20(2):162-166, Aug. 1984.
Freund et al., (eds.), "Film buckling, bulging, and peeling," in *Thin Film Materials: Stress, Defect Formation and Surface Evolution*, Cambridge, UK, The University of Cambridge, 2003, pp. 312-386.
Frohman, "Race: Rapid Amplification of cDNA Ends," in *PCR Protocols: A Guide to Methods and Applications*, Innis et al., (eds.), New York, Academic Press, Inc., 1990, pp. 28-38.
Gallo et al., "Study of viral integration of HPV-16 in young patients with LSIL," *J Clin Pathol* 56:532-536, 2003.
Garbassi et al., *Polymer Surfaces—From Physics to Technology*, John Wiley and Sons, Baltimore, Md., 1998, pp. 238-241.
Ghai et al., "Identification, expression, and functional characterization of MAEBL, a sporozoite and asexual blood stage chimeric erythrocyte-binding protein of Plasmodium falciparum," *Molecular & Biochemical Parasitology* 123:35-45, 2002.
Gijs, "Magnetic bead handling on-chip: new opportunities for analytical applications," *Microfluid Nanofluid* 1:22-40, 2004.
Gomes et al., "Immunoreactivity and differential developmental expression of known and putative Chlamydia trachomatis membrane proteins for biologically variant serovars representing distinct disease groups," *Microbes and Infection* 7:410-420, 2005.
Graham et al., "Magnetoresistive-based biosensors and biochips," *TRENDS in Biotechnology* 22(9):455-462, Sep. 2004.
Graves et al., "Development of Antibody to Measles Virus Polypeptides During Complicated and Uncomplicated Measles Virus Infections," *Journal of Virology* 49(2):409-412, Feb. 1984.
Grover et al., "Monolithic membrane valves and diaphragm pumps for practical large-scale integration into glass microfluidic devices," *Sensors and Actuators B* 89:315-323, 2003.
Hardt et al., "Passive micromixers for applications in the microreactor and mTAS fields," *Microfluid Nanofluid* 1:108-118, 2005.
Harris et al., "Typing of Dengue Viruses in Clinical Specimens and Mosquitoes by Single-Tube Multiplex Reverse Transcriptase PCR," *J. Clin. Microbiol.* 36(9):2634-2639, Sep. 1998.
Harrison et al., "Synthesis and hybridization analysis of a small library of peptide-oligonucleotide conjugates," *Nucleic Acids Research* 26(13):3136-3145, 1998.
Huft et al., "Fabrication of High-Quality Microfluidic Solid-Phase Chromatography Columns," *Analytical Chemistry* 85:1797-1802, 2013.
Hummel et al., "Development of quantitative gene-specific real-time RT-PCR assays for the detection of measles virus in clinical specimens," *Journal of Virological Methods* 132:166-173, 2006.
Hung et al., "A specificity enhancer for polymerase chain reaction," *Nucleic Acids Research* 18(16):4953, Jun. 1990.
Innis et al., (eds.), *PCR Protocols: A Guide to Methods and Applications*, Academic Press, Inc., San Diego, California, 1990, 480 pages.

(56) References Cited

OTHER PUBLICATIONS

Jacobs et al., "Detection of *Streptococcus pneumoniae* Antigen in Bronchoalveolar Lavage Fluid Samples by a Rapid Immunochromatographic Membrane Assay," *J. Clin. Microbiol.* 43(8):4037-4040, 2005.

Joung et al., "Micropumps Based on Alternating High-Gradient Magnetic Fields," *IEEE Transactions on Magnetics* 36(4):2012-2014, Jul. 2000.

Kanehisa, "Use of statistical criteria for screening potential homologies in nucleic acid sequences," *Nucleic Acids Research* 72(1):203-213, Jan. 1984.

Kellogg et al., "TaqStart Antibody: "Hot Start" PCR Facilitated by a Neutralizing Monoclonal Antibody Directed Against Taq DNA Polymerase," *BioTechniques* 16(6):1134-1137, Jun. 1994.

Kennedy et al., "Protein-Protein Coupling Reactions and the Applications of Protein Conjugates," *Clinica Chimica Acta* 70(1):1-31, Jul. 1976.

Khan et al., "Antibiotic Resistance, Virulence Gene, and Molecular Profiles of Shiga Toxin-Producing *Escherichia coli* Isolates from Diverse Sources in Calcutta, India," *J. Clin. Microbiol.* 40(6):2009-2015, Jun. 2002.

Khan et al., "Prevalence and Genetic Profiling of Virulence Determinants of Non-O157 Shiga Toxin-Producing *Escherichia coli* Isolated from Cattle, Beef, and Humans, Calcutta, India," *Emerging Infectious Diseases* 8(1):54-62, Jan. 2002.

Khanna et al., "Transformation of Bacillus subtilis by DNA Bound on Montmorillonite and Effect of DNase on the Transforming Ability of Bound DNA," *Applied and Environmental Microbiology* 58(6):1930-1939, Jun. 1992.

Kittigul et al., "Use of a Rapid Immunochromatographic Test for Early Diagnosis of Dengue Virus Infection," *Eur. J. Clin. Microbiol. Infect. Dis.* 21(3):224-226, Mar. 2002.

Knox et al., "Evaluation of Self-Collected Samples in Contrast to Practitioner-Collected Samples for Detection of Chlamydia trachomatis, Neisseria gonorrhoeae, and Trichomonas vaginalis by Polymerase Chain Reaction Among Women Living in Remote Areas," *Sexually Transmitted Diseases* 29(11):647-654, Nov. 2002.

Krasnoperov et al., "Luminescent Probes for Ultrasensitive Detection of Nucleic Acids," *Bioconjug. Chem.* 27(2):319-327, Feb. 2010.

Kremer et al., "Measles Virus Genotyping by Nucleotide-Specific Multiplex PCR," *J. Clin. Microbiol.* 42(7):3017-3022, Jul. 2004.

Kuipers et al., "Detection of Chlamydia trachomatis in peripheral blood leukocytes of reactive arthritis patients by polymerase chain reaction," *Arthritis & Rheumatism* 41(10):1894-1895, Oct. 1998.

Kuipers et al., "Sensitivities of PCR, MicroTrak, ChlamydiaEIA, IDEIA, and PACE 2 for Purified Chlamydia trachomatis Elementary Bodies in Urine, Peripheral Blood, Peripheral Blood Leukocytes, and Synovial Fluid," *J. Clin. Microbiol.* 33(12):3 186-3190, Dec. 1995.

Kuno, "Universal diagnostic RT-PCR protocol for arboviruses," *Journal of Virological Methods* 72:27-41, 1998.

Kwoh et al., "Transcription-based amplification system and detection of amplified human immunodeficiency virus type 1 with a bead-based sandwich hybridization format," *Proc. Natl. Acad. Sci. U.S.A.* 86:1173-1177, Feb. 1989.

Lage et al., "Whole Genome Analysis of Genetic Alterations in Small DNA Samples Using Hyperbranched Strand Displacement Amplification and Array-CGH," *Genome Research* 13:294-307, 2003.

Lanciotti et al., "Rapid Detection and Typing of Dengue Viruses from Clinical Samples by Using Reverse Transcriptase-Polymerase Chain Reaction," *J. Clin. Microbiol.* 30(3):545-551, Mar. 1992.

Leclerc et al., "Meager genetic variability of the human malaria agent Plasmodium vivax," *PNAS* 101(40):14455-14460, Oct. 5, 2004.

Lee et al., "Implementation of Force Differentiation in the Immunoassay," *Analytical Biochemistry* 287:261-271, 2000.

Leung et al., "Rapid antigen detection testing in diagnosing group A b-hemolytic streptococcal pharyngitis," *Expert. Rev. Mol. Diagn.* 6(5):761-766, 2006.

Li et al., "Molecular Beacons: an optimal multifunctional biological probe," *Biochemical and Biophysical Research Communications* 373:457-461, 2008.

Lindegren et al., "Optimized Diagnosis of Acute Dengue Fever in Swedish Travelers by a Combination of Reverse Transcription-PCR and Immunoglobulin M Detection," *J. Clin. Microbiol.* 43(6):2850-2855, Jun. 2005.

Ling et al., "The Plasmodium falciparum clag9 gene encodes a rhoptry protein that is transferred to the host erythrocyte upon invasion," *Molecular Microbiology* 52(1):107-118, 2004.

Lundquist et al., "Human Recombinant Antibodies against Plasmodium falciparum Merozoite Surface Protein 3 Cloned from Peripheral Blood Leukocytes of Individuals with Immunity to Malaria Demonstrate Antiparasitic Properties," *Infect. Immun.* 74(6):3222-3231, Jun. 2006.

Luxton et al., "Use of External Magnetic Fields to Reduce Reaction Times in an Immunoassay Using Micrometer-Sized Paramagnetic Particles as Labels (Magnetoimmunoassay)," *Anal. Chem.* 75(6):1715-1719, Mar. 2004.

Mahony et al., "Chlamydia trachomatis confirmatory testing of PCR-positive genitourinary specimens using a second set of plasmid primers," *Molecular and Cellular Probes* 6:381-388, 1992.

Mahony et al., "Comparison of Plasmid- and Chromosome-Based Polymerase Chain Reaction Assays for Detecting Chlamydia trachomatis Nucleic Acids," *J. Clin. Microbiol.* 31(7):1753-1758, Jul. 1993.

Mahony et al., "Detection of Antichlamydial Immunoglobulin G and M Antibodies by Enzyme-Linked Immunosorbent Assay," *J Clin. Microbiol.* 18(2):270-275, Aug. 1983.

Mahony et al., "Multiplex PCR for Detection of Chlamydia trachomatis and Neisseria gonorrhoeae in Genitourinary Specimens," *J. Clin. Microbiol.* 33(11):3049-3053, Nov. 1995.

Mahony, "Multiplex Polymerase Chain Reaction for the Diagnosis of Sexually Transmitted Diseases," *Clinics in Laboratory Medicine* 16(1):61-71, Mar. 1996.

Mayta et al., "Use of a reliable PCR assay for the detection of Neisseria gonorrhoeae in Peruvian patients," *Clinical Microbiology and Infection* 72(8):809-812, Aug. 2006.

Michon et al., "Naturally Acquired and Vaccine-Elicited Antibodies Block Erythrocyte Cytoadherence of the Plasmodium vivax Duffy Binding Protein," *Infect. Immun.* 68(6):3 164-3171, Jun. 2000.

Migot-Nabias et al., "Immune Responses Against Plasmodium Falciparum Asexual Blood-Stage Antigens and Disease Susceptibility in Gabonese and Cameroonian Children," *Am. J. Trop. Med. Hyg.* 61(3):488-494, 1999.

Mitrani-Rosenbaum et al., "Simultaneous detection of three common sexually transmitted agents by polymerase chain reaction," *Am J Obstet Gynecol* 171(3):784-790, Sep. 1994.

Mohmmed et al., "Identification of karyopherin b as an immunogenic antigen of the malaria parasite using immune mice and human sera," *Parasite Immunology* 27:197-203, 2005.

Monis et al., "Nucleic acid amplification-based techniques for pathogen detection and identification," *Infection, Genetics and Evolution* 6:2-12, 2006.

Morré et al., "RNA Amplification by Nucleic Acid Sequence-Based Amplification with an Internal Standard Enables Reliable Detection of Chlamydia trachomatis in Cervical Scrapings and Urine Samples," *J. Clin. Microbiol.* 34(12):3108-3114, Dec. 1996.

Narum et al., "A novel Plasmodium falciparum erythrocyte binding protein-2 (EBP2/BAEBL) involved in erythrocyte receptor binding," *Molecular & Biochemical Parasitology* 119:159-168, 2002.

NCBI Database, GenBank Accession No. ACOL01000910, Jun. 9, 2009.

NCBI Database, GenBank Accession No. ACOL01004315, Jun. 9, 2009.

NCBI Database, GenBank Accession No. ACOL01004318, Jun. 9, 2009.

NCBI Database, GenBank Accession No. ACOL01004329, Jun. 9, 2009.

NCBI Database, GenBank Accession No. ACOL01004331, Jun. 9, 2009.

(56) References Cited

OTHER PUBLICATIONS

NCBI Database, GenBank Accession No. NP_473155, Jan. 3, 2007.
Nielsen et al., "Detection of Immunoglobulin G Antibodies to Cytomegalovirus Antigens by Antibody Capture Enzyme-Linked Immunosorbent Assay," *J. Clin. Microbiol.* 24(6):998-1003, Dec. 1986.
Notomi et al., "Loop-mediated isothermal amplification of DNA," *Nucleic Acids Research* 28(12):2-7, 2000.
Oeuvray et al., "Merozoite Surface Protein-3: A Malaria Protein Inducing Antibodies that Promote Plasmodium falciparum Killing by Cooperation With Blood Monocytes," *Blood* 84(5):1594-1602, Sep. 1994.
Oh, Il Kwon et al., "Micro Pump Using Snap-Thorugh", English Machine Translation from WIPO, published Apr. 1, 2010, retrieved Sep. 10, 2019, pp. 1-12.
Ohara et al., "One-sided polymerase chain reaction: The amplification of cDNA," *Proc. Natl. Acad. Sci. U.S.A.* 86:5613-5611, Aug. 1989.
Ohta et al., "Enzyme-Linked Immunosorbent Assay of Influenza Specific IgA Antibody in Nasal Mucus," *Acta Paediatr Jpn.* 33(5):617-622, Oct. 1991.
Østergaard et al., "A novel approach to the automation of clinical chemistry by controlled manipulation of magnetic particles," *Journal of Magnetism and Magnetic Materials* 194:156-162, 1999.
Ozoemena et al., "Comparative Evaluation of Measles Virus Specific TaqMan PCR and Conventional PCR Using Synthetic and Natural RNA Templates," *Journal of Medical Virology* 73:79-84, 2004.
Park et al., "Polymorphisms of p53, p21 and IRF-1 and cervical cancer susceptibility in Korean women," *Proceedings of the American Association of Cancer Research* 44, Second Edition, p. 1081, Jul. 2003.
Pfyffer et al., "Diagnostic Performance of Amplified *Mycobacterium tuberculosis* Direct Test with Cerebrospinal Fluid, Other Nonrespiratory, and Respiratory Specimens," *Journal of Clinical Microbiology* 34(4):834-841, Apr. 1996.
Pinder et al., "Immunoglobulin G Antibodies to Merozoite Surface Antigens Are Associated with Recovery from Choroquine-Resistant Plasmodium falciparum in Gambian Children," *Infect. Immun.* 74(5):2887-2893, May 2006.
Pingle et al., "Multiplexed Identification of Blood-Borne Bacterial Pathogens by Use of a Novel 16S rRNA Gene PCR-Ligase Detection Reaction-Capillary Electrophoresis Assay," *J. Clin. Microbiol.* 45(6):1927-1935, Jun. 2007.
Polley et al., "Vaccination for vivax malaria: targeting the invaders," *TRENDS in Parasitology* 20(3):99-102, Mar. 2004.
Porstmann et al., "Comparison of Chromogens for the Determination of Horseradish Peroxidase as a Marker in Enzyme Immunoassay," *J. Clin. Chem. Clin. Biochem.* 19(7):435-439, 1981.
Ramachandran et al., "Dry-reagent storage for disposable lab-on-a-card diagnosis of enteric pathogens," Proceedings of the 1st Distributed Diagnosis and Home Healthcare (D2H2) Conference, Arlington, Virginia, USA, Apr. 2-4, 2006, 4 pages.
Ranjan et al., "Mapping regions containing binding residues within functional domains of Plasmodium vivax and Plasmodium knowlesi erythrocyte-binding proteins," *PNAS* 96(24):14067-14072, Nov. 1999.
Rida et al., "Long-range transport of magnetic microbeads using simple planar coils placed in a uniform magnetostatic field," *Applied Physics Letters* 83(12):2396-2398, Sep. 2003.
Roosendaal et al., "Comparison of different primer sets for detection of Chlamydia trachomatis by the polymerase chain reaction," *J. Med. Microbiol.* 38:426-433, 1993.
Schachter et al., "Ligase Chain Reaction to Detect Chlamydia trachomatis Infection of the Cervix," *J. Clin. Microbiol.* 32(10):2540-2543, Oct. 1994.
Shi et al., "Fabrication and optimization of the multiplex PCR-based oligonucleotide microarray for detection of Neisseria gonorrhoeae, Chlamydia trachomatis and Ureaplasma urealyticum," *Journal of Microbiological Methods* 62:245-256, 2005.
Shi et al., "Natural Immune Response to the C-Terminal 19-Kilodalton Domain of Plasmodium falciparum Merozoite Surface Protein 1," *Infect. Immun.* 64(7):2716-2723, Jul. 1996.
Shu et al., "Development of Group- and Serotype-Specific One-Step SYBR Green I-Based Real-Time Reverse Transcription-PCR Assay for Dengue Virus," *J. Clin. Microbiol.* 47(6):2408-2416, Jun. 2003.
Snounou et al., "High sensitivity of detection of human malaria parasites by the use of nested polymerase chain reaction," *Molecular and Biochemical Parasitology* 62:315-320, 1993.
Soukchareun et al., "Use of Na-Fmoc-cysteine(S-thiobutyl) Derivatized Oligodeoxynucleotides for the Preparation of Oligodeoxynucleotide-Peptide Hybrid Molecules," *Bioconjugate Chem.* 9:466-475, 1998.
Staben et al., "Particle transport in Poiseuille flow in narrow channels," *International Journal of Multiphase Flow* 32:529-547, 2005.
Stetsenko et al., "Efficient Conjugation of Peptides to Oligonucleotides by 'Native Ligation'," *J. Org. Chem.* 65:4900-4908, 2000.
Sturm et al., "Vaginal tampons as specimen collection device for the molecular diagnosis of nonulcerative sexually transmitted infections in antenatal clinic attendees," *International Journal of STD & AIDS* 15:94-98, Feb. 2004.
Tai et al., "Artificial Receptors in Serologic Tests for the Early Diagnosis of Dengue Virus Infection," *Clinical Chemistry* 52(8):1486-1491, 2006.
Tamim et al., "Cervicovaginal coinfections with human papillomavirus and chlamydia trachomatis," *Diagnostic Microbiology and Infectious Disease* 43:277-281, 2002.
TechNote 303, "Lateral Flow Tests," Bangs Laboratories, Inc., Rev. #002, Apr. 11, 2008, pp. 1-7.
Tongren et al., "Target Antigen, Age, and Duration of Antigen Exposure Independently Regulate Immunoglobulin G Subclass Switching in Malaria," *Infect. Immun.* 74(1):257-264, Jan. 2006.
Trenholme et al., "Antibody Reactivity to Linear Epitopes of Plasmodium Falciparum Cytoadherence-linked asexual gene 9 in asymptomatic children and adults from Papua New Guinea." *Am. J. Trop. Med. Hyg.* 72(6):708-713, 2005.
Tung et al., "Preparation and Applications of Peptide-Oligonucleotide Conjugates," *Bioconjugate Chem.* 11(5):605-618, Sep./Oct. 2000.
Tung et al., "Preparation of Oligonucleotide-Peptide Conjugates," *Bioconjugate Chem.* 2:464-465, 1991.
Unger et al., "Monolithic Microfabricated Valves and Pumps by Multilayer Soft Lithography," *Science* 288:113-116, Apr. 2000.
Van Gemen et al., "Quantification of HIV-1 RNA in plasma using NASBAä during HIV-1 primary infection," *Journal of Virological Methods* 43:177-188, 1993.
Van Lintel, "A Piezoelectric Micropump Based on Micromachining of Silicon," *Sensors and Actuators* 15:153-167, 1988.
Vinayagamoorthy et al., "Nucleotide Sequence-Based Multitarget Identification," *J. Clin. Microbiol.* 41(7):3284-3292, Jul. 2003.
Vivès et al., "Selective Coupling of a Highly Basic Peptide to an Oligonucleotide," *Tetrahedron Letters* 38(7): 1183-1186, 1997.
Walker et al., "Strand displacement amplification—an isothermal, in vitro DNA amplification technique," *Nucleic Acids Research* 20(7):1691-1696, 1992.
Walker, "Empirical Aspects of Strand Displacement Amplification," *PCR Methods and Applications* 3:1-6, 1993.
Wang et al., "Molecular engineering of DNA:molecular beacons," *Angew Chem Int Ed Engl* 48(5):856-870, 2009.
Watson et al., Molecular Biology of the Gene, 4th Ed., Benjamin Cummings Publishing Company, Menlo Park, California, Jan. 1987.
Weigl et al., "Fully integrated multiplexed lab-on-a-card assay for enteric pathogens," Proc. of SPIE 6112:611202, 2006. (11 pages).
Weinstock et al., "Sexually Transmitted Diseases Among American Youth: Incidence and Prevalence Estimates, 2000," *Perspectives on Sexual and Reproductive Heath* 36(1):6-10, Jan./Feb. 2004.
Whiley et al., "Comparison of three in-house multiplex PCR assays for the detection of Neisseria gonorrhoeae and Chlamydia trachomatis using real-time and conventional detection methodologies," *Pathology* 37(5):364-370, Oct. 2005.
Witkin et al., "Detection of Chlamydia trachomatis by the polymerase chain reaction in the cervices of women with acute salpingitis," *Am J Obstet Gynecol* 168(5): 1438-1442, May 1993.

(56) References Cited

OTHER PUBLICATIONS

Woehlbier et al., "Analysis of Antibodies Directed against Merozoite Surface Protein 1 of the Human Malaria Parasite Plasmodium falciparum," *Infect. Immun.* 74(2):1313-1322, Feb. 2006.
Wu et al., "The Ligation Amplification Reaction (LAR)—Amplification of Specific DNA Sequences Using Sequential Rounds of Template-Dependent Ligation," *Genomics* 4:560-569, 1989.
Yogi et al., "Clinical Evaluation of the Bladder Tumor Marker "TU-MARK-BTA"," *Hinyokika Kiyo* 37(4):335-339, Apr. 1991.
Zhang et al., "Synthesis of clay minerals," *Applied Clay Science* 50:1-11, 2010.
Carmona et al., "The use of fluorescence resonance energy transfer (FRET) peptides for measurement of clinically important proteolytic enzymes," An Acad Bras Cienc 81 (3): 381-392, 2009.

\* cited by examiner

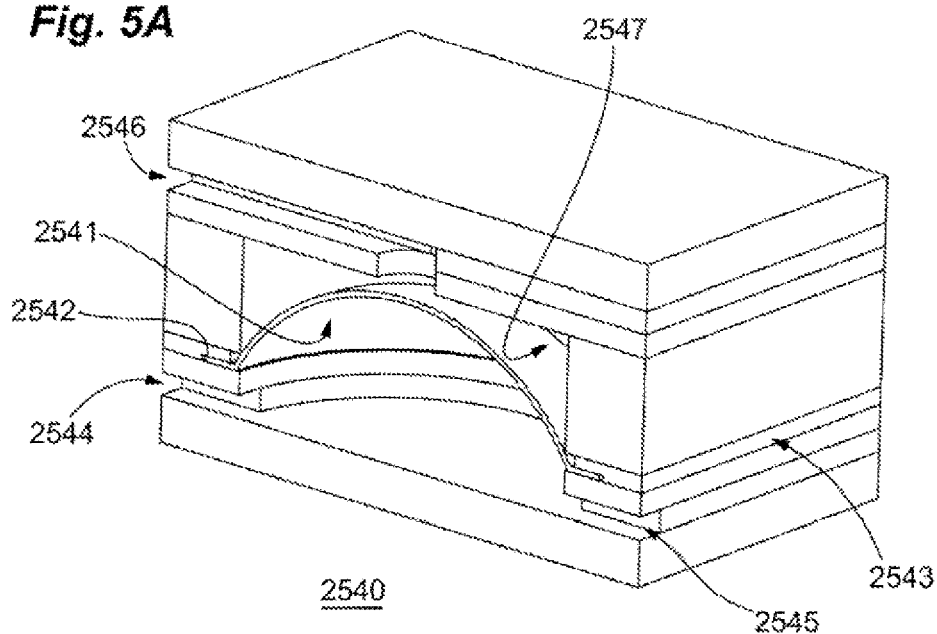
*Fig. 5A*
*Fig. 5B*
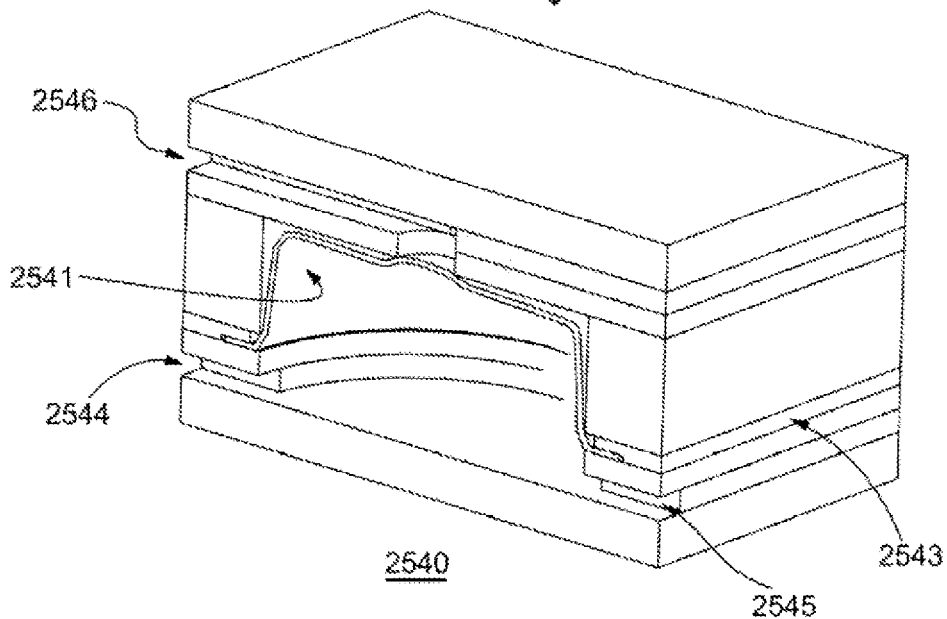

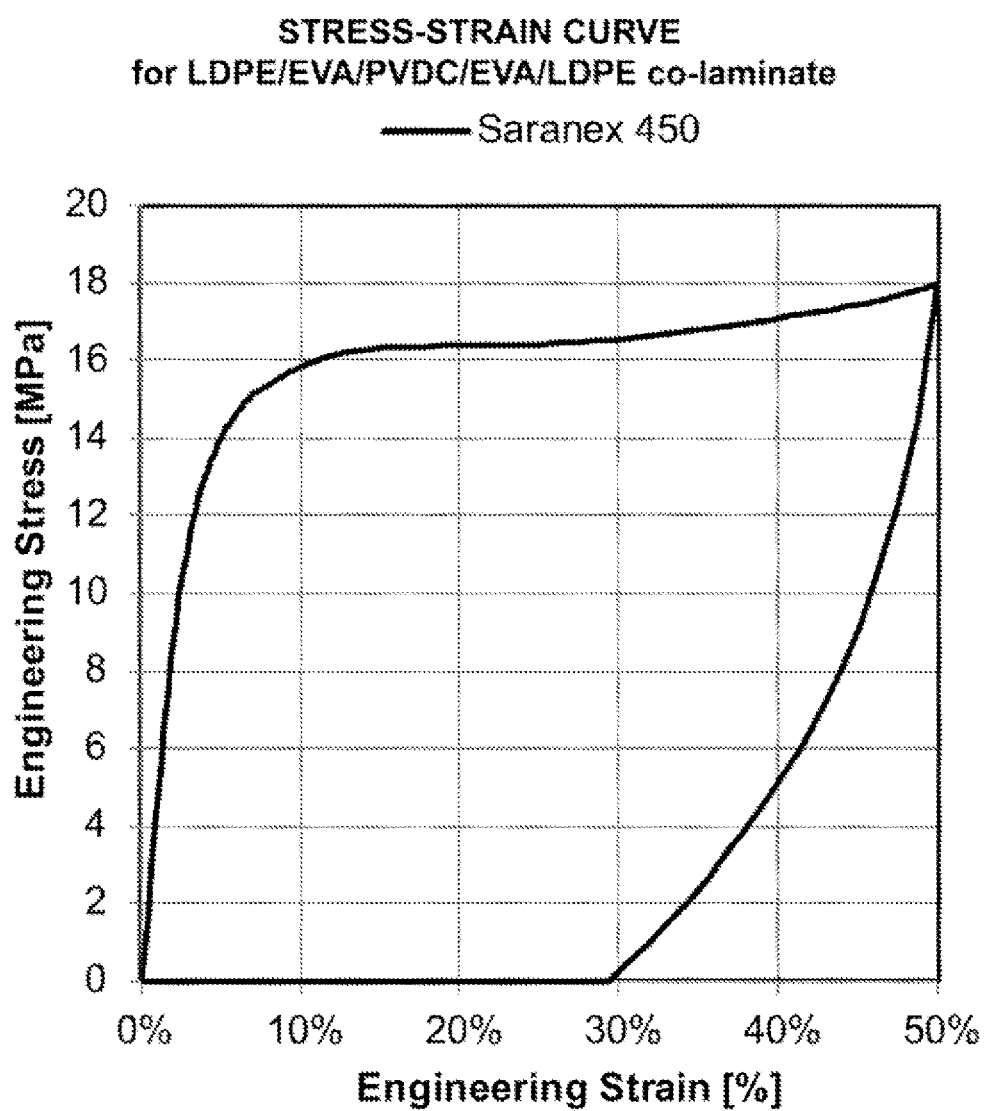

*Fig. 16A*
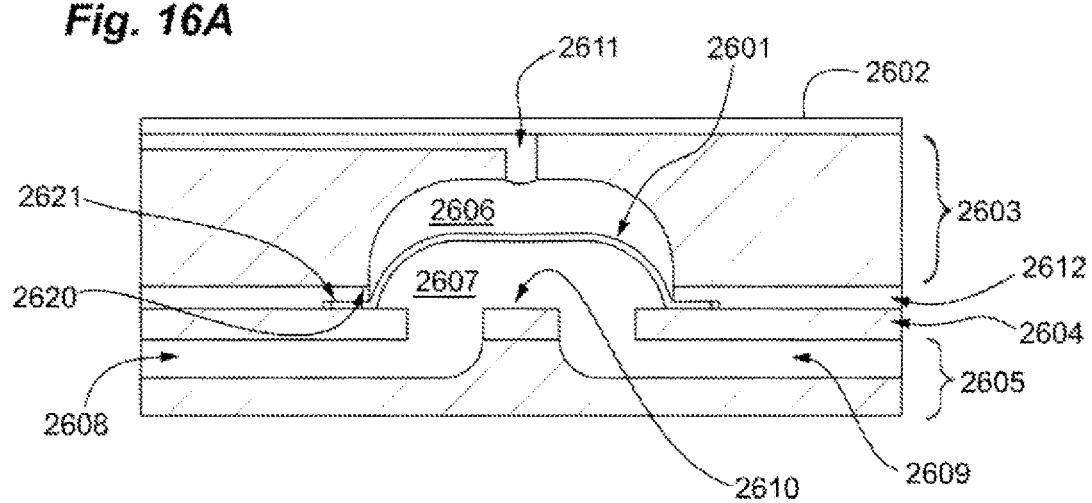
"OPEN"
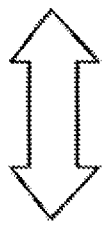
"OFF"
*Fig. 16B*
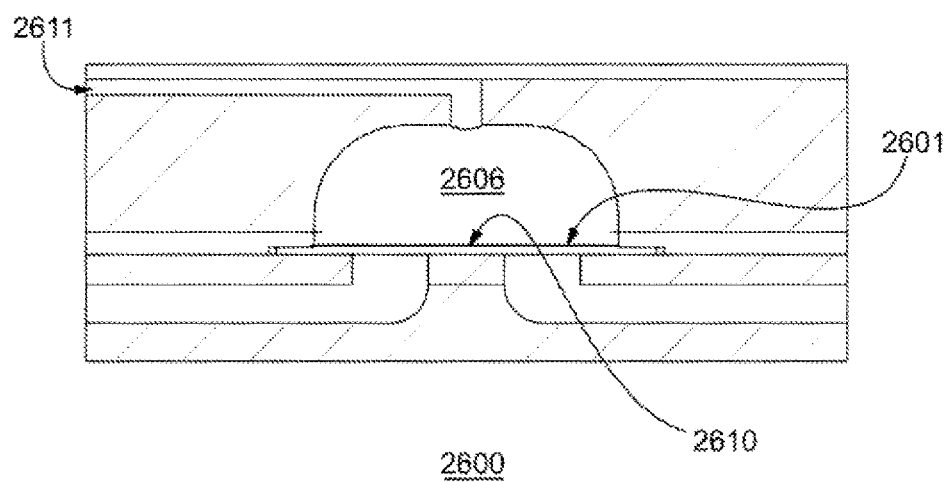

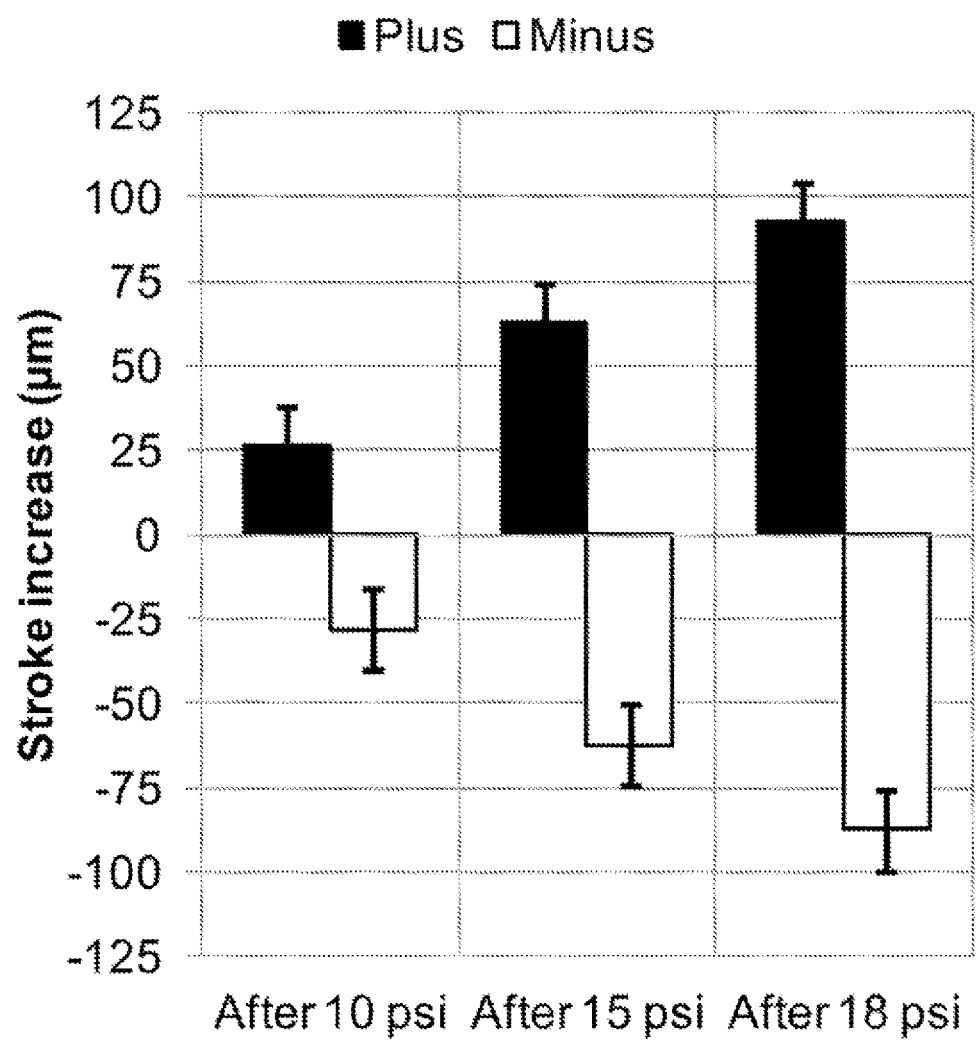

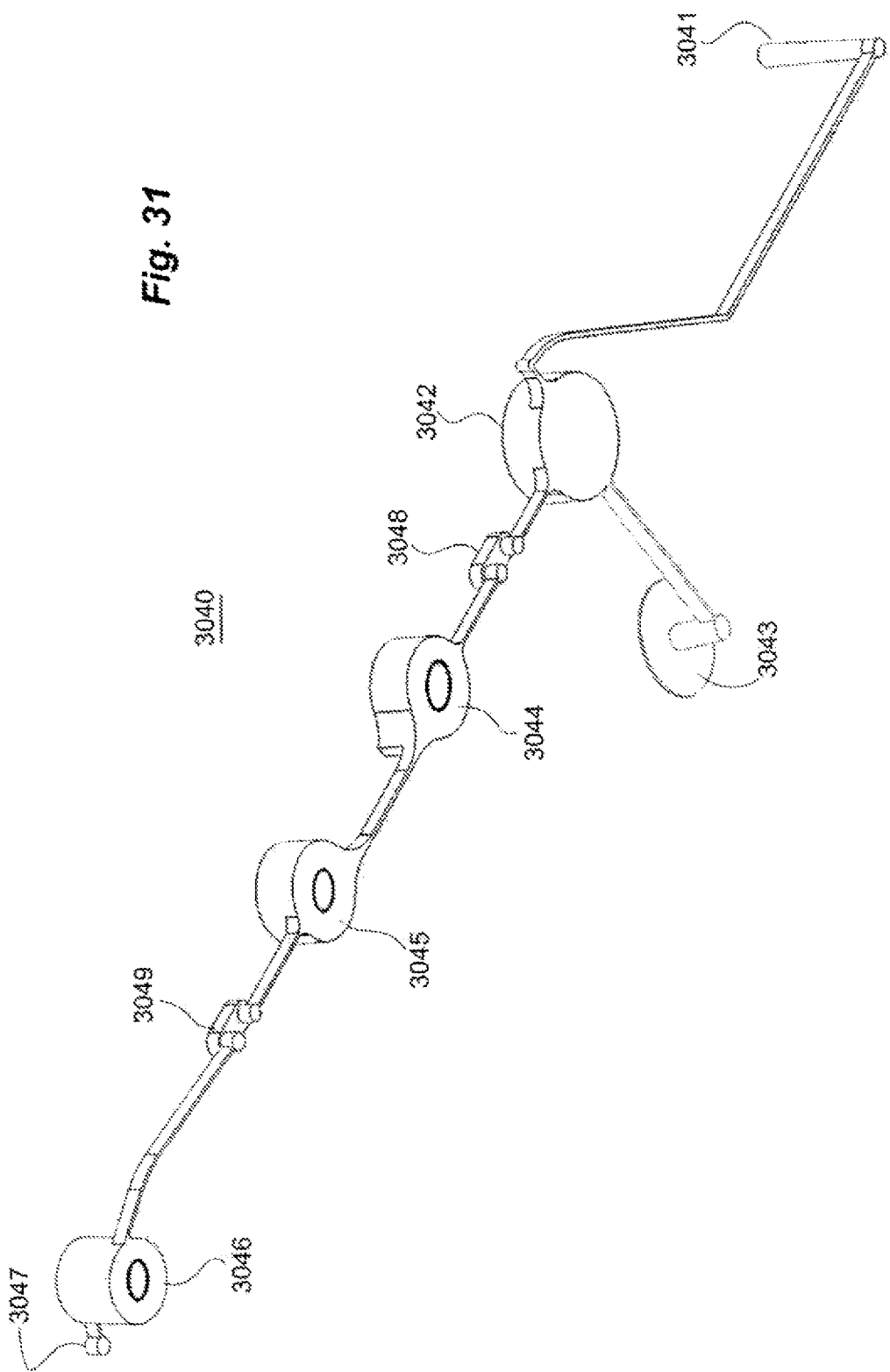

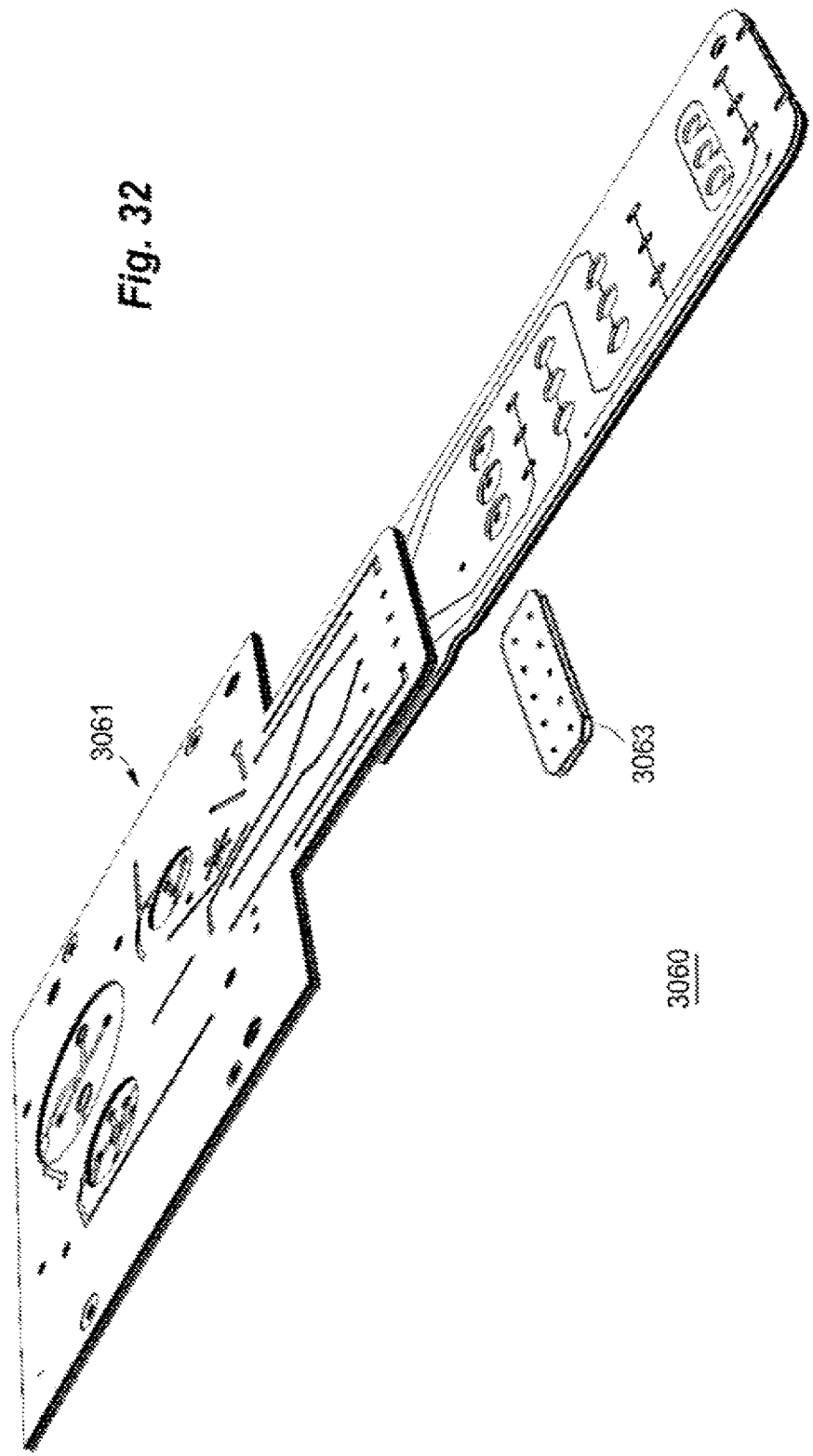

*Fig. 33*

| POLYMER FILM | Yield Stress [7] (MPa) |
|---|---|
| Polyethylene Terephthalate (PET, biaxially oriented)[1] | 116.0 |
| Polyethylene Terephthalate (PET, biaxially oriented)[2] | 99.9 |
| High Density Polyethylene (HDPE)[3] | 29.8 (26 - 33) |
| LDPE/EVA/PVDC/EVA/LDPE[4] co-laminate | 15.4 |
| Linear Low Density Polyethylenes | (1.8 - 20.3) |
| Low Density Polyethylene (LDPE)[5] | 10.3 (3.5 - 20.0) |
| Polyvinylidene Chloride | (9 - 12) |
| Ethylene Vinyl Acetate Copolymers | (8 - 10) |
| Polytetrafluoroether, microporous[6] | 2.2 |

1 - Mylar® 1 mil Dupont Teijin Films (Hopewell VA) determined here experimentally, Instron, RT, strain rate 150 mm/min, gauge length 1.5 cm between clamps 2 - Mylar® 2.5 mil, per ASTM std test (ASTM Intl, 2010. Publ D882-10 "Standard Test Method for Tensile Properties of Thin Plastic Sheeting", pp 1-10

3 - HDPE 1 mil per ASTM std test (ASTM Intl, 2010. Publ D882-10 "Standard Test Method for Tensile Properties of Thin Plastic Sheeting", pp 1-10

4 - Saranex 450® 1 mil (Dow, Newark DE) data determined here experimentally, Instron, RT, strain rate 150 mm/min, gauge length 1.5 cm between clamps 5 - LDPE 1 mil per ASTM std test (ASTM Intl, 2010. Publ D882-10 "Standard Test Method for Tensile Properties of Thin Plastic Sheeting", pp 1-10

6 - Mupor® 1 mil (Porex, Fairburn GA) data determined here experimentally, Instron, RT, strain rate 150 mm/min, gauge length 1.5 cm between clamps 7 - Parentheses indicate literature ranges

LOW ELASTICITY FILMS FOR MICROFLUIDIC USE

BACKGROUND

Technical Field

This disclosure is generally directed to diaphragm technologies for microvalves, micropumps and other pneumatic fluidic elements for use in microassay devices, and to their methods of manufacture.

Description of the Related Art

Microassay cartridges have found increasing use as devices for diagnostic assays. The devices described by Wilding in U.S. Pat. No. 5,304,487 consisted of "mesoscale" channels and chambers formed on reusable silicon substrates that were infused with fluid reagents from off-cartridge syringe pumps. Little consideration was given to on-board fluid handling and control. However, practical commercial applications have led in the direction of "consumable" cartridges—disposable, single use "sample-to-answer" cartridges that are self-contained for all reagents needed for a particular assay or panel of assays.

Microscale means for handling fluids include mechanical hydraulic systems such as piston driven devices, electrical hydraulic systems such as electrokinetic pump and valve devices, and pneumohydraulic systems. Of these, those systems with pneumatic actuators and control surfaces have proven to be particularly practical in controlling microscale fluid flows.

One well known class of fluidic devices having a pneumatic interface is manufactured by the Assignee, Micronics, Inc. (Redmond, Wash.). Control of fluid flow in microfluidic channels is achieved with a MICROFLOW® system pneumatic controller that operates miniature valves in a plastic cartridge according to programmable valve logic. Diaphragms separate the pneumatic side and the hydraulic side of the cartridges; i.e., the valve diaphragms are interface elements for converting pneumatic control pulses into starting and stopping fluid flow. Cartridges are formed by building up laminations, layer by layer, with channels and chambers sealed between capping overlayers. In this way, complex fluidic circuits are formed.

To form a fluidic circuit by conventional fabrication, a layer of an elastic material is sandwiched as a laminate between body layers, and pneumatic and hydraulic channels and chambers are formed in the apposing layers on either side of the elastic layer, such that the pneumatic workings and the hydraulic workings of the cartridge are separated by a diaphragm layer. Diaphragms formed of polyurethane, polyimide, and PDMS have been favorites for this method.

Miniature pump elements, for example, are needed to achieve the fullest benefit of fluidic microcircuitry technologies, which find numerous applications such as in diagnostics and in life sciences more generally. Diaphragm-driven pumps are advantageous because of the absence of mechanical seals and lubricant, and their sanitary features.

Although miniature pumps were generically hinted at by Wilding (for example in U.S. Pat. Nos. 5,304,487 and 5,498,392), the disclosures themselves were not sufficient to enable fluidic microcircuitry pumps and valves. Cited by Wilding was Van Lintel [1988, "A Piezoelectric Micropump Based on Micromachining of Silicon," Sensors and Actuators, 15:153-167], which relates to silicon-based microelectromechanical (MEMS) structures. However, silicon is known to have a very high Young's modulus (about 100 GPa); therefore a silicon diaphragm pump will generally have a very low compression ratio ε defined by:

$$\varepsilon = (\Delta V + V_0)/V_0$$

where $\Delta V$ is the stroke volume and $V_0$ is the deadspace volume, i.e., the volume of fluid that is not displaced from the pumping chamber during an ejection stroke. Thus disadvantageously, these devices may not be self-priming in operation when used with liquids.

Representative art related to siliceous diaphragm pumps includes U.S. Pat. Nos. 5,759,014, 6,390,791 and 7,749,444. Similar issues are seen with the rigid polymeric diaphragm members of U.S. Pat. No. 7,832,429 and more generally where the diaphragm member resists deformation due to mechanical stiffness.

There has been greater interest in elastomeric diaphragm materials because of the higher compression ratio, which offers the advantage of self-priming in fluidic operations, and larger displacement volume. For example, polydimethylsiloxane (PDMS) and silicones may be used as diaphragm materials. Latex rubber and amorphous polyurethanes have also been used. Elastomeric materials that obey Hooke's law have the advantage that the diaphragm returns to its original shape in the relaxed state, but this is advantageous only for some applications, and can be associated with reduced chemical resistance and increased permeability.

Representative art related to microvalves includes U.S. Pat. No. 4,304,257 (the '257 valve), in which a soft, resilient, polyurethane sheet is clamped over flow channels formed in a hard acrylic body. A fluid path between two discontinuous fluid channels is opened and closed by actuating pistons which mechanically flex a part of the sheet. A tenting action on the sheet is associated with valve opening; valve closing is associated with spring return of the resilient sheet to a closed position. The sheet is flexed mechanically between the two positions by a solenoid-operated rod having an embedded attachment to the sheet over the valve seat, such that the sheet contacts the seat when closed and the sheet is pulled into an aperture overlying the valve seat to open the valve.

According to the teachings of U.S. Pat. No. 4,848,722, the '257 valve has several disadvantages. In addition to delicacy of mechanical solenoid operation and need for fine adjustment, the membrane is subjected to great stresses with the risk of permanent stretch (i.e., permanent deformation or pinching past its yield point). By virtue of the concave contact surface for the membrane, the sealing area is maximized, but disadvantageously, a non-zero and significant volume of the valve cavity must be filled before fluid begins to flow.

In expired U.S. Pat. No. 4,848,722 (the '722 valve), a pressure or vacuum source is used to urge a flexible sheet such as biaxially oriented polyethylene terephthalate (Bo-PET) into a stop-flow position in which apertures formed by the channels (3,4) in the valve seat are closed and an open position in which the apertures are fluidly confluent. The step land (FIG. 9: 62) of the valve seat is contacted by sheet (8) when the valve is closed. The sheet is glued to the pneumatic side of the valve.

U.S. Pat. No. 4,869,282 describes a micromachined valve having a diaphragm layer sandwiched between two rigid layers forming the valve cavity. The diaphragm layer is formed of polyimide and is deflected by an applied pneumatic pressure in a control circuit to close the valve. Diaphragm motion is limited to avoid overstressing the polyimide layer.

Expired U.S. Pat. No. 5,660,370 (the '370 valve) describes a valve (FIG. 1: 1) having flexible diaphragm (2) and flat valve seat formed of a rigid layer in which two holes are formed, each hole defining an opening to a fluidic channel (3,4) in an underlying layer, where the holes are separated by a valve sill. The diaphragm is made of polyurethane or silicone. The valve (5) is opened by pneumatically exercising the diaphragm. To avoid the tendency of the sheet to become stressed beyond its yield point, a flat valve seat is used to minimize the required range of diaphragm motion. This also reduces the deadspace volume of the valve.

A similar structure is seen in U.S. Pat. No. 5,932,799 to YSI Inc., which teaches a fluidic microcircuitry analyzer having a plurality of polyimide layers, preferably KAPTON® film, directly bonded together without adhesives and a flexible pneumatically actuated diaphragm member for controlling fluid flow.

WO Publ. No. 2002/081934 to Micronics, Inc., published Oct. 17, 2002, describes a laminated valve having an elastomeric diaphragm. These valves, which were termed "peanut valves", admit fluid across the valve sill under negative pressure, and are closed when positively pressurized. Advantageously, the valve cavity is formed with a contoured waist to minimize deadspace volume.

U.S. Pat. No. 7,445,926 to Mathies describes a laminate with a flexible diaphragm layer sandwiched between hard substrates. Pneumatic channels and fluid channels are formed on opposite sides of the diaphragm layer (cf., FIG. 1 of the reference), so that the diaphragm is the active valve member. The diaphragm material disclosed is a 254 micrometer PDMS membrane. The valve body is typically a solid such as glass.

U.S. Pat. Appl. Nos. 2006/0275852 and 2011/0207621 to Montagu describe a fluidic cartridge for biological assays. The cartridge includes a molded body defining flow passages. A latex diaphragm and a canned diaphragm pump are shown (cf., FIG. 5 of the reference). The "rolling elastic diaphragm pump" member (3) is inserted into the cartridge as a pre-formed subassembly and is commercially available (Thomas Pumps, Model 1101 miniature compressor, Sheboygan, Wis. 53081). Valves are mechanically actuated using a stepper motor. Thus the valves have the disadvantage of requiring sensitive and meticulous adjustment for proper operation.

Other elastomeric valve and pump constructs are known. Examples of silicone valve construction include U.S. Pat. Nos. 5,443,890, 6,793,753, 6,951,632 and 8,104,514, all of which illustrate soft lithographic processes (cf, U.S. Pat. Nos. 7,695,683 and 8,104,497) for forming valves and pumps. PDMS may be used to form diaphragms and pump bodies. Latex rubber and amorphous polyurethanes have also been used as diaphragm materials, but chemical resistance may not be sufficient for some applications.

Diaphragm members having toughness, solvent resistance and capable of being shaped into yield-in-place diaphragms have not previously been demonstrated. Advantageously, a solvent-resistant diaphragm that yields to form a pre-shaped diaphragm member has application in pumps and valves used for pumping suspensions of particulates, and for replacing elastomeric diaphragms such as polyurethane which may leak when exposed to caustics, chaeotropes, or solvents, thus permitting use of solvents such as ethanol, formamide and dimethylsulfoxide, e.g., for lowering the operating temperature requirements during PCR. Yield-in-place diaphragms have increased pump stroke ejection volumes, leading to faster circuit response, and improved flow of particulate solutions, such as bead slurries, for example. Although progress has been made, there is a need for improved diaphragm construction of microassay cartridges, and in particular for a process applicable to miniaturized circuit elements. The present invention provides these and related advantages.

BRIEF SUMMARY

To improve the efficiency and speed of operation of a microfluidic circuit element such as a valve or a pump, it is desirable that the work required to change from a first state to a second state is minimal. A preferred class of circuit elements is diaphragm operated. The pneumatically controlled diaphragm separates a pneumatic subcavity from a hydraulic subcavity and operates on a fluid contained in the hydraulic subcavity. The diaphragm "web" is a thin film that serves as a barrier between the two subcavities, dynamically translating pneumatic pressure into fluid motion, or stasis. In a first state, the diaphragm web is in a first position between the subcavities, in a second state the diaphragm web is displaced from the first position and occupies a second position. Generally the first position conforms proximately to an interior surface of the hydraulic subcavity and the second position conforms proximately to a second interior surface of the pneumatic subcavity, and by exerting a force, the diaphragm may be reversibly transitioned between the two positions or states.

Unfortunately, currently existing microfluidic diaphragms are generally elastomeric in nature and require overcoming the significant elastomeric resistance to change from a first state to a second state. Therefore, it is desirable if the work required to change from one state to the other was reduced. We have invented a novel barrier that has a substantially zero work function to change from the first state to the second state. This is accomplished by the use of a web having near zero elastomeric properties and a surface area significantly larger than the microcavity in to which the web is sealed. Most preferably, the surface area of the diaphragm web closely approximates the interior surface area of a subcavity, or if the subcavities are not symmetrical, then the surface area of the web closely approximates the interior surface area of the larger of the subcavities. The diaphragm web is thus a movable film having low elasticity for separating a hydraulic and a pneumatic subcavity of a microfluidic circuit element, where the area of the film is larger than the greatest cross sectional area of the microcavity.

Film Properties

It is desirable for the web for use in these microfluidic cartridges be a film that is not significantly elastomeric and generally matches the interior surface area of one subcavity the target microcavity, preferably the interior surface area of the larger sub cavity of the microcavity. Most preferably, the film requires little or no work to transition from one state to another. The film is desirably in a flaccid state until the applied control pressure drives the film to one side or the other of a microfluidic cavity by inverting the film position. Preferably, the film can also be described as having near zero or zero restorative force toward a reduced area state. Most preferably, the film is a low or non-elastomeric film that does not significantly self-restore to a form with a surface area approximating the cross-sectional area of the cavity, and substantially matches the interior surface area of the subcavities without significant over or under pressure. Using a non-elastomeric film with a surface area matching the interior surface enables several advantageous and novel properties.

The use of low or non-elastomeric films as microfluidic components enables the production of valves, pumps and microfluidic features that have advantageous features. Notably through the use of low or non-elastomeric films, the restoring force of an elastomeric film does not need to be overcome as the film is moved from one side of the microcavity to the other. This reduction in force arises because the pneumatic control needs only overcome the inertia of the membrane and fluid, not the elastic spring force of the film plus the inertia of the membrane and fluid. This enables a faster cycling and/or cycling with reduced pressure, or both, of the membrane between one side and the other, e.g. from the open state to the closed state for a valve.

Manufacture

The yielded film in a microfluidic assembly can be formed by a number of methods. The films can be formed after assembly of the microfluidic cartridge by applying sufficient pressure to stretch the film over its yield point, or with a mechanical press for stretching the film into a cavity in the microfluidic assembly, or they can be stretched by the use of a punch and die prior to assembly, such as by a process of pre-stretching diaphragm webs in bulk. Depending upon the film and the manufacturing processes it may be desirable to form the films with one or more of these processes. After typical manufacture, some films are flexible but have substantially no elasticity in their range of motion. By the use of suitable dies and forming processes these films can be formed into shapes complimentary to the target microfluidic cavities. For example it is known in the art that a heated vacuum die can be used stretch films into macroscopic bubbles having a generally cylindrical shape. By the use of a suitable die, the films may be stretched on a microfluidic die before the film is aligned with the first microfluidic assembly and then continuously bonded to said first microfluidic assembly. Through the use of continuous roll to roll processes, significant time and cost savings in manufacture may be realized.

To generate a film by a yield in place process, the surface area of the assembled film and the area of at least one portion of the microcavity be of a ratio that when a pressure difference is applied to the chip, the film is forced to match the interior surface area of the cavity and stretch the film beyond its yield point. This process may be accomplished during the cartridge assembly, or after assembly, when it may be yielded as part of the manufacture process, or by the initial operation of the microfluidic cartridge. Some films such as SARANEX® can be yielded in place with a relatively low pressure difference. To yield other films, it may be necessary to provide additional external pressures to ensure that the desired yield pressure does not cause a mechanical failure of the microfluidic assembly.

The films can also be yielded in place during manufacture. This may be accomplished through the pressure differential method described above. Alternatively, the yielding can arise through mechanical means. For example, a punch and a partially assembled microfluidic cartridge can be used. The film can be bonded to one side of the microfluidic assembly. After bonding the film, a die can be mechanically pressed into the film, driving the film into the void below. Alternatively, the film may be expanded into a die, and the expanded film is then transferred into microcavity void. Through the choice of a suitable die and pressure, the film can be stretched into a non-elastomeric state. For some films it may be desirable to perform the mechanical stretching at elevated temperatures. For some choices of film and manufacturing speeds, it may be desirable to form the yielded films prior to the assembly step. This can be accomplished through the use of a suitable molds or dies to form the complimentary pattern of stretched films in the larger carrier film. It may be advantageous to cut the resultant stretched film portions from the carrier film upon transfer to the microfluidic subassembly. This can be done either by kiss cutting with a die, or by a selective cutting with a laser film cutter.

The film can also be yielded prior to assembly. In this case, the assembly process needs to gather sufficient non-elastomeric film to line the surface area of the desired target cavity. This can be accomplished through the use of a punch and die combination, or by vacuum or pressure forming the film into a die, wherein the die has dimensions similar to the target microcavity. The film can then be positioned on the microfluidic subassembly and the non-elastomeric film transferred by a suitable change in pressure. Those skilled in the art can recognize that it may be advantageous to insert manufacturing steps in the process, such as transferring the film and a perimeter to an adhesive layer, bonding the ungathered film with heat, pressure, or solvent, applying adhesive to the ungathered material, cutting a perimeter to create a bondable area for the yielded film, or combinations thereof.

When the film is yielded prior to cartridge assembly, manufacturing conditions that might be harmful to the microfluidic chip may be used. Specifically, it may be desirable for manufacturing reasons to use either pressure or thermal processing steps that may be incompatible with the microfluidic assembly, or reagents therein. By performing the yield process off of the microfluidic assembly, it becomes possible to use combinations of pressure and temperature that are relatively inaccessible to an assembled chip. This permits the use of polymers such as polyimide that have optimal process conditions that exceed the strength, and or desired temperatures desirable for plastic microfluidic cartridges. By utilizing these manufacturing techniques, those skilled in the art will appreciate greater flexibility microfluidic cartridge design and manufacture.

In all cases, it is desirable that the film be stretched sufficiently to irreversibly yield the material. Specifically, the stretch applied should exceed the yield point of the film to create non-elastomeric or very low elasticity film such that the yielded film has a surface area and shape complimentary to the inner surface of the microfluidic cavity into which it is assembled. It is known in the art that not all microfluidic cavities are symmetric with respect to the film layer, and in these cases, it may desirable that the surface area of the film match the larger of the two microcavities for most uses. For some uses, it may be sufficient to have the film match the surface area of the hydraulic or pneumatic side only. For example, it may be desirable with several microcavities in sequence to have the operating volume change be different amongst the microcavities. This can be readily accomplished by having an asymmetric division of the microcavity by the film.

Diaphragms of the invention form components of micropumps, microvalves, and microvents. A micropump is one such inventive combination, the micropump comprising a cavity having a first subcavity configured to receive a fluid; a second subcavity configured to be reversibly pressurized; a diaphragm interposed between and separating the first subcavity from the second subcavity; and, wherein the diaphragm is a polymeric thin film web having a yield point and is characterized by a permanently overstretched deformation of the web. The thin film web inelastically conforms in a first state to a first internal surface of the micropump cavity when pressurized and in a second state to a second internal surface of the cavity when depressurized. The micropump is configured to pump a liquid according to a pump stroke defined by the reversible motion of the permanently overstretched deformation of the web between the first state and the second state as driven by pressurization and depressurization of the second subcavity.

A second combination is a microvalve, the microvalve comprising a cavity having a first subcavity configured with a valve inlet, a valve outlet, and a valve seat interposed between the valve inlet and the valve outlet, wherein the first subcavity is configured to receive a fluid; a second subcavity configured to be reversibly pressurized; a diaphragm interposed between and separating the first subcavity from the second subcavity, wherein the diaphragm is enabled to be reversibly deflected against the valve seat according to whether the second subcavity is pressurized or depressurized, thereby defining an "ON" position and an "OFF" position of the microvalve; and, further characterized in that the diaphragm is a polymeric thin film web having a yield point and is characterized by a permanently overstretched deformation of the web. The thin film web inelastically conforms in a first state to a first internal surface of the cavity when pressurized and in a second state to a second internal surface of the cavity when depressurized. The microvalve is configured to open and close by the reversible motion of the permanently overstretched deformation of the web between the first state and the second state as driven by pressurization and depressurization of the second subcavity. The invention also comprises combinations of the diaphragm elements as components of microfluidic circuits and devices.

BRIEF DESCRIPTION OF THE SEVERAL VIEWS OF THE DRAWINGS

FIGS. 5A and 5B are perspective views of a cutaway section through a generally rectilinear chamber, showing progressive stretching of the diaphragm web to conform to the interior surface area of the upper chamber subcavity.

FIGS. 6B and 6C depict a first state and a second state, where the first state is distended and the second state is contracted.

FIG. 11 is a stress-strain analysis for a co-laminate film of low density polyethylene/ethylene vinyl acetate/polyvinylidene chloride,/ethylene vinyl acetate, and low density polyethylene.

FIGS. 16A and 16B are cross-sectional views of a microvalve structure, showing an "ON" and an "OFF" configuration of the valve diaphragm. The valve diaphragm member is formed by a process of inelastic deformation.

FIG. 24 is an experimental study of overstretch behavior in a diaphragm valve.

FIG. 31 illustrates a representative fluidic circuit having a combination of diaphragm-operated circuit elements of the invention.

FIG. 32 illustrates a microfluidic cartridge formed of pneumatic and hydraulic circuits containing microvalves and micropumps of the invention.

FIG. 33 tabulates parameters such as yield stress of high and low modulus films and is useful in guiding selection of diaphragm materials for yield-in-place valve applications.

DETAILED DESCRIPTION

Figure 1A:
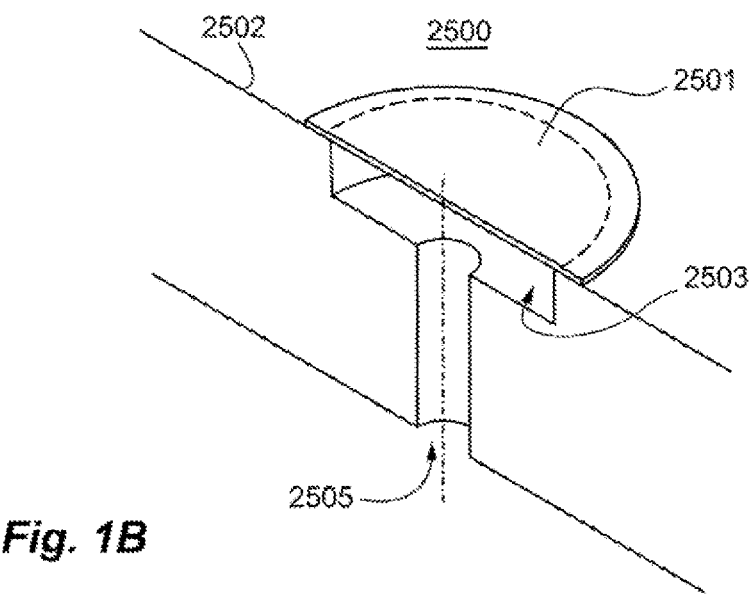
FIGS. 1A and 1B are renderings of a diaphragm member being stretched by a pressure applied within a sealed chamber. Whereas elastically stretchable materials return to a relaxed state, inelastically stretched materials undergo permanent deformation.

Although the following detailed description contains specific details for the purposes of illustration, one of skill in the art will appreciate that many variations and alterations to the following details are within the scope of the claimed invention. The following definitions are set forth as an aid in explaining the invention as claimed.

Definitions

A "cartridge" is an analytical device designed for operation by insertion into a host instrument. The host instrument supplies the pneumatic pressure, pulses, and detection means for performance of the assay. The cartridge contains hydraulic works and pneumatic works, including microscale channels, cavities and chambers. Sample and reagent liquids are conveyed in a hydraulic network of the cartridge or card; fluid flow is controlled and driven by a pneumatic network that interfaces with the hydraulics at diaphragms spanning selected junctions, channels and chambers. Typically, the body of the cartridge or card is made of a flexible plastic and may be formed by lamination, molding or a combination thereof. Body plastics may include, but are not limited to, polycarbonate, polyethylene terephthalate, cyclic polyolefins, acrylates, methacrylates, polystyrene, polyimide, polysilicone, polypropylene, high density polyethylene, low density polyethylene, graft and block copolymers, and composites thereof. A preferred cartridge is made from rollstock and includes dry reagents printed thereon. Other such cartridges may include molded body elements.

"Hydraulic works" of a device: includes the network or networks of intercommunicating channels and chambers that are intended to be wetted by sample or liquid reagents in the course of an assay. The hydraulic networks are configured with fluidic subcircuits for performing the steps of an assay.

"Pneumatic works" of a device: includes the network or networks of pneumatically actuated valves, pumps and diaphragms and interconnecting circuitry and manifolds that are useful for powering and controlling the hydraulics of the device. The pneumatic works of the cartridge device interface with positive and negative pressure sources on the host instrument and with valves, diaphragms, pumps and other pneumatically actuated elements that control and drive liquids in the hydraulic network.

While it may be said that the pneumatic works of the device are preferably operated with a gas such as air or nitrogen, it is also conceived that equivalent "pneumatic" circuits may be operated with a fluid more generally, where fluid is selected from a gas or a liquid, including liquids such as silicone oils, vegetable oils, fluorocarbon liquids, and the like. Thus in one variant of the invention, the pneumatic works are operated with a "fluid" having the characteristics of a liquid and the operation of the device is otherwise equivalent, as would readily be understood by one skilled in the art.

"Fluidic works" of a device: include the hydraulic works formed of a network or networks of internal channels and chambers wetted in the course of the assay and the pneumatic works formed of control and pump driving circuits powered by positive and negative pressure sources derived from a host instrument via a pneumatic interface.

The fluidic works may be divided into fluidic subcircuits, where each subcircuit comprises channels and chambers for performing a particular function on a liquid sample or reagent. The fluidic subcircuits may be organized into serial subcircuits (such as for extraction, amplification and detection of a nucleic acid target or targets) and parallel subcircuits and networks such as for simultaneous assay for multiple targets on a single sample by splitting the sample. "Microscale" and "fluidic" refer to devices having submillimeter features.

"Microfluidic"—by convention, refers to fluidic features having at least one critical dimension that is generally less than 500 micrometers. The narrowness of the critical dimension results in fundamental changes in the rules governing fluid flow. The liquid flow regime is characterized by Poiseuille or "laminar" flow.

"Stress" is the internal or restoring force per unit area associated with a strain and has units of Pascals or megaPascals.

"Strain" is a ratio $\Delta L/L_0$ of the change in length divided by the original length in response to an externally applied stress, and is unitless; it is often given in percent.

"Yield point" is the point on a stress-strain curve where the curve deflects or levels off and plastic deformation commences, and thus corresponds to the "elastic limit" of the material. Prior to the yield point, the material elastically return to its original shape when the applied stress is removed. Once the yield point is passed, some fraction of the deformation will be permanent and non-reversible. A yielded material, such as a diaphragm, has been stretched beyond its yield point.

"Yield Strength" and "yield point" are measured by standard techniques for reproducibility, such as described in ASTM Test Method D882-10 (the "882 test method"). For consistency, generally a 1 mil film is a preferred substrate. Yield strength is an indication of the maximum stress that can be developed in a material without causing irreversible deformation. Yield point is an indication of the maximum strain that can be developed in a material without causing irreversible deformation. For practical reasons, the measurements of yield strength, strain, elastic limit and elastic modulus are defined experimentally from a stress-strain diagram.

Offset yield strength is the stress read from the plot at the intersection of an offset line (drawn parallel to the initial slope of the stress-strain curve through the elastic deformation range) and the stress-strain curve, where the offset line is offset by a selected value. Offsets for plastics are conventionally taken as 2%. Optionally, yield is sometimes shown as a range, for example in the case of co-laminated films.

"Elasticity" refers to the ability of a material to return to its original shape when load causing deformation is removed. Elasticity is the ability to store and release energy with a spring-like sample response generally as described by Hook's law of elasticity. If the strain increases linearly with increasing applied stress, the material is purely elastic, however in some materials, such as materials displaying viscoelastic properties, the stress-strain relation is not linear and the sample response is strongly dependent on time and rate of load application.

"Elastic modulus" (E), also termed "Elastic Modulus", is a slope measured in the elastic deformation region of the stress-strain curve, where strain is fully reversible. "Elastic Modulus" is the initial slope measured in the stress-strain curve and is an indication of the stiffness of the material. Elastic Modulus is a constant within the range of stretch or deformation that is fully reversible, and is thus equivalent to the spring constant of Hooke's Law.

"Permanent Deformation" or "inelastic deformation", is an increase in length dimension, expressed as a percentage of the original length dimension, by which material fails to return to its original length after being subjected to an elongation stress. When subjected to a stress greater than the yield strength or elastic limit of the film, permanent deformations of thin films may occur. For example, when a thin film diaphragm having a web span length from one side to another of a cavity or frame is stretched by a pressure and then collapsed back to a relaxed state, the web span length may be permanently elongated according to the amount of overstretch that the diaphragm was subjected to in excess of its yield point. "Overstretch" simply indicates that the material has been stretched past its yield point.

"Toughness" of a material is the ability of a material to absorb energy and plastically deform without fracturing or rupturing, and can be related to the total area under the stress-strain curve up to a break point according to the integral $$K = \int_0^{\in_f} \sigma d\in$$

where $\in$ is strain, $\in_f$ is the strain on failure, and $\sigma$ is stress. The units of K are of energy per unit volume. For purposes of the invention, toughness is particularly indicative of the capacity of a material to undergo a strain of up to 50% by length and to be permanently deformed thereby. This property is desirable for the manufacture of pneumatic elements by a form-in-place process as described herein.

A comparison of the relative magnitudes of the yield strength, ultimate tensile strength and percent elongation of different material can also give a good indication of their relative toughness.

"Top", "bottom", "up", "down", "upper", "lower", "above", "below", "upward", "downward", "superior to", "floor", "roof", "convex", "concave", and so forth, are indications of relative position and not absolute position or viewpoint: when reference is made to a specific frame of reference, such as the "ground plane", as taken orthogonally to an intersecting plumb line.

Unless the context requires otherwise, throughout the specification and claims that follow, the word "comprise" and variations thereof, such as, "comprises" and "comprising" are to be construed in an open, inclusive sense, that is as "including, but not limited to". Reference throughout this specification to "one embodiment", "an embodiment", "one aspect", or "an aspect" means that a particular feature, structure or characteristic described in connection with the embodiment or aspect may be included one embodiment but not necessarily all embodiments of the invention. Furthermore, the features, structures, or characteristics of the invention disclosed here may be combined in any suitable manner in one or more embodiments. "Conventional" is a term designating that which is known in the prior art to which this invention relates. "About" and "generally" are broadening expressions of inexactitude, describing a condition of being "more or less", "approximately", or "almost" in the sense of "just about", where variation would be insignificant, obvious, or of equivalent utility or function, and further indicating the existence of obvious minor exceptions to a norm, rule or limit.

Microfluidic Circuit Elements by a Yield-in-Place Process

Conventional art relies on diaphragms formed from elastomeric films or rigid sheets. However, we have found surprisingly that a hitherto unrealized class of diaphragm materials may be advantageously used in forming microvalves and micropumps. These diaphragm materials are polymers selected for toughness and chemical resistance, but substantially lack elasticity once stretched and are not excessively stiff. The unifying concept is a recognition that an overstretched material (e.g., yielded) selected for its toughness, having been stretched beyond its yield point so as to be deformed permanently, requires essentially no work to transition from a first state to a second state, each state conforming to an opposite aspect of a microcavity. The diaphragm is typically stretched before use or on first use and behaves as a flexible, flaccid, blister-shaped skin, inelastically controlling or propelling fluid flow according to the pressure differential across the diaphragm. Once stretched, the diaphragm film does not return to its native dimensions, and advantageously, this results in decreased latency and increased stroke volume, decreased incidence of sticking of the diaphragm to the pump wall, and improved conveyance of bead slurries, for example.

Figure 1B:
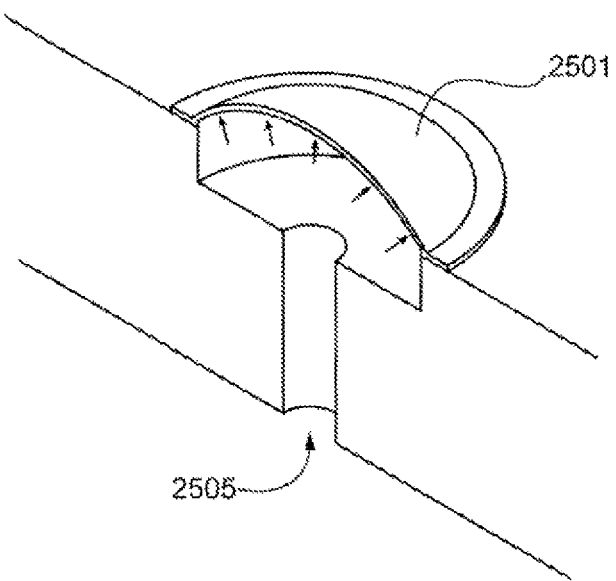

FIGS. 1A and 1B show a plastic film diaphragm member being stretched by a form-in-place process of "over-stretching" the film beyond its yield point. In this case, a simplified pneumatic manifold 2500 and diaphragm 2501 is shown. The edge of the diaphragm is affixed to the substrate 2502 and an apron 2503 extends past the periphery of a pneumatic cavity 2504. The diaphragm itself forms a "web" over the cavity. During stretching under controlled process conditions, the diaphragm web covering the lower chamber is stretched and permanently deformed as shown in FIG. 1B. A fluid entering portal 2505 expands the diaphragm like a soap bubble, but upon release of pressure, instead of relaxing to its original sheet-like state, the diaphragm web will remain permanently stretched, forming a collapsible, flaccid, blister-shaped skin, and will have a larger stroke volume and decreased work function in transitioning from a distended state to a collapsed state. In contrast, an elastic material will resist distension and will recover to its native flatness when the pressure is removed.

For micropump and valve diaphragms formed by a yield-in-place process, materials having a yield point (when tested by ASTM D882 standard methods) in the range of about 2 to 30 MPa are preferred, but materials having a yield point of about 100 or 120 MPa may be used if desired. Diaphragm materials having yield points of 30 MPa or less include, for example polyethylene, low density polyethylene, blends with high density polyethylene, polyolefin composites and laminates, polyvinylidene chloride composites and laminates, and ethylene vinyl acetate composites, while not limited thereto. It is well known that blends, block grafts and co-laminates (generally termed "composites") of these polymers may be formulated to tailor the yield strength for a particular application, for example a co-laminate consisting of low density polyethylene/ethylene vinyl acetate/polyvinylidene chloride,/ethylene vinyl acetate, and low density polyethylene (LDPE/EVA/PVDC/EVA/LDPE) (as sold under the trade name SARANEX®) was found to have a yield strength of about 15 MPa and has been demonstrated to be useful in the inventive micropumps and microvalves. Typically the films employed will have a thickness of 1 to 3 mils, although slightly thinner or thicker films may also be used. Other useful films will be apparent to one skilled in the art after study of this disclosure. One useful film having a yield point of about 100 MPa is polyethylene terephthalate, which is readily available in a 1 mil thickness in sheets or rolls, and which may be formed into stretched diaphragm webs of the invention by mechanical means as will be described below.

Figure 2A:
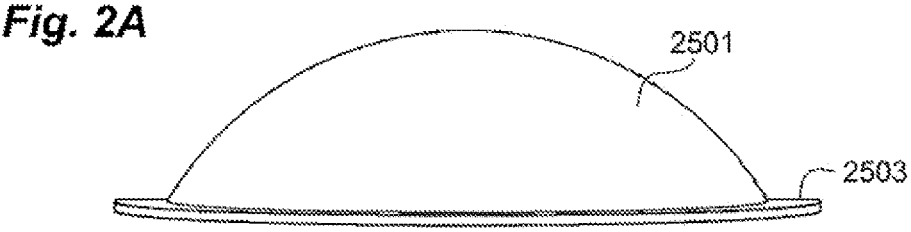
FIGS. 2A and 2B illustrate schematically two states of an inelastically stretched material that undergoes collapse when depressurized.
Figure 2B:
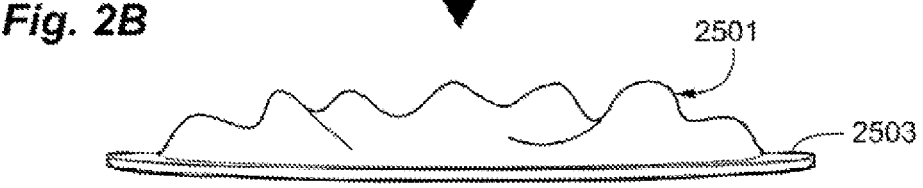

FIGS. 2A and 2B are views of a diaphragm film 2501 in a "distended state" and a "collapsed state". In the distended state (FIG. 2A) the film is essentially concave in shape, and in the collapsed shape (FIG. 2B), the film is generally amorphous and can be pressed flat. We have found, surprisingly, that the films function well as microvalve and micropump diaphragms. When pressed flat against a valve seat, for example, liquid flow through a valve is readily stopped under operating conditions typical for a microfluidic device. When operated as a pump, the pump stroke is essentially equal to the volume enclosed in the distended state less the volume enclosed when pressed flat by a pressure or a mechanical actuator, i.e., the micropump has essentially a zero deadspace volume.

In FIG. 2B, the amorphous web is collapsed but has not recovered elastically to its native flatness, and now has a surface area that is substantially greater than its virgin condition, having been overstretched past its yield point. The figure is drawn schematically and is not intended to represent the actual appearance of a distended or collapsed diaphragm member in use. Stretched diaphragm webs of this type may be formed with a surrounding apron 2503 as shown here, where the apron serves as lip to attach and seal the diaphragm to the substrate.

Figure 3:
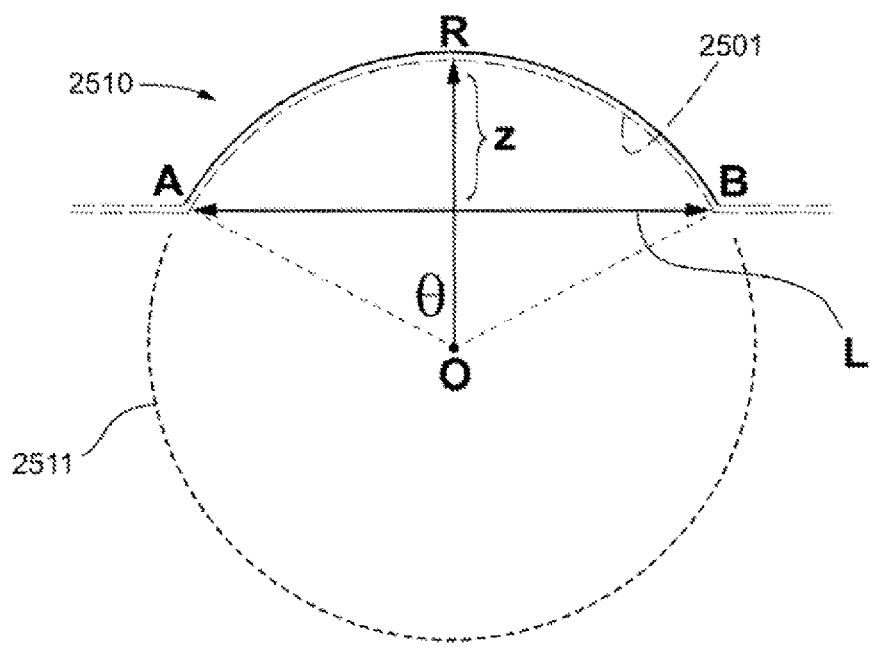
FIG. 3 depicts a stretched diaphragm film conforming to the interior wall of a concave chamber.

FIG. 3 is a schematic view defining the analytical geometry of mechanical strain in a diaphragm member adapted for a subcavity shaped as a spherical cap 2510. In this example, the cavity is defined by a span dimension or chordal length L from A to B and an internal height equal to the sagitta or height of the spherical cap segment. The diaphragm 2501 conforms to the interior surface of the subcavity 2510. Here the cap height is denoted by z, and is a fraction of the radius R. The internal wall of the subcavity from A to B defines an arc length L' of a sphere 2511 having radius R, where the arc is inscribed by center angle $\theta$, and where O is the center of the sphere. Pump cavities of this kind can be made with a hemispherical milling head or by a molding process, for example. The arc length L' is then calculated from the central angle $\theta$ (in radians) and the radius R by the formulae L'=$\theta$*R so that the overstretch can again be calculated as a permanent deformation L'/L. The permanent deformation, when expressed as a percentage, may be compared to a stress-strain curve for the material, where it will be seen that the deformation of the diaphragm webs of the invention exceeds the elastic limit of the material on the strain axis.

Figure 4A:
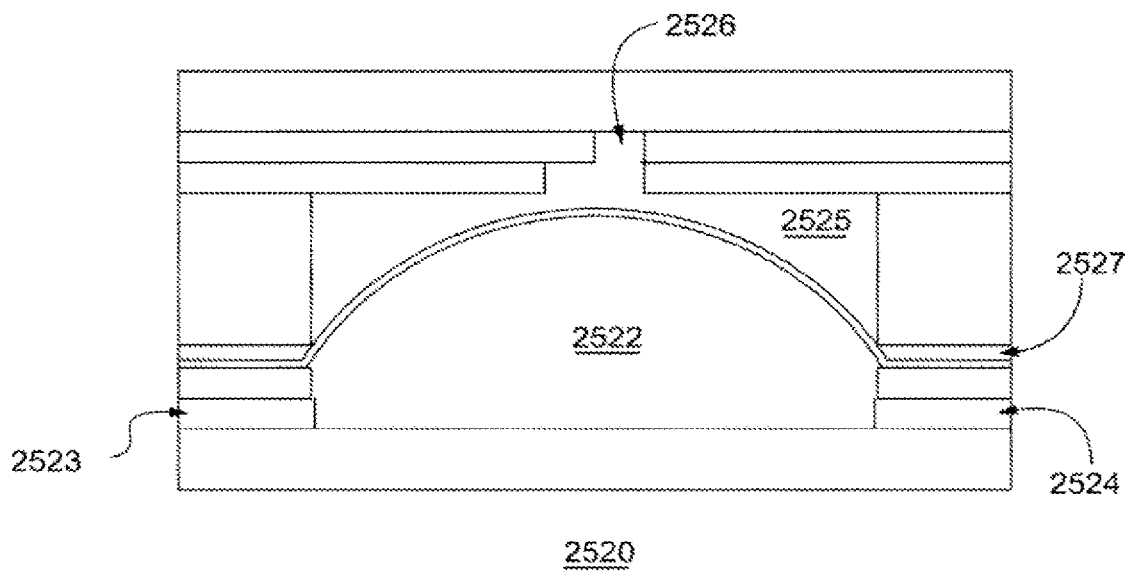
FIGS. 4A and 4B depict a chamber in cutaway view, the chamber having generally vertical walls and layered construction. Illustrated is the geometry of a diaphragm web in process of being stretched to conform to the chamber.

FIG. 4A is a cross-sectional view of a rectilinear pump microcavity 2520 formed by lamination, the laminate stack including a sheet of diaphragm material 2501. In this example, the diaphragm is a continuous sheet and extends throughout the device body. The diaphragm layer separates the device into a lower body part and an upper body part. The lower body part includes hydraulic subcavity 2522, inlet 2523 and outlet 2524. The upper body part includes a pneumatic subcavity 2525 and pneumatic actuation port 2526. In this example, the two body parts are joined by a glue layer 2527. The structure may be assembled layer by layer, or may be assembled by first forming a lower body part, applying the diaphragm layer 2501 to the body part, and then building or adding an upper body part thereon. As shown here, the distended state "blister" may be formed by a yield-in-place process after the body has been assembled, generally by applying a pressure exceeding the yield point of the thin film material but not exceeding the mechanical strength of the cartridge body. Optionally, the blister may instead be formed before the final assembly is completed.

Figure 4B:
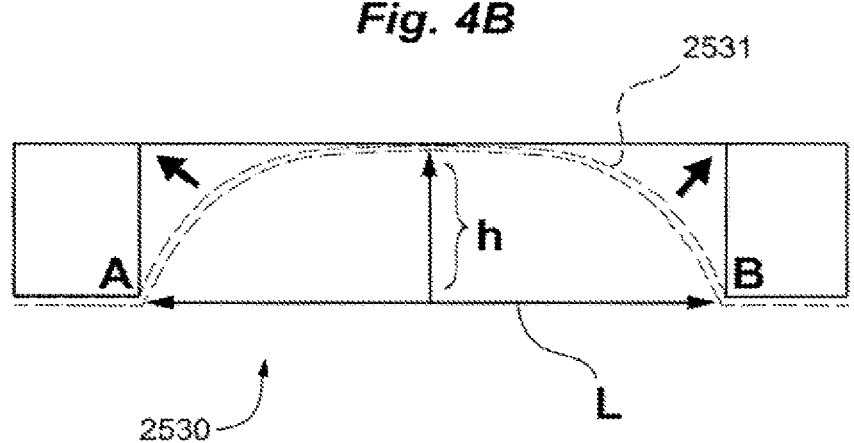

FIG. 4B is a schematic view defining the analytical geometry of mechanical strain of a diaphragm member adapted for a rectilinear cavity 2530. The cavity is characterized by a span dimension from A to B and an internal height h. Diaphragm 2531 (dashed lines) forms a "web" spanning and sealing the cavity. The dimensions are not necessarily constant on any axis, but for simplicity of explanation it can be seen that the internal surface of this rectilinear cavity is bounded by a length L'=2 h+L in this sectional view, where L is the length from A to B and h is the interior height of the cavity. When yielded under an applied pressure, the diaphragm web 2531 will stretch to generally conform to the internal dimensions of the cavity and will acquire a length L'$\approx$2h+L, where the length L' is generally equal to two times the height of the chamber plus the web span length from side to side. The overstretch (L'>L) can then be quantitated and equals a permanent stretch deformation factor of L'/L. To achieve this, materials are selected so that the yield point (elastic limit) of the material is exceeded in the stretching process. Stretching is not necessarily uniform, and in some cases will be greatest along the peripheral border of the web.

FIG. 5A is a cutaway view of a pump structure 2540, depicting a microfluidic device with diaphragm 2541 in an overstretched configuration which partially fills the cavity. In FIG. 5B the diaphragm is stretched to more closely conform to the interior walls of the cavity. The diaphragm is advantageously and simply made by forming the pump structure to include a flat sheet of the selected diaphragm film sandwiched in place; then in a separate process step, the device is subjected to an internal pressure on one side of the diaphragm, where the pressure is configured to exceed the yield strength of the diaphragm film, thus irreversibly stretching the film. We term this a "yield-in-place" process. The diaphragm in its distended state after stretching is seen to have a convex "blistered" or "ballooned" appearance that can be readily collapsed as earlier described with reference to FIG. 2B. Also shown in the figure is an "apron" 2542 used to seal the diaphragm between the pneumatic housing members (upper layers) and the fluidic housing members (lower layers). The apron in this example is contacted by a glue layer 2543 that bonds the fluidic face to the pneumatic face of the device. Also shown are pump inlet 2544 and outlet 2545, where directionality of fluid flow is established for example by the use of check valves (not shown) or other means known in the art. Also shown is pneumatic actuator port 2546 and pneumatic cavity 2547.

Figure 6A:
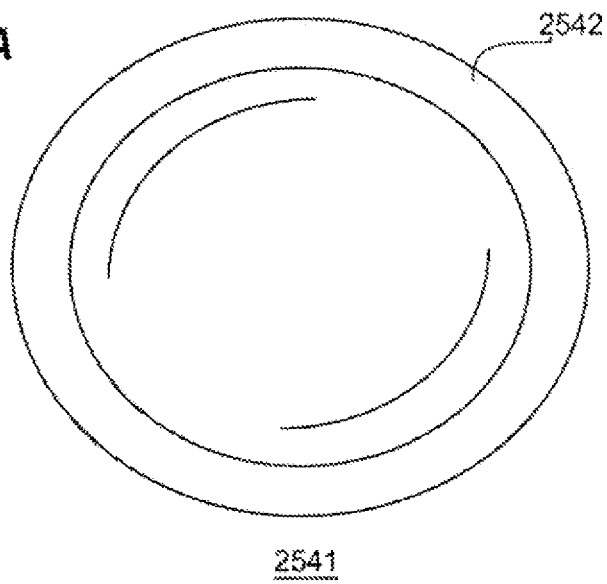
FIGS. 6A, 6B, and 6C are plan and elevation views of a stretched diaphragm member.
Figure 6B:
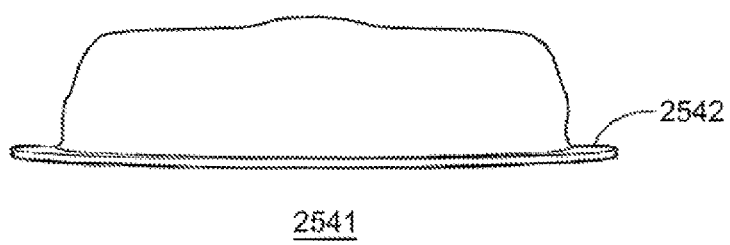
Figure 6C:

FIGS. 6A, 6B and 6C are a plan view and elevation views of a yield-in-place diaphragm member 2541 for a fluidic circuit element. In plan view, the apron 2542 is seen to be configured to seat in a generally cylindrical chamber. View 6B shows the appearance of the uncollapsed blister after its manufacturing process is completed in situ; however it will be understood that upon release of pressure, the web blister generally will collapse into an amorphous folded form and/or can be pressed so as to flatten against an opposing surface of the substrate, as drawn conceptually in FIG. 6C. The web has two states, a first distended state as shown in FIG. 6B and a second state as shown in FIG. 6C. However, it is understood that the film may be equally distended in both states, but at opposite sides of a microcavity, as would be the case if the microcavity consisted of hydraulic and pneumatic subcavities that had generally mirror symmetry. The two states may be described as being endpoints of a transitional process in which the diaphragm moves or inverts from the first state to the second state. In some instances, the pressure difference required to invert the film from a first state to a second state within the cavity is less than 3 psi. In other instances, the pressure difference required to invert the film within the cavity is less than 1 psi. In yet another working example, the pressure difference required to invert the film within the cavity is less than 0.1 psi and is substantially less than the pressure difference required to overcome the inertia of the liquid in the hydraulic cavity.

Figure 7:
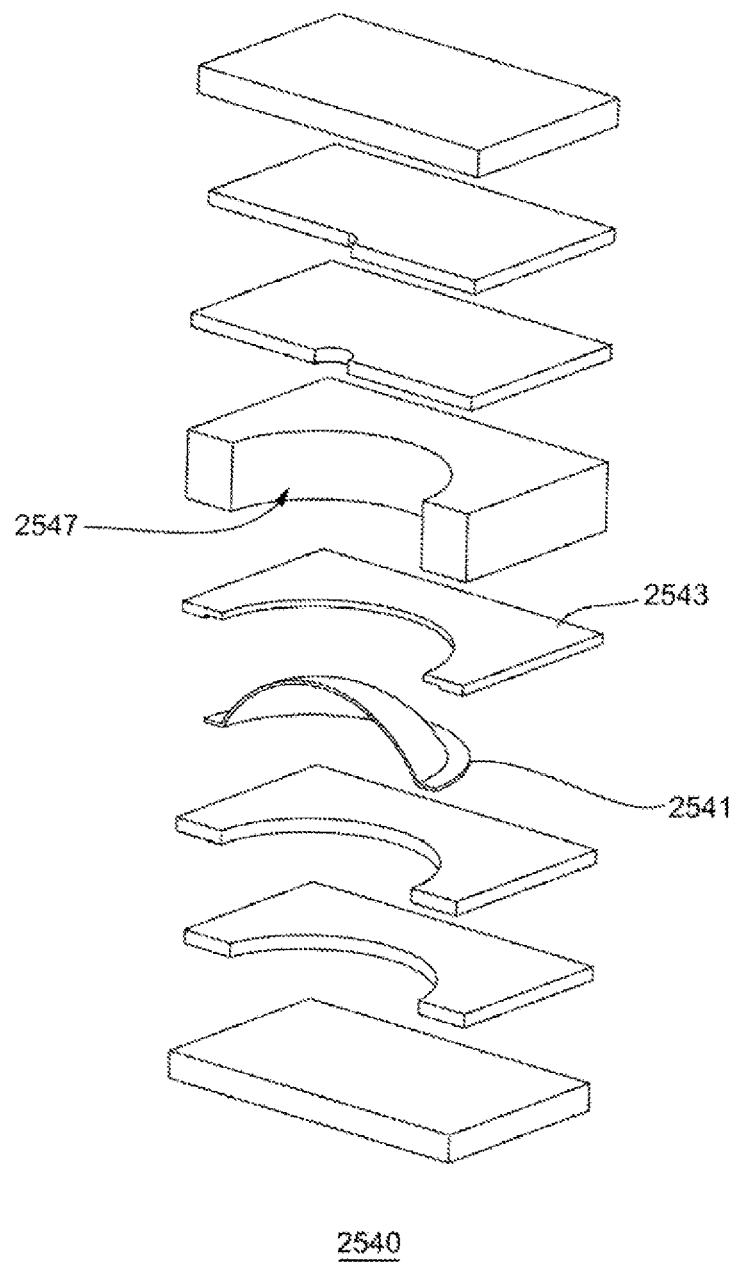
FIG. 7 is an exploded view of a diaphragm assembly in a chamber constructed by lamination. A diaphragm element having an apron is shown within the stack of layers.

FIG. 7 is an exploded view showing the construction of a pump structure 2540 by a process of lamination and includes a glue layer 2543. In this example, the blister shape of the diaphragm member 2541 is made after assembly by a "form in-place" process in which the yield strength of the diaphragm web is exceeded by an applied pressure. The diaphragm will be stretched to conform to the internal surface of the pneumatic cavity 2547. The diaphragm member has been cut to fit so that a single glue layer may be used.

Figure 8:
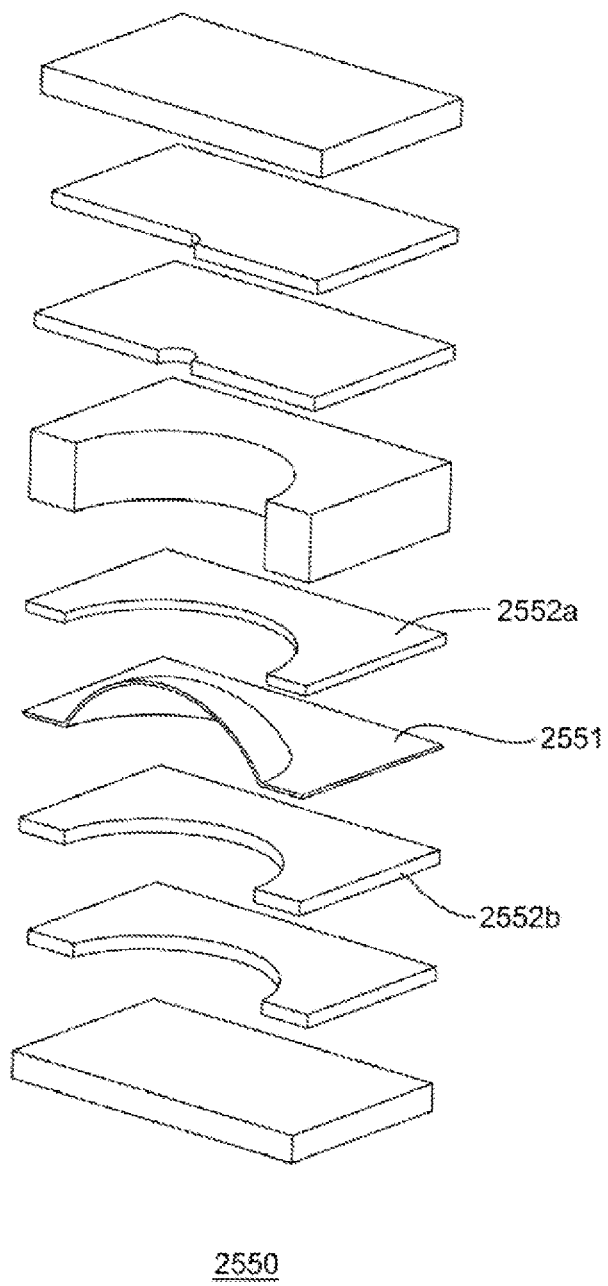
FIG. 8 is an exploded view of a layered chamber where the diaphragm element is formed from a layer of the device.

FIG. 8 is an exploded view of a pump structure 2550 formed by lamination, where an uncut sheet of diaphragm material 2551 is layered in the assembly stack. Two glue layers (2552a, 2552b) bond the diaphragm layer in the stack. The blister shape is again formed after assembly by a process of applying an internal pressure on one side of the diaphragm. The diaphragm will be stretched to conform to the internal surface of the cavity.

Figure 9A:
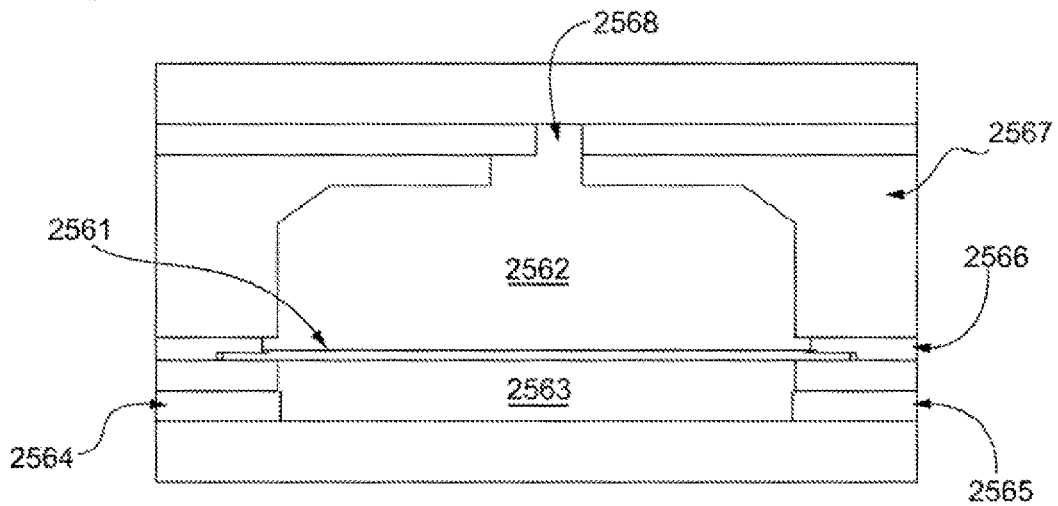
FIGS. 9A and 9B illustrate the operation of a diaphragm film.
Figure 9B:
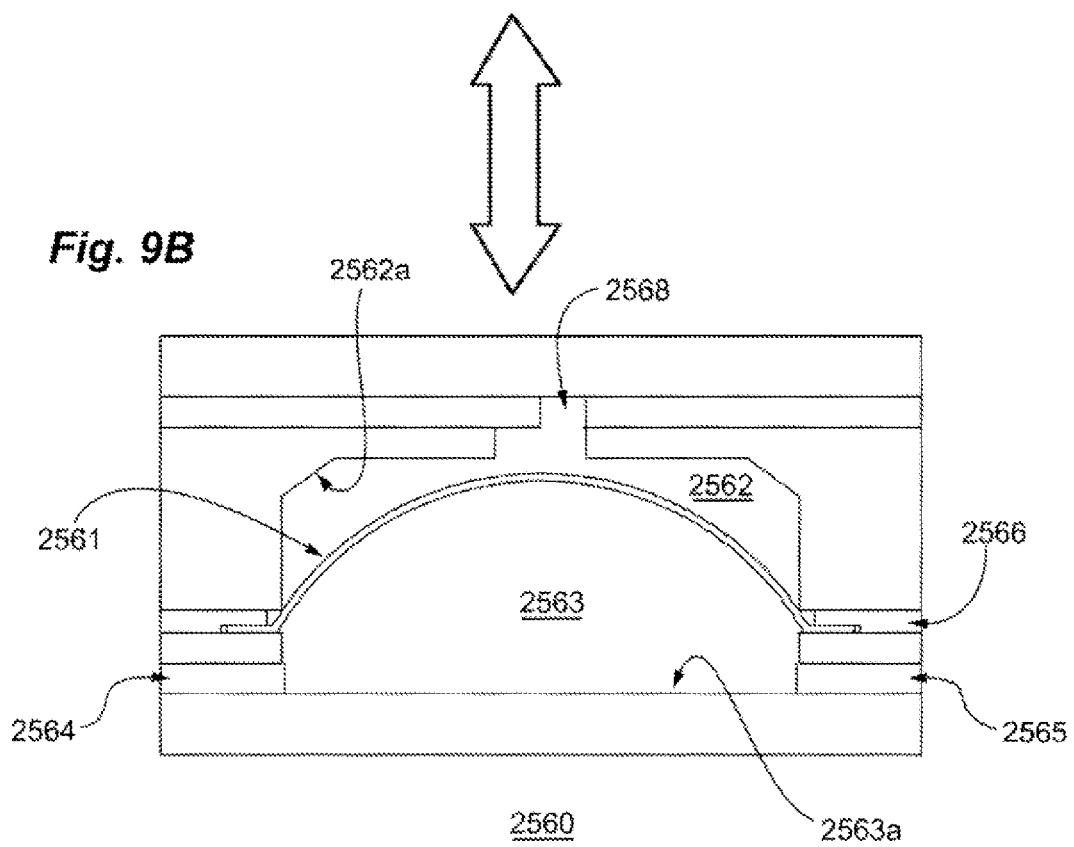

FIGS. 9A and 9B demonstrate how a diaphragm-driven micropump 2560 can be formed by a yield-in-place process of yielding a plastic film. The difference in enclosed volume between the stretched diaphragm web (2561, FIG. 9B) and base 2563a of the hydraulic subcavity 2563 is the ejection stroke volume of the pump. At full stretch, the diaphragm web conforms proximately to the interior roof and walls 2562a of the pneumatic subcavity 2562. Thus the process of manufacturing mimics the process of pumping and ensures a consistent stroke volume. This was first noted with films that were not resilient elastomers but had been chosen for chemical resistance. A particular film in this class was a co-laminate of a polyethylene terephthalate or vinylidene chloride sandwich disposed between layers of polyethylene, which is valued for its chemical resistance. We found that the first ejection stroke volume of a virgin film was significantly less than second or third ejection stroke volume of the film under normal conditions of use. After investigation, it was discovered that the film had stretched past its yield point and was irreversibly deformed by the process. In use, the film is stretched so as to approximately conform and have the surface area of the interior wall surface 2562a of the pneumatic subcavity 2562. Also shown in the figure are the hydraulic cavity 2563, liquid inlet 2564, liquid outlet 2565, glue layer 2566, molded substrate layer 2567, and pneumatic actuation duct 2568.

The form-in-place process is advantageous in its simplicity, but other means for forming an overstretched diaphragm include use of male and/or female molds to form the "blister" features on the sheet prior to assembly, where a sheet having pre-formed blisters is mated to align the locally-stretched diaphragm features with pre-formed cavities in the cartridge body. Pre-stretching of the diaphragms may be done with a mechanical platen press, or can involve a roll-to-roll process using a rotating die. Vacuum forming of the stretched web elements is also conceived.

In another variant of the process, a sheet of a thin film material may be layered over a pre-formed body half having cavities and circuit features. A press or a soft roller may then be used to stretch the film into the cavities, and a second body half may then be mated with the first to sandwich the diaphragm features in place. Excess material may be removed if desired. In some instances the diaphragm and the cartridge body are made of like or similar materials and can be bonded by thermal, ultrasonic or solvent welding. In other instances glue is used.

FIGS. 9A and 9B also demonstrate a comparison of thin film diaphragm 2561 in a virgin versus an overstretched configuration. In the overstretched configuration, the distended web of film 2561 has an arcuate length measured along its surface from edge to edge of the cavity 2505 that is longer than the chordal length (as measured along the unstretched film). The surface area of the stretched web member approximates the surface area of the internal roof and walls of the pneumatic subcavity 2562 (or will have the surface area of the larger of the two subcavities when stretched to fit). The enclosed volume of the stretched state is greater than the collapsed or relaxed state. Thus operating the device by use of pneumatic pressure at pressure port 2568 can be used to drive the diaphragm from a distended to a collapsed state in alternation, thus achieving a pump stroke for filling and ejecting fluid from subcavity 2563. These pumps are self-priming.

Figure 10A:
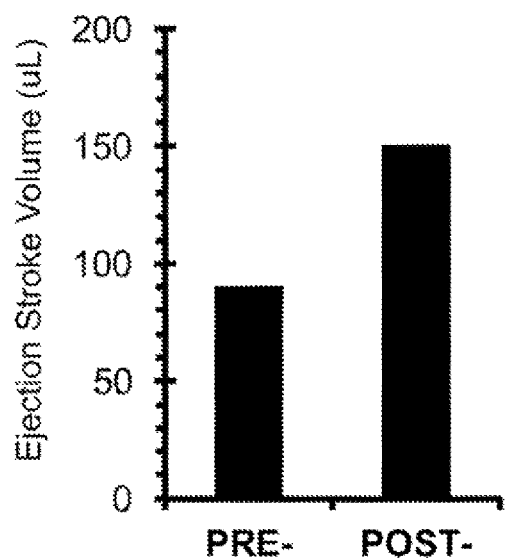
FIGS. 10A and 10B are plots of stroke volume before and after a cycle of stretching of a film past its elastic limit.
Figure 10B:
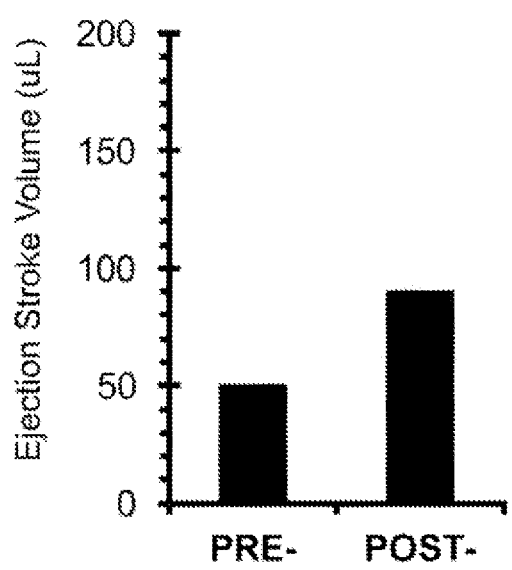

Stroke volume maturation is shown in FIGS. 10A and 10B. Ejection stroke volume of a stretchable plastic film before (PRE) and post (POST) stretch past the yield point is shown to result in a gain in stroke volume. It was discovered that diaphragm webs were stretching after assembly because the stroke volume increased with repeated use; this phenomenon was then exploited to form pre-stretched diaphragms having a maximal stroke volume for the dimensions of the pump cavity.

As a matter of quality control and reproducibility of operation, it proved advantageous to perform this stretching process prior to release of product or to conduct a "warm up" operation prior to starting an assay. Once the stretching process is complete, the stretched diaphragms operate with an increased ejection stroke volume (and decreased response time) that is no longer dampened by the elasticity of the film, as had been problematic with pumps and valves of the prior art. Materials may be used that are tougher and more chemically resistant than the polyurethane rubber diaphragms of the prior art. Typically these materials have yield points under 30 MPa, and more preferably under 20 MPa for micro-dimensioned fluidic features, but the blister may also be formed using mechanical means as described below, thus allowing those skilled in the art to form the inventive yielded webs from materials having higher yield strengths and correspondingly higher elastic moduli. Once stretched, the resistance required to transition the diaphragm web from a distended to a flaccidly collapsed state is negligible, such that the work required to move the film is essentially only that needed to overcome inertia of a fluid in the chamber, with no added work required to overcome the restorative force of the elastomeric diaphragms of the prior art.

As shown in FIG. 10A, ejection stroke volume for a SARANEX® diaphragm having a diameter of about 1.08 cm was found to increase from about 90 microliters (PRE) to 150 microliters (POST) by becoming overstretched, more than a 50% increase. The cavity ceiling (FIG. 9B, 320) limits ultimate stretch dimensions of the film and ensures a higher level of consistency of the nominal stroke volume in the manufactured product.

Similarly, as shown in FIG. 10B, a diaphragm having a diameter of about 0.88 cm was found have an ejection stroke volume of 50 microliters (PRE) before stretching and about 90 microliters (POST) after stretching, about an 80% increase. Diaphragms which have been stretched may be stored in a collapsed state until needed.

To better understand the materials behavior underlying the results shown in FIG. 10, we performed stress-strain analyses of several representative films. Yield stress and yield strain (load and deflection) were measured on an Instron universal materials testing machine (Instron, Norwood, Mass.) operated at strain ramping speed of 150 millimeters/min, a gauge length of 15 cm between grips, and a grip width of about 2.2 cm. Samples of films were generally 1 mil in thickness unless otherwise noted. Yield strengths were determined by standard methods as outlined in ASTM Test Protocol D882 (100 Barr Harbor Dr., PO Box C700, West Conshohocken, Pa. 19428). Testing is generally done at a controlled room temperature of about 23° C. Measured yield strengths are dependent on strain rate, temperature, and film characteristics, and one skilled in the art will understand that the material property parameters cited here are given with reference to standardized testing conditions.

One material of interest is low density polyethylene/ ethylene vinyl acetate/polyvinylidene chloride,/ethylene vinyl acetate, and low density polyethylene (LDPE/EVA/ PVDC/EVA/LDPE) co-laminate, sold under the trade name SARANEX®. FIG. 11 is a stress-strain analysis for a PVDC/PET/PE co-laminate film. The material has a limited elastic modulus and begins to deform at a yield point in the range of 12-16 MPa. The slope over the reversibly elastic range corresponding to an elastic modulus E=~80 MPa. At 50% on the strain axis, the material was allowed to relax, but displays an intermediate level of hysteresis with a return to zero stress, indicating a permanent deformation of 30% (i.e., L'/L). This overstretch results in an essentially stress-less response in subsequent cycles, as shown below.

Figure 12:
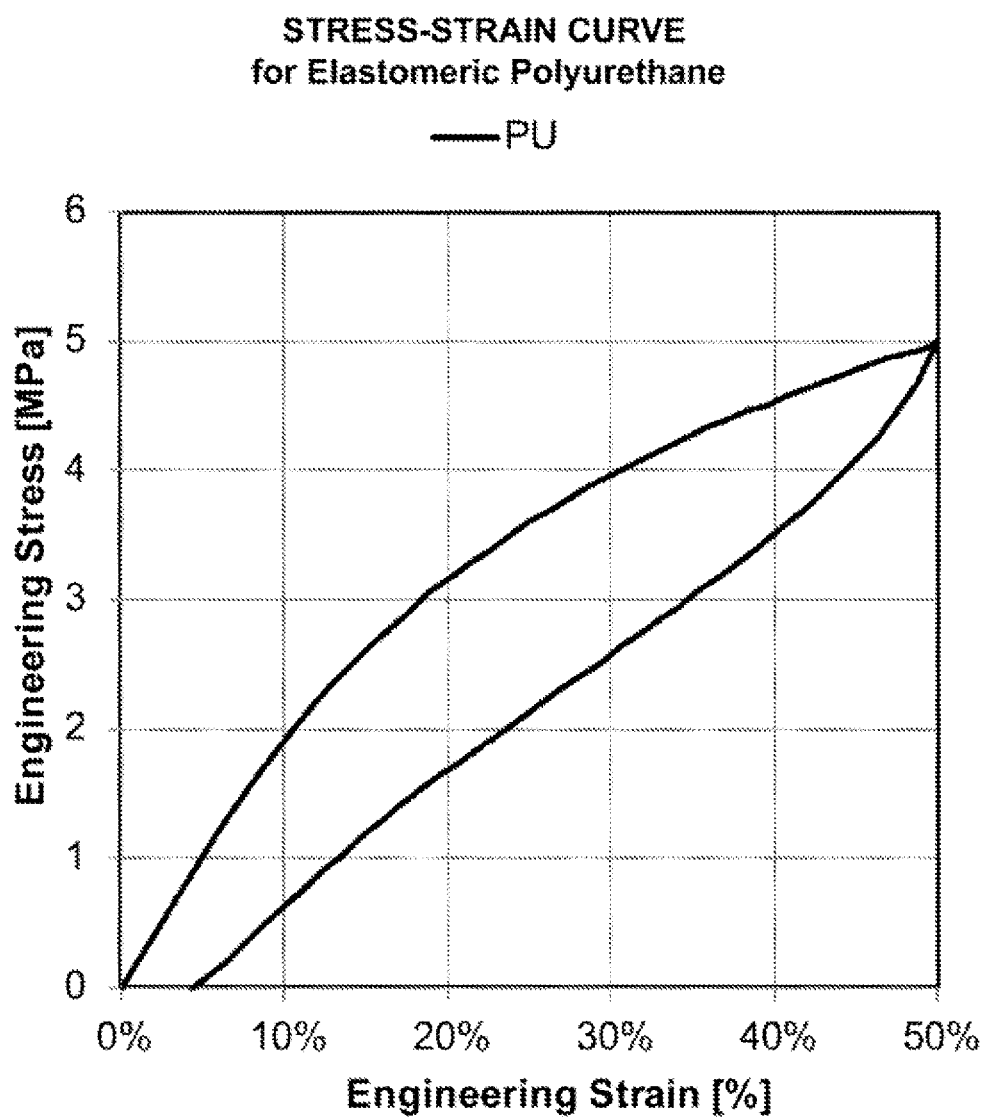
FIG. 12 is a stress-strain analysis for a film of an elastomeric polyurethane.

FIG. 12 depicts a stress-strain curve obtained with a 1 mil film of Polyurethane 7010 elastomer (Deerfield Urethane Inc., South Deerfield, Mass.). The film demonstrates elastic behavior over a broad strain range. No identifiable yield point is noted in this range and the minimal hysteresis on contraction is consistent with its spring-like behavior. Similar results were obtained with a second elastomeric polyurethane sample.

Disadvantageously, polyurethane 7010 was found to sweat or crack when exposed to common solvents used in biochemical assays, particularly solvents such as ethanol and methanol, or chaeotropes such as guanidinium salts. The diaphragm material degrades within minutes, pneumatic integrity is impaired, and the diaphragm can cease to function as a seal between the pneumatic and hydraulic subcavities. This behavior renders use of these polyurethanes problematic in certain molecular biological assay cartridges.

Figure 13:
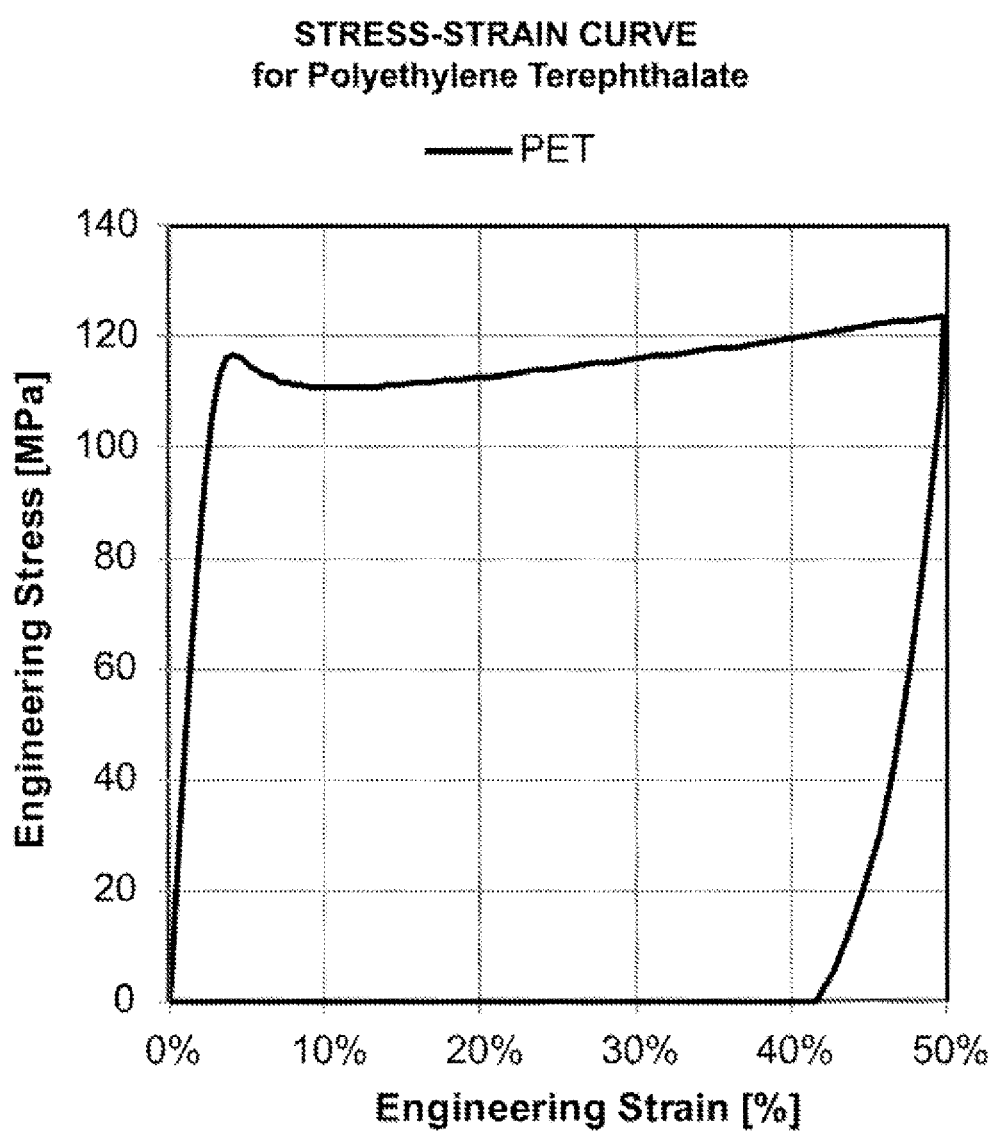
FIG. 13 is a stress-strain analysis for a film of a high modulus material: polyethylene terephthalate.

FIG. 13 is a stress-strain curve obtained with a thin film of biaxially oriented polyethylene terephthalate (BoPET, sold under the trade name MYLAR® by DuPont Teijin Films, Hopewell Va.). The material is very stiff, as indicated by the sharply elevated elastic modulus and the yield point above 100 MPa. The elastic limit of the material is exceeded at about 5% deformation. However, the lack of deflection under operating pressures likely to be useful in real-world devices also raises the issue as to whether a device having these materials can be reliably self-priming. While BoPET is expected to be a tough material, it is a high modulus material and has a stiffness that is problematic in a yield-in-place process within the plastic body of a cartridge.

Figure 14:
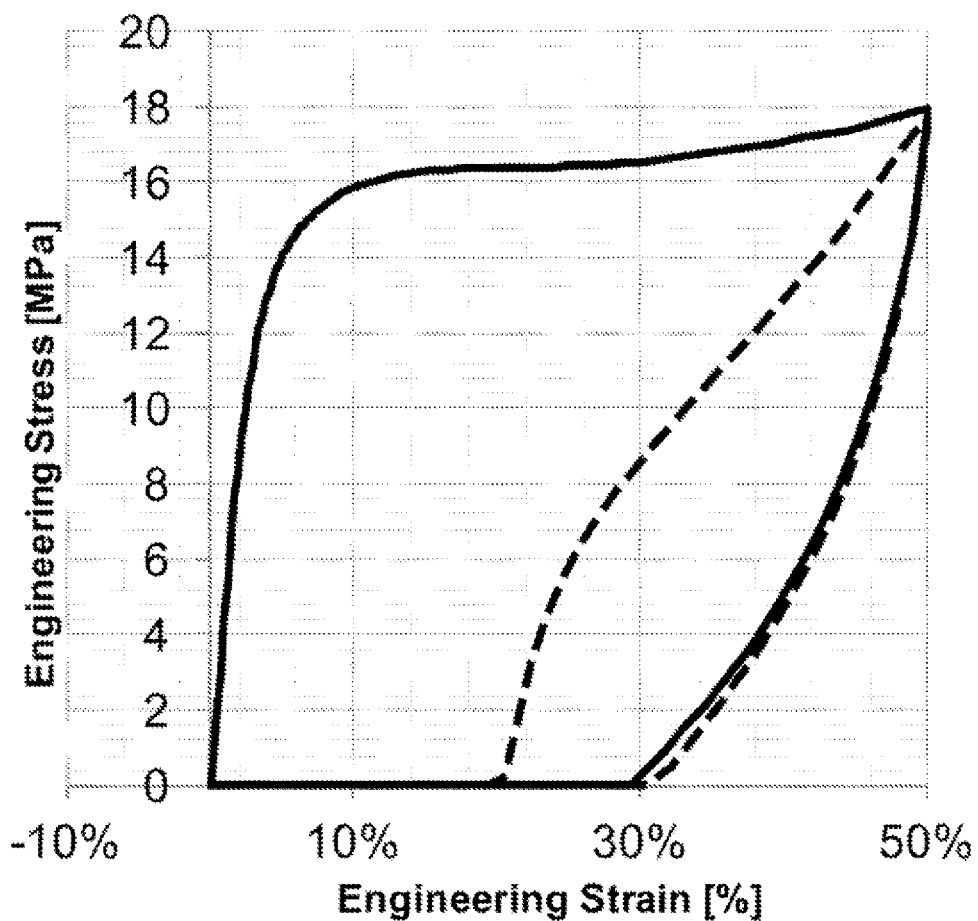
FIG. 14 is a stress-strain analysis showing hysteresis in three serial stretch and relax cycles of a co-laminate film of low density polyethylene/ethylene vinyl acetate/polyvinylidene chloride,/ethylene vinyl acetate, and low density polyethylene

FIG. 14 is a stress strain curve for a PVDC/PET/PE co-laminate taken after repeated cycles of strain and relaxation. As can be seen, following the first cycle (FIG. 11), subsequent cycles display little or no "memory" of the virgin film properties and shape. The slightest pressure results in a rapid ballooning of the film and essentially no elastic recovery is observed. This behavior reduces stroke response time and resistance compared to elastomeric materials. In its stretched form, the film retains a suitable level of toughness for use in disposable cartridges of the invention.

Figure 15:
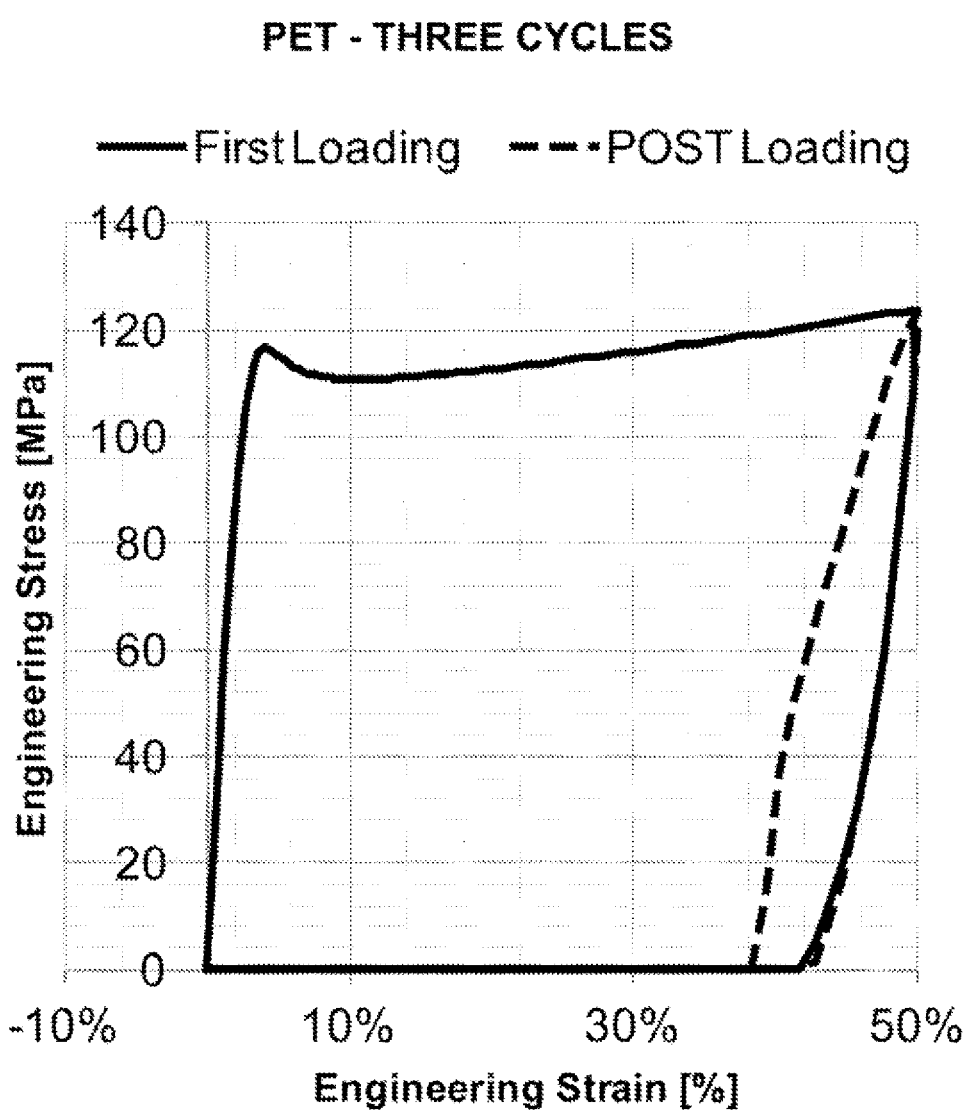
FIG. 15 is a stress-strain analysis showing hysteresis in three serial stretch and relax cycles for polyethylene terephthalate.

FIG. 15 shows the effect of repeated cycles of strain and relaxation on BoPET. Once plastic deformation is achieved, the overstretched material loses any resistance to serial application of pressure. On repeated exercise of the film, essentially no force is necessary to distend the film (dashed line). However, the initial stretch step (solid line) requires a substantial application of force.

The size of features that can be formed in a material having a defined yield strength is dependent on the applied pressure or force such that an increased degree of miniaturization that can be achieved by selecting materials with lower yield strengths. However, materials that have very low yield strengths, such as those having a yield strength less than 2 MPa, are likely to prove delicate and difficult to handle in a manufacturing environment and for that reason are not considered to be good candidates for making the locally stretched diaphragm webs of the invention.

FIGS. 16A and 16B are cross-sectional views of a microvalve 2600 in the body of a microfluidic device, showing an "ON" (or "open") and an "OFF" (or "closed") configuration of a diaphragm web 2601. The valve body is formed of multiple layers which include outside capping layer 2602 and a core formed by fusion of a molded pneumatic plate member 2603, a via plate member 2604, and a molded hydraulic plate member 2605 such as by diffusion bonding, or by an optional ACA glue layer 2612. Diaphragm 2601 is sandwiched between plates 2603 and 2604. The valve cavity consists of a pneumatic cavity 2606 and a hydraulic cavity 2607 separated by the diaphragm. Two fluidic channels (2608, 2609) are shown entering the hydraulic cavity 2607 through dual ports in a valve seat; the ports are separated by a valve sill 2610. In the closed position (FIG. 16B), the valve diaphragm seats on the valve sill and is pressurized at pneumatic port 2611 to resist flow of fluid from one channel to another. In the open position (FIG. 16A), the diaphragm is retracted into the pneumatic cavity 2808 and fluid is free to flow across the valve sill from channel 2608 to 2609. Movements of the diaphragm are actuated by a pneumatic subcircuit ported into the pneumatic cavity at port 2611.

In other words, the valve includes a) a plastic body with internal valve cavity, the valve cavity being defined by a first enclosing lower surface and a second enclosing upper surface, where the first surface defines a valve seat and the second surface sealingly apposes the first surface at a lip 2620 bounding the valve cavity; b) a diaphragm member with apron 2621 peripherally defined therearound, wherein the apron is sealedly inserted into the body under the lip to separate the first surface from the second surface; c) a first fluidic channel entering the valve cavity through the valve seat at a first port; d) a second fluidic channel entering the valve cavity through the valve seat at a second port; e) a valve sill 2810 defined on the first surface between the first port and the second port; and further wherein the diaphragm member is capable of being reversibly deflected against and retracted from the valve sill, thereby defining an "OPEN" position and an "OFF" position for allowing or not allowing flow of a fluid between the first channel and the second channel.

Figure 17:
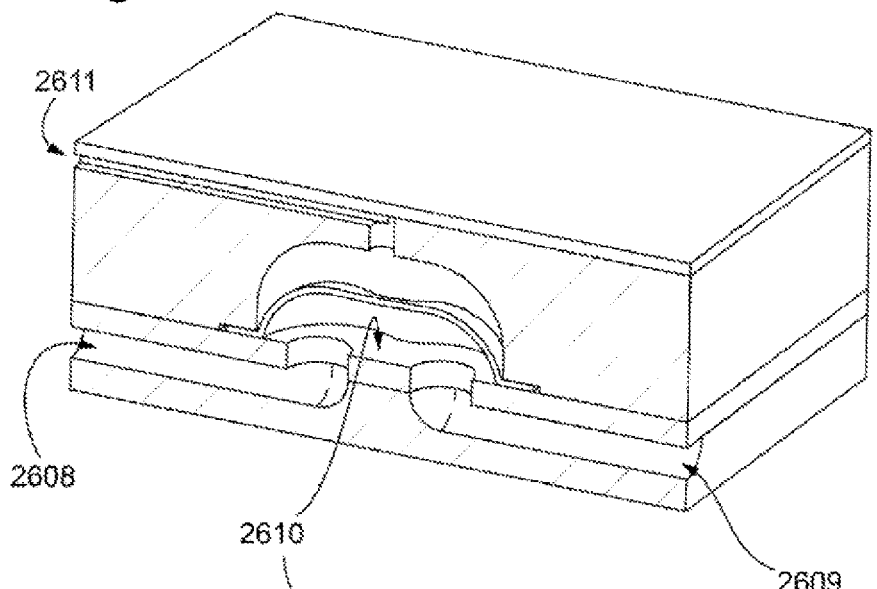
FIG. 17 is a cutaway view of a valve with inelastically deformed diaphragm.

FIG. 17 is a cutaway perspective view of the valve structure of FIG. 16. In this instance the footprint of the valve has a roughly "peanut" shape with an obvious waist narrowing in proximity to the valve sill 2610. The diaphragm is shown as a partially distended, half peanut-shaped bulb within the valve cavity.

Figure 18A:
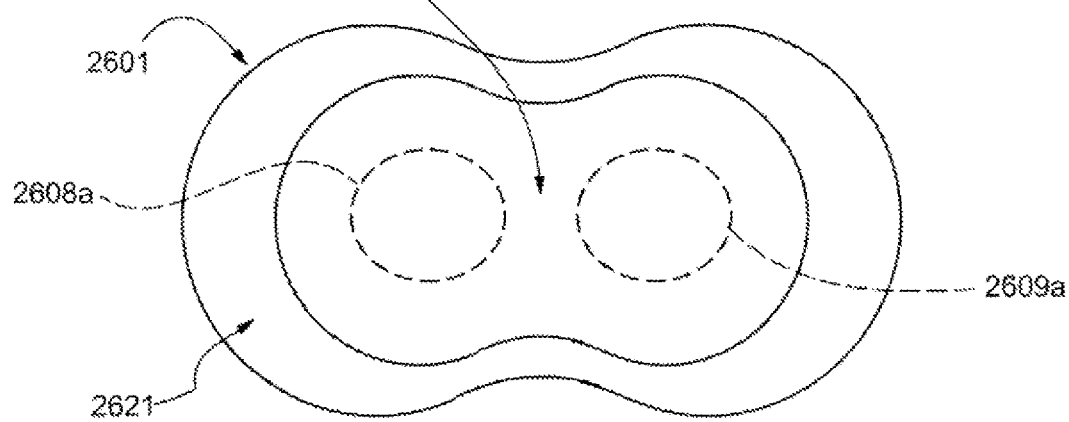
FIGS. 18A and 18B are plan and elevation views of an overstretched diaphragm member for a fluidic microvalve.
Figure 18B:
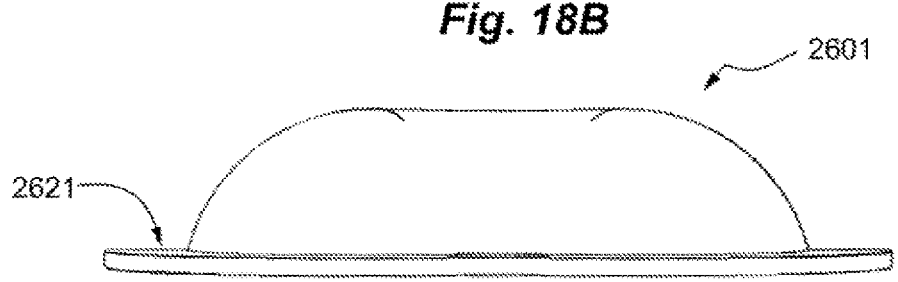

The peanut shape can be seen more clearly in FIG. 18A. The diaphragm member 2601 is bilobate and includes an apron 2621 peripherally disposed around the central bulbs. Positions of the inlet and outlet ports (which are not part of the diaphragm) are indicated as dotted lines (2608a, 2609a). FIG. 18B is an elevation/perspective view of a diaphragm member 2601 with apron 2621 for a fluidic microvalve. The surface area of the stretched web approximates the interior wall surface area of the pneumatic subcavity 2606. The valve diaphragm is stretched into a bulbous or "blister" shape (conforming generally to the internal cavity in which it is formed) after depressurization and, unlike valves formed with an elastomeric diaphragm, may be advantageously supplied in the "OPEN" position in which there is essentially no resistance to fluid flow in the hydraulics of the device (i.e., from channel 2608 to 2609). Application of positive pressure through the pneumatic control line 2611 collapses the diaphragm against the valve seat 2610 and turns the valve "OFF".

Figure 19:
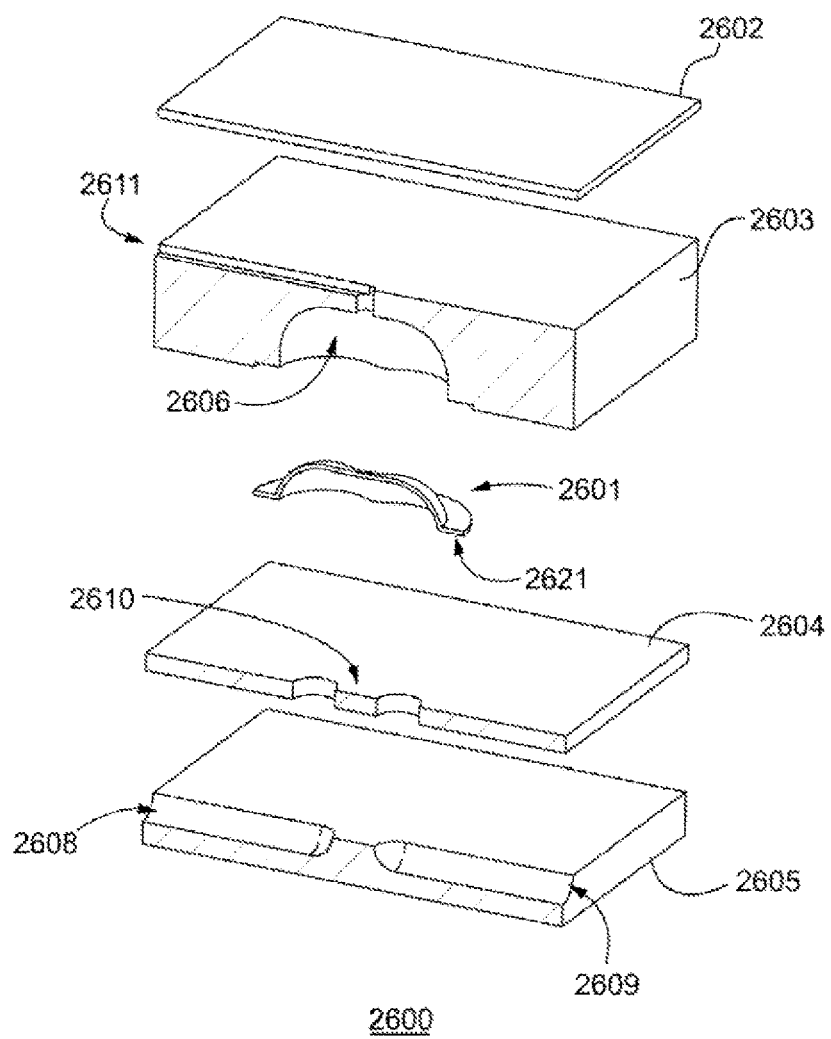
FIG. 19 is an exploded view of a valve structure having an overstretched diaphragm.

FIG. 19 is an exploded view of the valve device 2600 of FIGS. 16-18. By stretching a suitable diaphragm material, the footprint of the valve body can be further miniaturized. Because of the pliancy of LDPE/EVA/PVDC/EVA/LDPE and other stretch wrap films, for example, very small diaphragm features can be prestressed using the yield-in-place process. Shown are stretched diaphragm 2601 with peripheral apron 2621, capping layer 2602, pneumatic layer 2603 with pneumatic cavity 2606, via layer 2604, hydraulic layer 2605, with inlet and outlet channels (2608, 2609) as marked.

The depth of the valve cavity 2606 in the z-dimension is exaggerated for purposes of illustration. Valves of this type may be manufactured in the "OPEN" position, but can be reversibly closed at high speed (i.e., with reduced latency) by applying a pneumatic pressure of 2-12 psi through the pneumatic control line 2611. The valve diaphragm is stretched into a three-dimensional blister shape by application of pressure during manufacture, as in a yield-in-place process described with reference to FIG. 5, or by mechanical action as part of assembly or pre-assembly. In the yield-in-place process, pressure is applied through the fluidic circuit or by applying negative pressure through the pneumatic circuit so as to yield and conform the polymeric film to the bulbous interior contour of the pneumatic subcavity 2606. Alternate mechanical processes for pre-stretching the web will be described below.

By selection of a suitable film, and by adjustment of the conditions for yield-in-place stretching of the film during the manufacturing process, valves of this type having valve seats of less than about 0.5 mm in length and 0.3 mm in width are readily obtained. Referring to the yield-in-place process, preferred films for millimeter-sized valves include linear low density polyethylene (particularly metallocene-catalyzed LLDPE), low density polyethylene blends and co-laminates generally, polyethylene vinyl acetate copolymers and laminates, polyvinylidene chloride and PVDC co-polymer and laminates, and selected polyolefin composites and laminates, while not limited thereto. With a suitable film, pneumatic valve features in the sub-millimeter scale are approachable. Generally, films having yield strengths of less than 15 or 20 MPa under manufacturing conditions are preferable for making smaller valve features. A particularly preferred range is 5 to 20 MPa; and for some applications 2 to 15 MPa. While yield strengths are cited for films under standard test conditions, it is understood that increased process temperature may also be used to optimize conditions for manufacture of microvalves by this method.

Figure 20A:
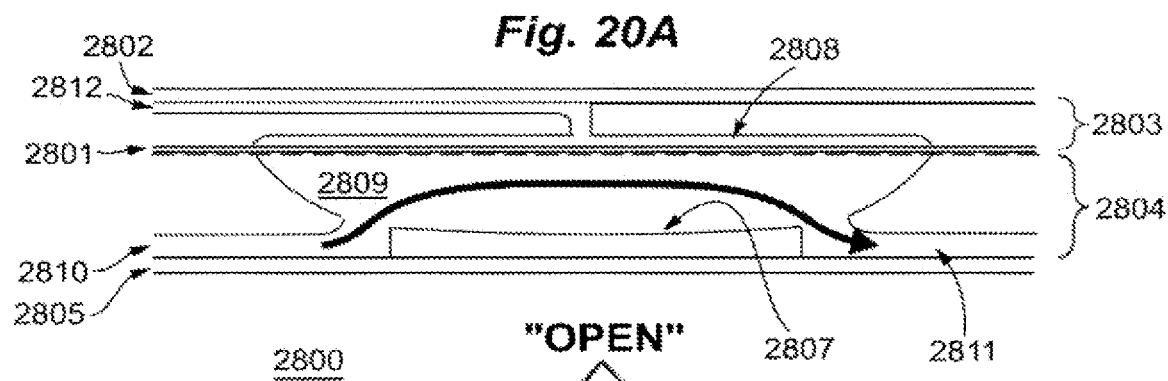
FIGS. 20A and 20B are cross-sectional views of a microvalve structure, showing an "OPEN" and an "OFF" configuration of the valve diaphragm.
Figure 20B:
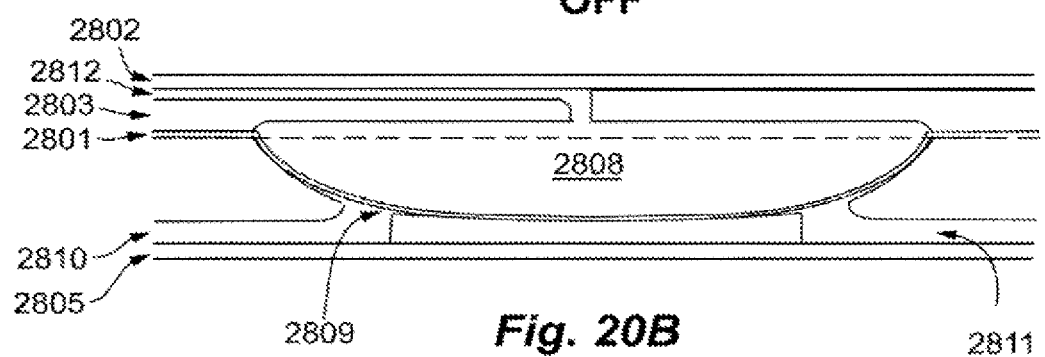

As shown in FIG. 20, alternate valve structures 2800 may be formed having yielded diaphragm webs. The process of stretching the web to conform to an internal surface of the valve cavity may be used to make zero deadspace valves that are fluidically "OPEN" or are fluidically "OFF" when shipped. Initial stretching is generally achieved by applying a positive pressure or force to the top of the diaphragm, forcing the diaphragm against the bottom surface of the bowl that forms the valve seat or land. The valve is shown in the "OFF" configuration in FIG. 20B. However, application of a pressure pulse to the fluid side (and optionally zero or suction pressure on the pneumatic side), readily allows the valve to open because there is essentially no elastic modulus-related resistance as in prior art valves. Alternatively, a suction pressure can be applied to the pneumatic cavity, which transitions the valve back to the state or configuration shown in FIG. 20A, but with the stretched diaphragm having a collapsed blister shape in which the surface area of the valve is greater than the upper internal surface area of the valve chamber, thus resulting in a folded irregular condition of the web which is readily reversible in the closed, distended state. In our experience, these valves can withstand many actuations and closures during a typical cartridge lifetime, which is a few minutes to a few hours, and the deformation is not a hindrance to fluid flow in the "OPEN" state. Diaphragm materials in these cartridges are generally yielded to form permanently overstretched film structures before release for sale, but may also be yielded in some embodiments during a preparatory step immediately before use in an assay.

In use, these valves may also be closed by applying a suction pressure to a downstream fluid column or by applying a positive pressure to the pneumatics, thus draining and/or expelling any residual fluid volume from the valve cavity. Control of gas (venting) or fluid flow through the valve may be modulated by varying the ratio of pressure on the hydraulic and pneumatic sides of the diaphragm or by applying pulsatile waveforms of alternating positive and negative pressures.

The valves may be constructed by lamination or by fusion of molded body parts. Shown here are top capping layer 2802, diaphragm 2801, pneumatic body layer 2803, hydraulic body layer 2804, and bottom capping layer 2805. Also shown are valve seat 2807, pneumatic cavity 2808, hydraulic cavity 2809, first fluidic channel 2810, second fluidic channel 2811 and pneumatic actuation circuit 2812. The dark arrow indicates fluid flow when the valve is in the "OPEN" position (FIG. 20A). The double arrow indicates transition from the "OPEN" position to the "OFF" position, where fluid flow is blocked by the distended diaphragm on the valve seat 2807 (FIG. 20B).

The hydraulic body part 2803 and pneumatic body part 2804 are depicted as molded parts and are joined at the dashed line by the diaphragm layer 2801, which may be a layer of BoPET, SARANEX, polyvinylidene chloride, or other thin film that is stretchable by the processes described here. Optionally, elastic thin films may be used. However, a pre-stretched film is advantageously flaccid and is actuated without the inherent resistance of an elastomer. Hydraulic pressure in a liquid entering the valve from port 2810 is sufficient to cause fluid flow in a fully open state.

Figure 21:
FIG. 21 is a perspective view of a diaphragm web of FIG. 20.

FIG. 21 is a view of a yielded, bilobately stretched diaphragm or "blister" diaphragm of a microdevice 2800, and the web of the diaphragm is surrounded by an apron 2815. The apron is pinched between the body layers (2803, 2804) around the edges to separate the hydraulic subcavity and the pneumatic subcavity (2808, 2809) of the microvalve. This blister shape is flaccid, and the work required to collapse the blister is negligible relative to the work required to overcome the inertia of the fluid under microfluidic conditions.

Figure 22A:
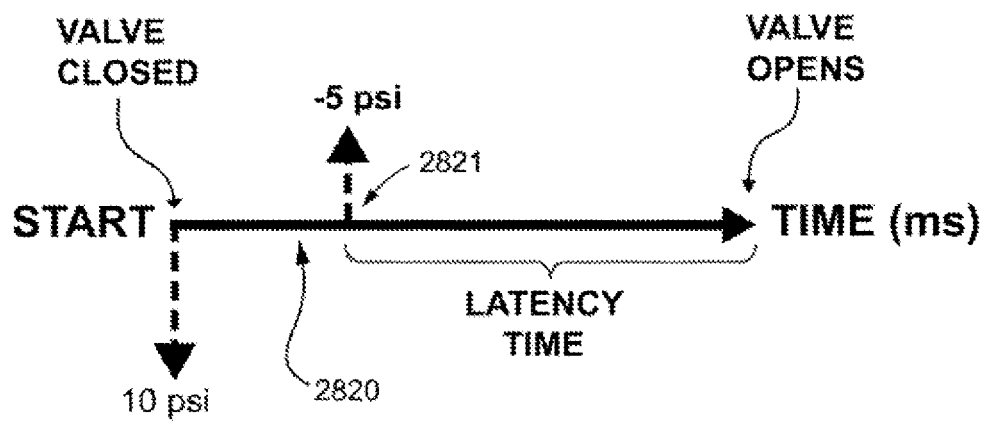
FIG. 22A illustrates the concept of valve latency. Data for a pre-stretched yield-in-place valve is compared to a conventional elastomeric valve in FIG. 22B. The latency time is reported in milliseconds.
Figure 22B:
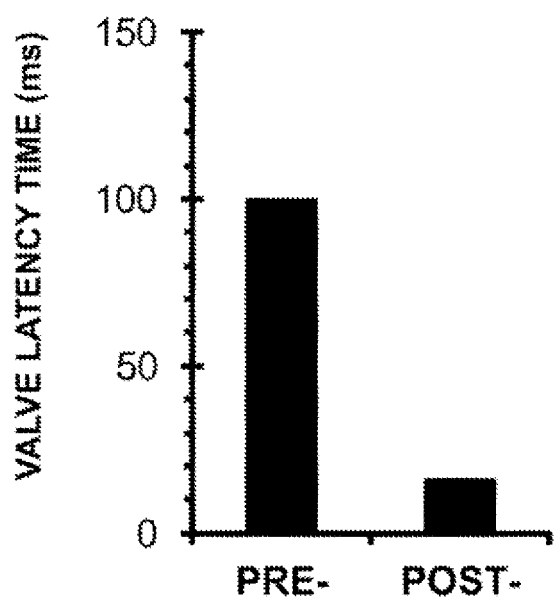

FIGS. 22A and 22B introduce the concept of valve latency. The time it takes to turn on and off a valve is important in all fluidic processes, particularly for diagnostic assays where mixing, heating, and reaction kinetics are dependent on rapid valve actuation. In this example, a 10 psi sustained pressure on the pneumatic side of the diaphragm is responsible for keeping the valve in the CLOSED state at the START of the timeline where the timeline is represented by arrow 2820 running from left to right. By releasing the positive pressure and applying a negative 5 psi suction pressure on the pneumatic side of the diaphragm at time 2821, the valve begins to transition to the OPEN state. However, this transition is not instantaneous and the delay is termed the "latency time". In addition to the obvious concerns about stickiness of the diaphragm against the valve land, there are also material stiffness and elasticity that can slow valve opening. Thus as achieved by conventional arts, valve latencies can be about 100 ms. However, and as shown in FIG. 22B, by pre-treating the diaphragm by a stretching process, valve latency is substantially reduced. Because the material is pre-stretched, its resistance to transitioning from an open valve state to a closed valve state is negligible, and can occur with minimal pressure, either in response to a negative pressure in the pneumatic actuation manifold, or by a positive fluid pressure in the hydraulic works. Latency in the example shown, using a SARANEX® diaphragm was measured at about 100 ms prior to stretching but after pre-stretching (POST) was reduced to less than 20 ms to full opening. This is a surprising result and would not have been an obvious action of known elements behaving in predictable ways.

A negative pressure in the hydraulic works or a positive pressure in the pneumatic works is generally sufficient to close the valve depicted in FIG. 20, for example. Moreover, these valves may advantageously be used in valve logic trees having a zero pressure state (typically a vent to atmosphere on the pneumatic side). In short, the valves may be operated to open passively and close actively, if desired, an advance in the art over conventional valves. Surprisingly, this innovation eliminates the problem of sticky valves that can occur in stored product using elastomeric or rigid diaphragm materials.

Thus in another aspect, a pneumohydraulic valve is provided wherein the valve is OPEN with no resistance to hydrostatically driven fluid flow when said pneumatic cavity is at atmospheric pressure (i.e., the pre-stretched diaphragm is flaccid) and OFF or closed when pressurized by a pneumatic pressure greater than a hydrostatic pressure in the hydraulic chamber (for example as shown in FIG. 20, the pre-stretched valve conforming to the features of the valve seat 2807 to fluidly separate the inlet and outlet ports). More broadly, in this aspect, the invention comprises a pneumohydraulic valve having a pneumatic cavity and a hydraulic cavity separated by a yielded diaphragm film, wherein the valve is OPEN with no resistance to hydrostatically driven fluid flow when said pneumatic cavity is at atmospheric pressure and CLOSED or off when pressurized by a pneumatic pressure greater than a hydrostatic pressure at either the inlet or the outlet of the hydraulic chamber. It would be understood by those skilled in the art, that increasing hydrostatic pressure on a liquid in the hydraulic cavity would readily displace a flaccid diaphragm film, and conversely, increasing the pneumatic pressure relative to the hydraulic pressure would inflate the diaphragm to its stretched shape and displace any fluid from the hydraulic cavity.

We now introduce the concept of a critical web dimension $L_c$ as theory, where the "web" of a diaphragm 2501 is modeled as a circular pressurized bulge (as shown pictographically in FIGS. 1A and 2A) and chordal length L is defined in reference to FIG. 3. The critical web dimension $L_c$ is the minimal web length for which a defined pressure will result in a defined overstretch. The smaller the web dimension, the more pressure required to achieve the desired stretch. The relationship approximates a parabolic curve in which a pressure in excess of 30 psi is needed to achieve deformation of a 2 mm web of a thin film having selected material properties. The derivation generally follows Freund LB and S Suresh, 2004. Film buckling, bulging and peeling. In, Thin film materials—Stress Defect Formation and Surface Evolution. Cambridge University Press, pp 312-386. A circular web of a thin film was analyzed as it deforms into a spherical cap by the action of an applied pressure P. Assuming the thin film deforms with a constant radius (i.e., a spherical deformation) and a constant equi-biaxial strain throughout the membrane (i.e., the radial and circumferential strains are equal and constant at all points in the film), the stress in the membrane can then be related to strain as a function of Young's modulus, Poisson's ratio, and the film thickness. Neglecting bending stress within the material (i.e., assuming a thin film), the stress at the circumference of the feature can be related to the pressure. Strain is then calculated as L'/L, the change in arc length from a flat film to a distended film. Finally, the critical diameter $L_c$ for a given pressure can be derived analytically in cases where the deflection of the membrane is much less than the diameter of the feature.

Figure 23:
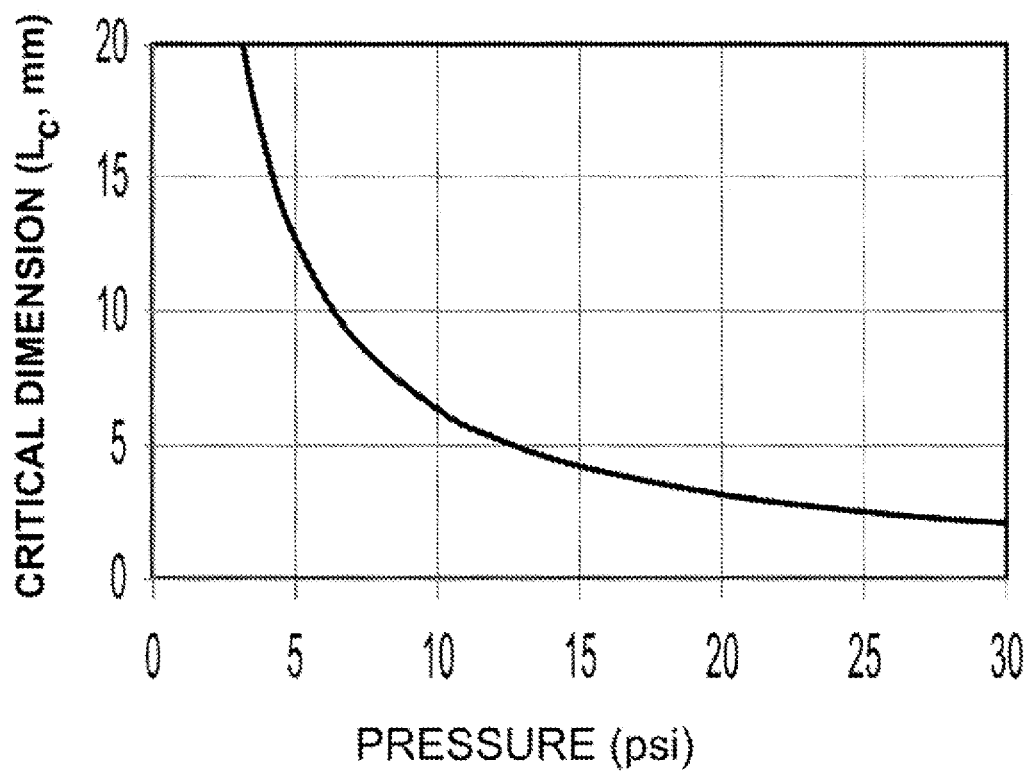
FIG. 23 is a theoretical analysis of the relationship between a critical web dimension $L_c$ and a process pressure required to achieve a defined overstretch.

In FIG. 23, the critical web dimension $L_c$ of a film having the characteristics of SARANEX® film is calculated and plotted against the pressure at which a 6% yield is expected to occur. As can be seen, as the film dimension L is reduced, higher pressure is required to stretch the film. Plastic deformation of SARANEX® of more than 6.0% is predicted only if the diaphragm web spans a dimension greater than $L_c$ for a given pressure. For example, a yield-in-place feature of about 3 mm is expected by stretching a SARANEX® diaphragm under 30 psi of applied pressure, which approaches the internal pressure at which damage to a laminated microfluidic cartridge is expected.

However, the above analysis has several shortcomings: the assumption of a spherical deflection and equi-biaxial strain are not valid for non-circular geometry, and strain will not be constant throughout the web in a real valve. Also, the assumption that the deflection is significantly less than the feature size does not hold, which will lead to an inaccurate analytical result. Another shortcoming is the insufficiency of the material data for Young's modulus, which is rate dependent, and Poisson's ratio. The strain rate used in standardized materials testing is likely at least an order of magnitude less than that of a pneumatically actuated valve in operation. Lastly, as the film distends and thins, the stress for a given pressure will be higher due to a reduced cross sectional area. This could push the estimate of $L_c$ to higher pressures or larger diameters. In short, the engineering is highly unpredictable and complex, and the behavior of working valves cannot realistically be achieved without experiment.

Surprisingly, in spite of theory, we found experimentally, using pressures less than 20 psi, that valve diaphragms may be formed from 1 mil SARANEX® thin films (having a yield point in the range of 12-14 MPa) in cavities having dimensions of about 2×3 mm and geometry essentially as shown in FIG. 18. This finding was unexpected, but welcome, because 20 psi (at elevated temperature) is within the working limit for pressurization of laminated device bodies without damage. Overstretch achieved was greater than 6% by length. Our theoretical analysis had suggested that microvalves of this size could not successfully be made at pressures less than 30 psi, raising the concern that "yield-in-place" or "form-in-place" stretch processing in a laminated device body would be impractical because of limitations on internal pressure that could be tolerated by the device.

FIG. 24 shows the results of an experimental study of overstretch behavior of a LDPE/EVA/PVDC/EVA/LDPE co-laminate diaphragm sealed over a pneumatic chamber that is about 2 mm by 3 mm. An initial pressure was applied to remove any initial looseness. Center point deflection was measured optically before and after application of a pressure sufficient to cause plastic deformation of the film. The change in plastic strain $\Delta\epsilon$ is calculated as $$\Delta\epsilon = \sqrt{(\delta_5^2 + R^2)} - \sqrt{(\delta_0^2 + R^2)})/\sqrt{(\delta_0^2 + R^2)}$$

where load deflections are measured optically before ($\delta_0$) and after ($\delta_5$) pressure treatment of the film. Three results (as increase in centerline stroke displacement) are shown following pressure treatment at 10, 15 and 18 psi. An approximate doubling of the membrane stretch was obtained after pre-treatment at 18 psi, significantly greater than at 10 psi, demonstrating that treatment with about 15-20 psi is sufficient for yield-in-place diaphragm manufacture using LDPE/EVA/PVDC/EVA/LDPE co-laminate and the valve cavity has a height above the valve seat of about 100 micrometers.

This demonstrates that the inventive process achieves surprisingly small microvalve features, features having dimensions that would not have been predictably achieved by application of known methods. For thin films having a yield strength of less than 30 MPa, standardized process pressure and temperature conditions can be selected to achieve stretch-in-place fluidic features having a desired size range. And as a corollary to that finding, using films having yield strengths less than 15 MPa will result in yet smaller pump and valve features, an improvement that enables increased miniaturization. A synergy is achieved by using materials having lower yield points as valve diaphragms, and stronger materials for structural members forming the microvalve cavity and associated channels.

Although PET is not considered suitable as a thin film for manufacture of form-in-place microvalves due to its high yield stress, PET is useful for the manufacture of device bodies, and thin films of PET can be incorporated by mechanically stretching the material where diaphragm webs are to be formed. Thus the invention is not limited to lower strength diaphragm materials. Where mechanical stretch processing is contemplated, a broader range of yield strengths may be considered. For example, while not limited thereto, materials such as BoPET, having a yield strength of about 100 MPa, may be incorporated by a mechanical stretch process as described in the following figures.

Figure 25A:
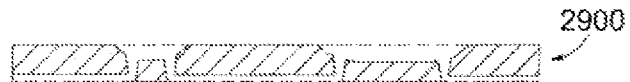
FIGS. 25A through 25F are sequential views of steps in a first process of mechanically stretching a diaphragm film in place.
Figure 25B:
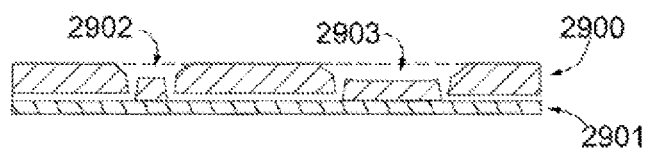
Figure 25C:
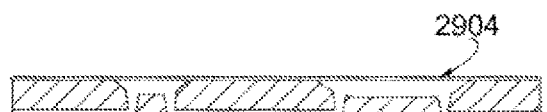
Figure 25D:
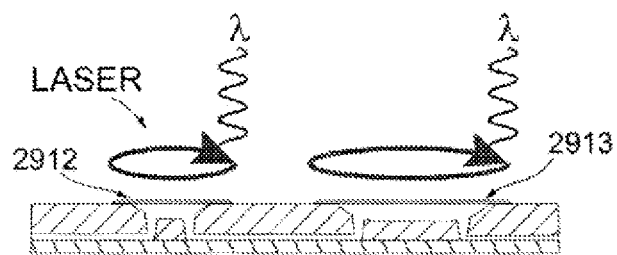
Figure 25E:
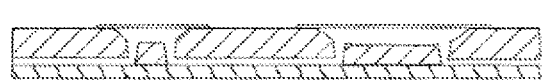
Figure 25F:
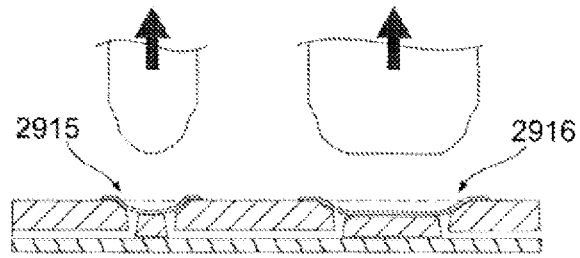

FIGS. 25A through 25F are sequential views of steps in a first process of mechanically stretching a diaphragm film in place. The figures describe a process of building a microfluidic device enclosing a valve and a pump cavity, where both diaphragms are stretched by a mechanic press prior to final assembly. FIG. 25A shows a first molded body member 2900 having internal cavities and channels; and in FIG. 25B a lower capping layer 2901 is added to seal the channels. Viewed in cross-section are a hydraulic subcavity of a valve 2902 (with valve sill separating two fluidic channels) and a hydraulic subcavity of a pump 2903 (with an inlet and an outlet). This forms the hydraulic works of the device, and defines a hydraulic valve subcavity and pump subcavity with internal pumping as depicted schematically. In FIG. 25C, a thin film sheet of a suitable diaphragm film 2904 is overlaid on top of the hydraulic subassembly, covering the valve and pump subcavities. Then, the thin film material is welded or tacked to the molded part and excess material is stripped away in a laser cut-weld, resulting in the valve and pump diaphragm web members (2912, 2913) depicted in FIG. 25D. The welding and cutting step is performed using a laser on an X-Y table, for example. In a next step (FIGS. 25E to 25F), mechanical fingers (2910, 2911) having suitable dimensions are used to force (arrows) the diaphragm webs into the hydraulic subcavities under process conditions suitable to overstretch the film past its yield point and permanently deform the webs into the shape of a blister. Here the completed prestretched diaphragm web blisters (2915, 2916) corresponding to a stretched valve diaphragm web and a pump diaphragm web respectively, are shown in a distended state conforming to the shape of the internal surface area of the hydraulic cavities. A roller of suitable durometer could also be used to perform this process step. Upper layers of the device may then be glued or otherwise fused or affixed to the hydraulic subassembly, sandwiching the diaphragm member in the completed device body. Final assembly is not shown, but would be understood by one skilled in the art and in reference to FIG. 7 and FIG. 19, for example.

Figure 26A:
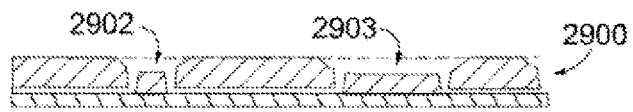
FIGS. 26A through 26F are sequential views of steps in a second process of mechanically stretching a diaphragm film in place.
Figure 26B:
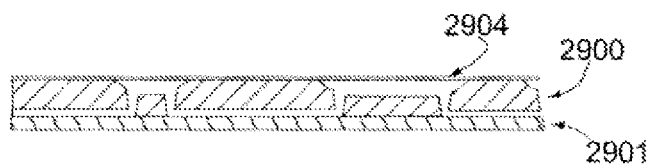
Figure 26C:
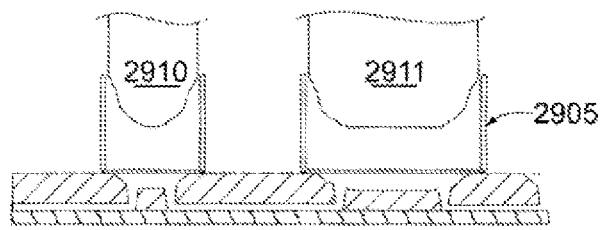
Figure 26D:
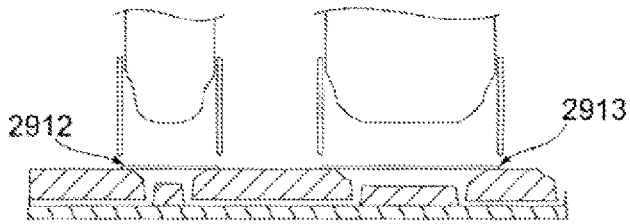
Figure 26E:
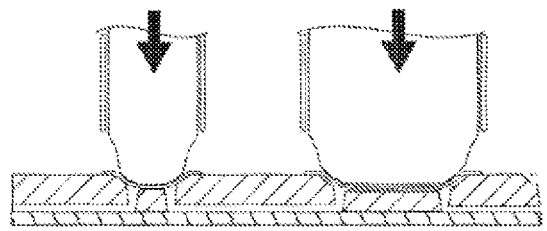
Figure 26F:
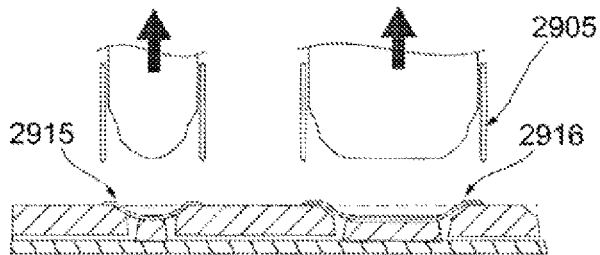

FIGS. 26A through 26F are sequential views of steps in a second process of mechanically stretching a diaphragm film in place. FIG. 26A shows a first molded body member 2900 having internal cavities and channels; and in FIG. 26B a lower capping layer 2901 is added to seal the channels. Viewed in cross-section are a hydraulic subcavity of a valve 2902 (with valve sill separating two fluidic channels) and a hydraulic subcavity of a pump 2903 (with an inlet and an outlet). This forms the hydraulic works of the device, and defines a hydraulic valve subcavity and pump subcavity with internal pumping as depicted schematically. In FIG. 26C, a thin film sheet of a suitable diaphragm film 2904 is overlaid on top of the hydraulic subassembly, covering the valve and pump subcavities. Then, the thin film material 2904 is welded or tacked to the molded part and excess material is stripped away in a laser cut-weld, resulting in the valve and pump diaphragm members (2912, 2913) depicted in FIG. 26D. In this example, the cutting and fusion process is performed with an annular knife 2905 (or other suitable shape). Optionally the knife is heated or is sonically actuated so as to fuse the apron of the diaphragm members to the substrate. In a next step (FIGS. 26E to 26F), mechanical fingers (2910, 2911) having suitable dimensions are used to force (arrows) the diaphragm webs into the hydraulic subcavities under process conditions suitable to overstretch the film past its yield point and permanently deform the webs into the shape of a blister. Here the completed prestretched diaphragm web blisters (2915, 2916) corresponding to a valve diaphragm web and a pump diaphragm web respectively, are shown in a distended state conforming to the shape of the internal surface area of the hydraulic cavities. A roller of suitable durometer could also be used to perform this process step. Upper layers of the device may then be glued or affixed to the hydraulic subassembly, sandwiching the diaphragm member in the completed device body.

The teaching of the invention is not limited to valves and pumps, but relates to stretched diaphragms having a variety of functions in microfluidic devices. In the next example, we show a vent having a microporous diaphragm, the vent occupying the terminus of a channel. By selecting a hydrophobic microporous film, liquid may enter the hydraulic cavity while air is vented, allowing the cavity to fully fill with liquid.

Venting Elements having Breathable Diaphragms

Figure 27A:
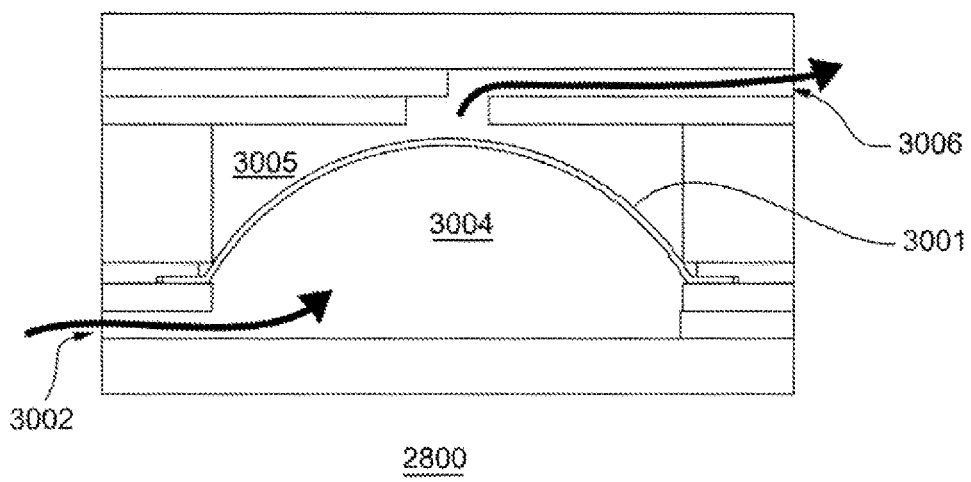
FIGS. 27A and 27B illustrate a close-ended channel with breathable diaphragm for fluid loading and priming of a pump having a breathable diaphragm.
Figure 27B:
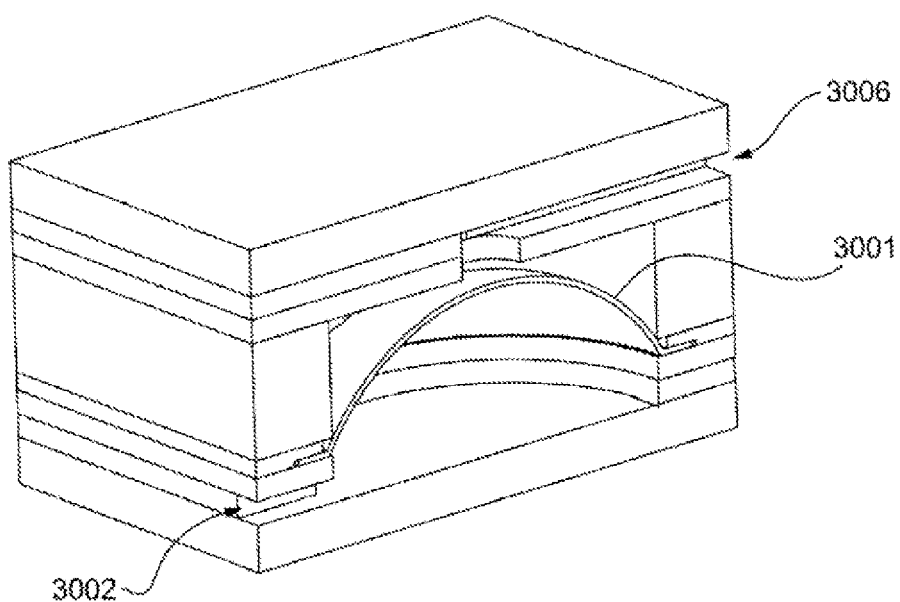

FIGS. 27A and 27B are representations of a close-ended micropump cavity 3000 which finds use in a fluidic circuit having a branch that terminates in a chamber 3004 with no outlet. Fluid enters the chamber shown here through an inlet 3002 and fills the hydraulic subcavity 3004. In chambers of this type having diaphragms of the prior art, the resident gas cannot be displaced. However, by supplying a diaphragm web 3001 of a breathable microporous film, gas is voided during the liquid filling process through the diaphragm, through pneumatic subcavity 3005 and out port 3006. By "breathable" is meant a film having permeability to gas but not to liquid. The diaphragm may then be pneumatically actuated to expel the fluid from the chamber, because the diaphragm, once wetted, no longer vents gas robustly but instead is transformed into an efficient pumping member when actuated pneumatically. This novel feature combines a microporous vent and a pump into an integral unit with a single diaphragm. Port 3006 serves as a vent to outside atmosphere during the fill cycle, but may be valved so as to be operated by positive or negative pressure when operating diaphragm 3001 as a pump. Inlet port 3002 also serves as the liquid outlet.

In application, a series of chambers in a fluidic device are fluidly connected to perform an assay, the end-terminal chamber (FIG. 27) of the series having a breathable diaphragm 3001 that serves as a vent, so that any air trapped in the dead end chamber may be removed during the fill operation. By pressurizing pneumatic cavity 3005, liquid is expelled back out the inlet 3002 and returned to the upstream fluidic circuit.

Micropumps of this kind can also be used for reagent additions where a dried reagent is stored in the chamber for wetting at time of use, and for thermocycling, for example, where a pair of pumps are slaved so that one is actuated pneumatically, and the second is a close-ended fluidic branch having a terminal chamber that is filled under pressure (while venting gas through a microporous diaphragm) and then can be operated as a pneumatic pump to eject the liquid when acted on by a pneumatic overpressure.

Figure 28:
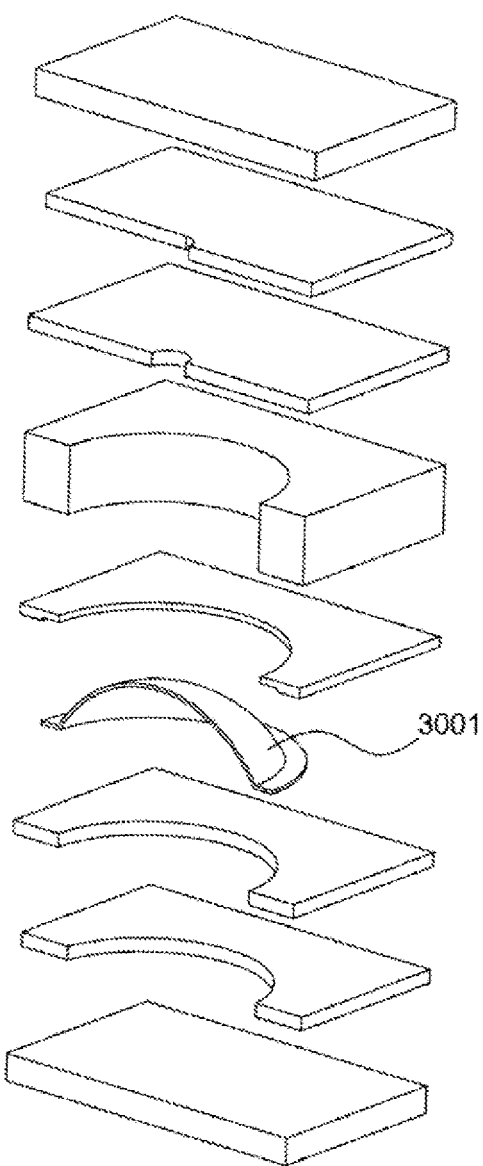
FIG. 28 is an exploded view of a close-ended channel with breathable diaphragm having a body constructed of layers.

FIG. 28 depicts construction of a vented micropump element by lamination. The material may be pre-stretched by applying a pressure differential across its interface as described with reference to FIGS. 4 and 5 or by using the mechanical stretch/assembly processes illustrated in FIGS. 25 and 26.

Figure 29A:
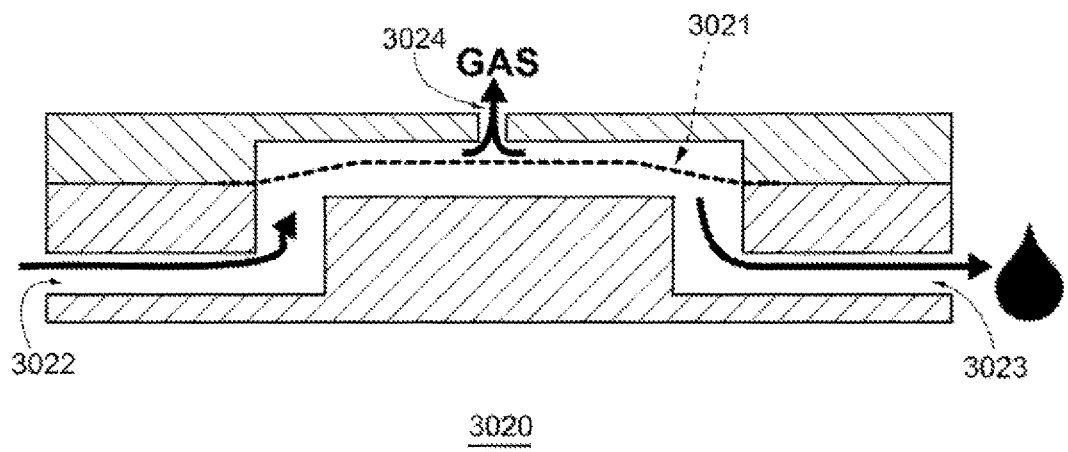
FIGS. 29A and 29B are schematic views of a flow-through fluidic element with microporous film for gassing or degassing a liquid.
Figure 29B:
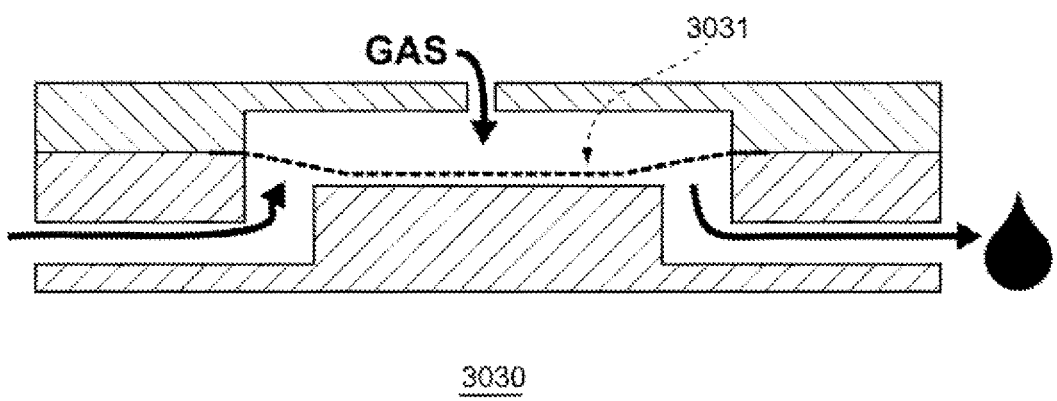

In another application, as shown in the device of FIG. 29A, breathable microporous films 3021 that have been stretched may be used to form a flow-through degassing 3020 chamber. This chamber includes an inlet 3022 and an outlet 3023 for enabling flow of a liquid, but is topped by a pneumatic subchamber separated from the hydraulics by a microporous membrane 3021 (dashed line) through which gas can be withdrawn through port 3024 under a pressure differential. Films formed in this way can be used for degassing small volumes of fluids. Breathable microporous films can also be used in chambers 3030 configured to add gas as shown in FIG. 29B, such as for oxygenation of cells in flow cytometric applications or for introduction of bubbles through thin film 3031 (dashed line) into a fluid channel as where it is desirable to reform flow into a stream of alternating fluid and bubble segments, as was achieved at a macroscopic scale in the AutoAnalyzer II, where bubbles were introduced at a "tee" into tubing carrying assay fluids at regular intervals to disrupt the unstirred boundary layer as is problematic in some microfluidic applications. These films may be pre-stretched by the teachings of the invention to reduce resistance to fluid flow and to increase surface area for gas exchange.

Figure 30A:
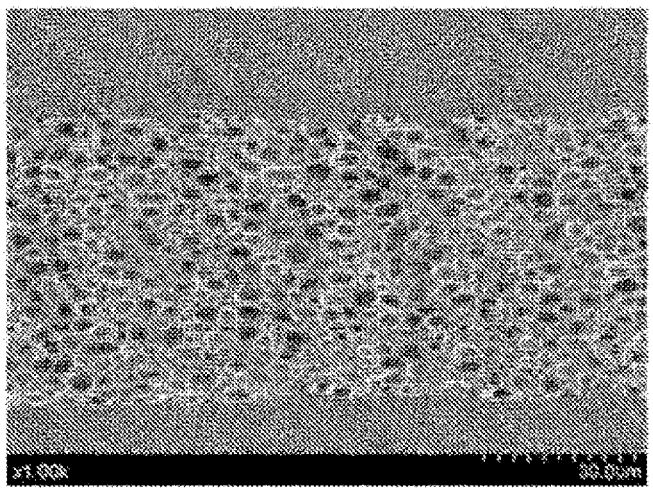
FIGS. 30A, B and C are electron micrographs of the fine structure of a breathable microporous polyurethane film.
Figure 30B:
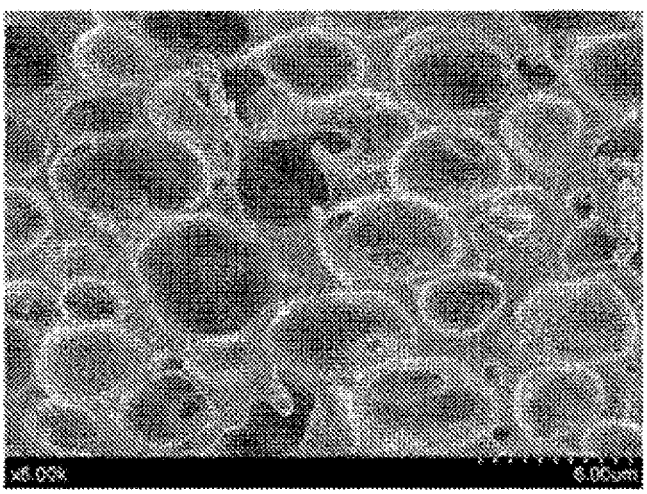
Figure 30C:
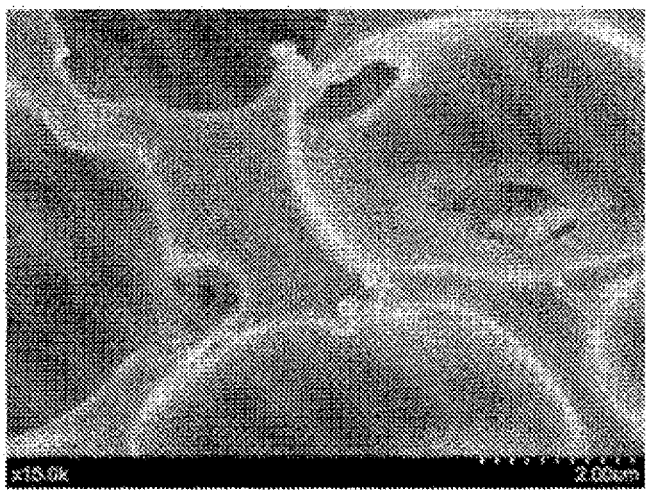

FIGS. 30A, B and C are electron micrographs of the fine structure of a breathable microporous polyurethane film, such as is useful in the devices of FIGS. 28 and 29. A porous, fractured cellular structure is readily visible with increasing magnification by scanning electron microscopy. Microporous polyurethanes include films sold as "PORELLE®" membranes (PIL Membranes Ltd, Kings Lynn, Norfolk UK). These polyurethanes can preferably be hydrophobic, but hydrophilic films may also be useful. One example is Porelle 355.

Other microporous polymers are also known and function analogously. Microporous forms of polytetrafluoroethylene (PTFE) sold under the trade name MUPOR® (Porex, Fairburn Ga.) are readily yielded in place using hydraulic pressure. A yield point of 2.2 MPa was determined experimentally for a 1 mil PFTE film under standard ASTM test conditions. The resulting diaphragms have good permeability to gas and can be used as vents, and the hydrophobicity results in selective blockage of aqueous liquids if desired. In an unexpected solution to a technical problem, microporous polyurethane films may thus be used to form diaphragm members in closed-end channels, where ingress of liquid into a terminal chamber is possible only by directly venting the resident air through a permeable diaphragm. In some applications, these diaphragms initially release air, but when wetted, permeability to air is substantially decreased, thus the diaphragm to a zero-air entrapment, self-priming pump for close-ended channels, where advantageously the pump becomes an active pneumatic micropump once all air in the line is vented and the film is wetted.

Application of dry pneumatic pressure or hydraulic pressure is sufficient to cause films having a yield strength in the range of 2-30 MPa to yield. The films will generally conform to the shape of an internal cavity. Suitable form-in-place processes ensure that the full volume of the cavity is available for a subsequent pump stroke in the presence of liquid, and is useful for example, when pump chambers are used in pairs, such as for two-zone thermocycling, particularly when one of the pump chambers is a terminal chamber and is not otherwise vented. Alternatively, mechanical yielding processes of the invention may be used to form these yielded diaphragm members.

Circuit Combinations of the Inventive Fluidic Diaphragm Elements

FIG. 31 illustrates a representative fluidic circuit 3040 having a combination of diaphragm-operated circuit elements of the invention, as shown by drawing the channels and chambers without supporting substrate. This fluidic circuit consists of an inlet port 3041, a degassing chamber 3042 connected to a sanitary vent 3043, two paired diaphragm pumps (3044,3045) for back-and-forth fluid flow, a detection chamber 3046 with optical windows on the long axis and a terminal vent 3047. In operation, sample is added with aspiration, and is then directed through the circuit by coordinated action of pneumatic actuators on diaphragms within each circuit element. In an assay, dried reagents (circles) prepositioned in the hydraulic subcavities result in chemical reactions leading to a detection endpoint. Also needed for operation are two valves (3048, 3049) that are used to fluidically isolate the paired diaphragm pumps during reciprocating flow as in PCR amplification, where one diaphragm pump is held at an annealing temperature and the other diaphragm pump at a denaturing temperature, as is known in the art. Advantageously, pre-stretched diaphragm members achieve improved pump stroke volumes, improved consistency of stroke volume, reduce the work of pumping, and also improve the speed of the valves. Use of a stretched microporous diaphragm for venting bubbles in the liquid is also contemplated and has been shown to offer advantages when filling close-ended channels. These circuit combinations having irreversibly stretch-deformed diaphragms are also conceived and claimed as part of the scope of this invention.

FIG. 32 illustrates a duplex microfluidic cartridge 3060 formed of pneumatic and hydraulic circuits containing microvalves and micropumps of the invention. While the detailed operation of these circuits is beyond the scope of the description needed to appreciate the invention, one skilled in the art will understand that the inventive micropumps, microvalves, and microvents may be combined in larger assemblies of one, two or more microfluidic card devices and act cooperatively to function in biological assays, including extractions and purifications, and also amplification and detection steps, and are capable of performing multiple simultaneous functions with very small fluid volumes. In this example, the larger of the two devices 3061 is an extraction subcircuit, and the smaller device is a detection subcircuit. Also shown is a gasket 3063 used in interfacing the microfluidic device pair through a common manifold to an off-card pneumatic actuation circuit under instrument control. To meet the challenge of higher throughput and assay complexity, increased miniaturization of these combinations is needed. The inventive diaphragms and subcombinations thereof result in improved miniaturization and increased circuit density, as is a desirable advance in the art.

FIG. 33 tabulates yield point for several common films useful in the microvalve diaphragms of the invention. Shown are yield points of exemplary stretchable diaphragm film materials, including linear low density polyethylenes, low density polyethylenes, ethylene vinyl acetate copolymers, polyvinylidene chloride, and SARANEX®. High density polyethylenes have a marginally higher yield strength but are readily modified to be suitable by a process of blending, grafting or co-lamination by skills known in the art. Suitable films for the yield-in-place process have yield strengths in the range of 2 to 30 MPa, but films having higher yield points may be used with the mechanical processes described herein.

For example, also listed in the table for comparison is biaxially oriented polyethylene terephthalate, which has a narrow range of elasticity (elastic modulus of 1.35 GPa) and a yield stress of about 100 MPa. Films having a yield stress greater than 30 MPa are not generally practical for yield-in-place processes at pressures and temperatures suitable for manufacturing of micropumps and microvalves unless modified due to practical constraints on applied pressure and temperature tolerated by the plastic cartridge body. Such films may be yielded using mechanical presses or rollers as described earlier, or equivalent processes known in the art.

Polycarbonates have relatively high yield strengths (in the range of 55-65 MPa) and elastic modulus (2.3 GPa). These materials are expected to resist elongation and are not generally suitable for yield-in-place operations within a cartridge body, but may be blended or laminated with more compliant materials, and may be stretched mechanically under suitable conditions.

Polyimides are generally stiff materials with an elastic modulus exceeding 4 GPa and a yield strength of more than 70 MPa. While unstretched polyimides have been used as diaphragms in microfluidic cartridges, their inherent stiffness is not compatible with reliable self-priming features and implies higher operating pressure than are generally practicable unless blended or otherwise mechanically or pneumatically stretched prior to assembly to attain a suitable degree of flexibility.

Polyether ether ketone (PEEK) is generally not suitable. In addition to a yield stress of above 100 MPa, the Young's modulus is greater than 3.6 GPa, indicating an extremely stiff material that will not readily stretch without substantial applied force.

PTFE has no memory and is not an elastomer. However, the yield strength is relatively low (slightly more than 2 MPa). Surprisingly, microporous forms of PTFE sold under the trade name MUPOR® are readily yielded in place using pneumatic pressure. These breathable films retain a significant plasticity after yield point is exceeded, and can be stretched to conform to a chamber using pressures in a range suitable for manufacturing of microassay cartridges. Microporous PTFE diaphragms that have been yielded in place may be operated as pumps or valves in the devices of the invention when wetted.

A large range of polyolefinic and related plastics have been found to be useful in forming stretch wraps and have yield strengths, toughness, and bonding characteristics suitable for use in the inventive microvalves and micropumps. Of particular interest are acrylates, vinyl chlorides, biaxially oriented polypropylene, and esters, for example. Polyvinylchloride may be used in blends and co-laminates. Use of polyolefins as blends and co-laminates to form "stretch wrap" films having the preferred yield strengths and bonding characteristics is well known in the art.

While the above is a description of the preferred embodiments of the present invention, it is possible to use various alternatives, modifications, combinations, and equivalents. Therefore, the scope of the present invention should be determined not with reference to the above description but should, instead, be determined with reference to the appended claims, along with their full scope of equivalents. The appended claims are not to be interpreted as including means-plus-function limitations, unless such a limitation is explicitly recited in a given claim using the phrase "means for."

All of the U.S. patents, U.S. patent application publications, U.S. patent applications, foreign patents, foreign patent applications and non-patent literature and publications referred to in this specification and/or cited in accompanying submissions, including but not limited to U.S. Patent Application No. 61/745,340, are incorporated herein by reference, in their entirety. Aspects of the embodiments may be modified, if necessary to employ concepts of the various patents, applications and publications to provide yet further embodiments. These and other changes may be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the specifics of the disclosure.

What is claimed is:
1. A micropump comprising:
  a cavity having:
    i) a first subcavity configured to receive a fluid;
    ii) a second subcavity configured to be reversibly pressurized; and
    iii) a diaphragm interposed between and separating said first subcavity from said second subcavity;

wherein said diaphragm includes a permanently overstretched, plastically deformed polymeric thin film web.

2. The micropump of claim 1, wherein said thin film web is a low density polyethylene/ethylene vinyl acetate/polyvinylidene chloride/ethylene vinyl acetate/low density polyethylene co-laminate film.

3. The micropump of claim 1, wherein said thin film web is composed of polyethylene, polyvinylidene chloride, polyethylene vinyl acetate, polyvinylchloride, polypropylene, polyolefin, or a composite or a co-laminate thereof.

4. The micropump of claim 1, wherein said thin film web is a high density polyethylene, polyethylene terephthalate, a polycarbonate, a polyimide, a polyether ether ketone, a polypropylene, a polyvinylchloride, a polyacrylate, a polyester, or a co-laminate or a composite thereof.

5. The micropump of claim 1, wherein said thin film web is a stretch-wrap film.

6. The micropump of claim 1, wherein said thin film web is a chemically resistant polymer.

7. The micropump of claim 1, wherein said micropump is self-priming.

8. The micropump of claim 1, wherein said micropump is manufactured by a process of locally overstretching said web under a force applied to said thin film web, said force being in excess of a yield point of said thin film web.

9. The micropump of claim 1, wherein said thin film web inelastically conforms in a first state to a first internal surface of said cavity when pressurized and in a second state to a second internal surface of said cavity when depressurized.

10. The micropump of claim 9, wherein said micropump is configured to pump a liquid according to a pump stroke defined by the reversible motion of said permanently overstretched deformation of said web between said first state and said second state as driven by pressurization and depressurization of said second subcavity.

11. The micropump of claim 10, wherein said first subcavity comprises a port configured for receiving a liquid.

12. The micropump of claim 10, wherein said first subcavity comprises a port for discharging a liquid.

13. The micropump of claim 1, wherein the micropump is enclosed in a disposable cartridge body of a microassay device.

14. The micropump of claim 8, wherein the micropump is enclosed in a disposable cartridge body of a microassay device and wherein said force is a pneumatic force applied to said diaphragm after assembly of the disposable cartridge body.

15. The micropump of claim 8, wherein said web is first overstretched by locally applying a force; and then said cavity is assembled by aligning said web with said cavity while apposingly mating said first subcavity with said second subcavity.

16. The micropump of claim 8, wherein said web is overstretched by a process of forcing said web into a subcavity; and then said cavity is assembled by apposingly mating said first subcavity with said second subcavity.

17. The micropump of claim 8, wherein said force is a mechanical force applied under controlled process conditions.

* * * * *